US010295332B2

(12) United States Patent
Nakayama

(10) Patent No.: US 10,295,332 B2
(45) Date of Patent: May 21, 2019

(54) DEFORMATION AMOUNT MEASURING METHOD, PROGRAM, SERVER DEVICE, AND SYSTEM

(71) Applicant: 3M INNOVATIVE PROPERTIES COMPANY, St. Paul, MN (US)

(72) Inventor: Tasuku Nakayama, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/758,534

(22) PCT Filed: Sep. 12, 2016

(86) PCT No.: PCT/US2016/051215
§ 371 (c)(1),
(2) Date: Mar. 8, 2018

(87) PCT Pub. No.: WO2017/048610
PCT Pub. Date: Mar. 23, 2017

(65) Prior Publication Data
US 2018/0274908 A1 Sep. 27, 2018

(30) Foreign Application Priority Data
Sep. 16, 2015 (JP) .................................. 2015-183136

(51) Int. Cl.
*G01B 11/14* (2006.01)
*G01B 11/16* (2006.01)
(Continued)

(52) U.S. Cl.
CPC .............. *G01B 11/165* (2013.01); *B32B 7/03* (2019.01); *B32B 7/12* (2013.01); *B32B 25/08* (2013.01);
(Continued)

(58) Field of Classification Search
CPC ......... G01B 11/165; B32B 7/005; B32B 7/12; B32B 25/08; B32B 27/08; B32B 27/18;
(Continued)

(56) References Cited

U.S. PATENT DOCUMENTS 4,051,483 A * 9/1977 Suzuki ................. G01B 11/254
33/20.4
5,613,013 A 3/1997 Schuette
(Continued)

FOREIGN PATENT DOCUMENTS

JP 2006-28224 A 2/2006
JP 2009-249485 10/2009

OTHER PUBLICATIONS

Gabrielyan, "The basics of line moire patterns and optical speedup", Mar. 8, 2007, 11 pages.
(Continued)

*Primary Examiner* — Roy M Punnoose
(74) *Attorney, Agent, or Firm* — X. Christina Huang

(57) ABSTRACT

At least one aspect of the present disclosure directs to a deformation amount measuring method is a method in which a sheet (101) is used that includes a first layer portion (111) having a first pattern (121) that includes a plurality of line drawings extending in a first direction, and a second layer portion (112) overlaid on the first layer portion (111) and having a second pattern (122) that includes a plurality of line drawings extending in a second direction different than the first direction. The method includes the steps of acquiring, from the sheet (101) that has been disposed on a measurement subject, post-deformation image data corresponding to a post-deformation image including a post-deformation moire produced as a result of a post-deformation first pattern (121) and second pattern (122) being overlaid and finding an amount of deformation of the measurement subject on the basis of the post-deformation image data.

14 Claims, 49 Drawing Sheets

(51) Int. Cl.

| | | |
|---|---|---|
| *G01L 1/24* | (2006.01) | |
| *B32B 7/12* | (2006.01) | |
| *B32B 25/08* | (2006.01) | |
| *B32B 27/08* | (2006.01) | |
| *B32B 27/18* | (2006.01) | |
| *B32B 27/20* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *G06C 1/00* | (2006.01) | |
| *B32B 7/03* | (2019.01) | |

(52) U.S. Cl.
CPC .............. *B32B 27/08* (2013.01); *B32B 27/18* (2013.01); *B32B 27/20* (2013.01); *B32B 27/30* (2013.01); *B32B 27/308* (2013.01); *B32B 27/32* (2013.01); *B32B 27/36* (2013.01); *B32B 27/40* (2013.01); *G01L 1/24* (2013.01); *G06C 1/00* (2013.01); *B32B 2250/03* (2013.01); *B32B 2250/24* (2013.01); *B32B 2270/00* (2013.01); *B32B 2307/4023* (2013.01); *B32B 2307/412* (2013.01); *B32B 2307/51* (2013.01); *B32B 2307/54* (2013.01); *B32B 2307/712* (2013.01); *B32B 2307/732* (2013.01); *B32B 2307/734* (2013.01); *B32B 2419/00* (2013.01); *B32B 2607/00* (2013.01)

(58) Field of Classification Search
CPC ......... B32B 27/20; B32B 27/30; B32B 27/40; G01L 1/24
USPC ........................................................ 356/605
See application file for complete search history.

(56) References Cited

U.S. PATENT DOCUMENTS

| | | | | |
|---|---|---|---|---|
| 5,732,163 | A * | 3/1998 | Brandstetter | G01B 11/26 356/605 |
| 6,078,396 | A * | 6/2000 | Manzouri | G01B 11/167 356/496 |
| 7,286,246 | B2 * | 10/2007 | Yoshida | G01B 11/2527 250/559.22 |
| 7,751,608 | B2 * | 7/2010 | Hersch | G07D 7/207 283/94 |
| 2007/0041611 | A1 * | 2/2007 | Hersch | G04B 19/10 382/100 |
| 2011/0299064 | A1 | 12/2011 | Sugimoto | |
| 2013/0292030 | A1 | 11/2013 | Schindler, II | |

OTHER PUBLICATIONS

Wang, "Developments and Applications of Moire Techniques for Deformation Measurement, Structure Characterization and Shape Analysis", Recent Patents on Materials Science, vol. 8, No. 3, Sep. 1, 2015, pp. 188-207.
International Search Report for PCT International Application No. PCT/US2016/051215 dated Nov. 21, 2016, 3 pages.

* cited by examiner

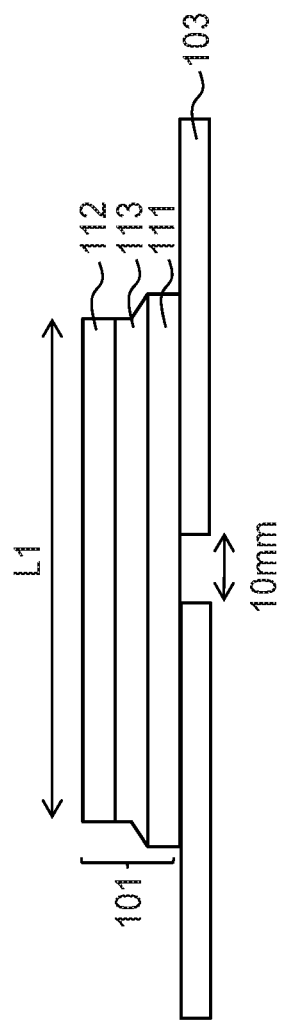
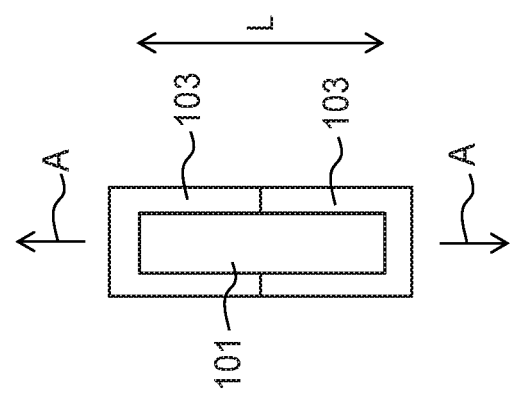
FIG. 4B
FIG. 4A

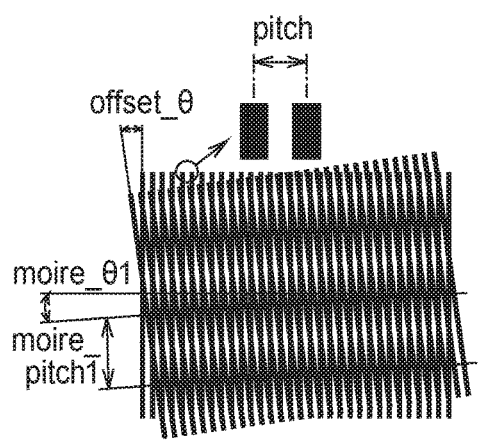
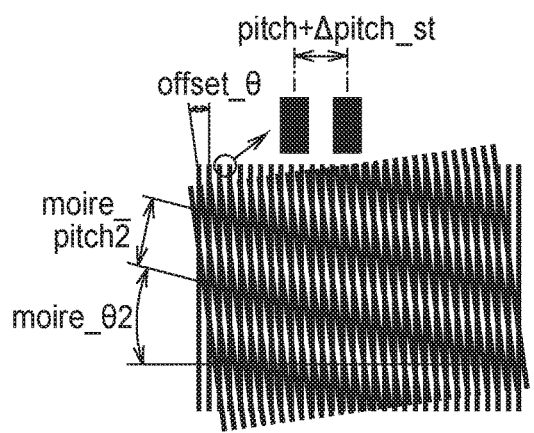
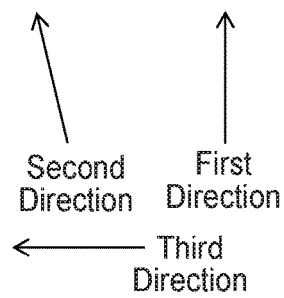
FIG. 6A
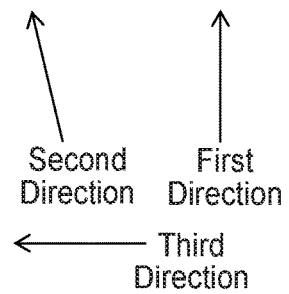
FIG. 6B

FIG. 39A

| Sheet ID | Photo ID | Capture Date/Time | Photo-grapher | Sheet Part Number | Location | Number of Image Acquired At Same Location | Amount of Deformation of Deformation Following Portion | Presence/Absence od Output Deformation Amount Alarm |
|---|---|---|---|---|---|---|---|---|
| CR0053 | A | 2013/8/26, 09:00 | A | XXXX | Tunnel X | 1 | 0.0mm | Absent |
| CR0053 | B | 2015/8/27, 09:00 | A | XXXX | Tunnel X | 2 | 1.0mm | Present |
|  |  |  |  |  |  |  |  |  |
|  |  |  |  |  |  |  |  |  |

FIG. 39B

| Sheet Part Number | Width of First Pattern of Deformation Following Portion | Pitch of First Pattern of Deformation Following Portion | Width of Second Pattern of Deformation Following Portion | Pitch of Second Pattern of Non-Deformation Following Portion | Offset Angle | Dimensions of Sheet (Width, Length, Thickness) |
|---|---|---|---|---|---|---|
| XXXX |  |  |  |  |  |  |
| YYYY |  |  |  |  |  |  |
|  |  |  |  |  |  |  |
|  |  |  |  |  |  |  |

FIG. 45A

| Sheet ID | Photo-Graph ID | Capture Date/Time | Photo-grapher | Sheet Part Number | Location | First Image Captured With Same Sheet ID? | Number of Image Captured With Same Sheet ID? | Amount of Deformation of the Deformation Following Portion | Presence/Absence of Output Deformation Amount Alarm |
|---|---|---|---|---|---|---|---|---|---|
|  | A | 2013/8/26 09:00 | A | XXXX | Tunnel X | First |  |  |  |

FIG. 45B

| Sheet ID | Photo-Graph ID | Capture Date/Time | Photo-grapher | Sheet Part Number | Location | First Image Captured With Same Sheet ID? | Number of Image Captured With Same Sheet ID? | Amount of Deformation of the Deformation Following Portion | Presence/Absence of Output Deformation Amount Alarm |
|---|---|---|---|---|---|---|---|---|---|
| CR 0053 | A | 2013/8/26 09:00 | A | XXXX | Tunnel X | First | First | 0.0mm | Absence |

FIG. 45C

| Sheet Part Number | Width of First Pattern of Deformation Following Portion | Pitch of First Pattern of Deformation Following Portion | Width of Second Pattern of Non-Deformation Following Portion | Pitch of Second Pattern of Non-Deformation Following Portion | Offset Angle | Dimensions of Sheet (Width, Length, Thickness) |
|---|---|---|---|---|---|---|
| XXXX |  |  |  |  |  |  |

FIG. 48A

| Sheet ID | Photo-Graph ID | Capture Date/Time | Photo-grapher | Sheet Part Number | Location | First Image Captured With Same Sheet ID? | Number of Image Captured With Same Sheet ID? | Amount of Deformation of the Deformation Following Portion | Presence/Absence of Output Deformation Amount Alarm |
|---|---|---|---|---|---|---|---|---|---|
| | B | 2015/8/27 09:00 | A | XXXX | Tunnel X | Second or Later | | | |

FIG. 48B

| Sheet ID | Photo-Graph ID | Capture Date/Time | Photo-grapher | Sheet Part Number | Location | First Image Captured With Same Sheet ID? | Number of Image Captured With Same Sheet ID? | Amount of Deformation of the Deformation Following Portion | Presence/Absence of Output Deformation Amount Alarm |
|---|---|---|---|---|---|---|---|---|---|
| CR 0053 | A | 2013/8/26 09:00 | A | XXXX | Tunnel X | First | First | 0.0mm | Absent |
| CR 0053 | A | 2015S/8/27 09:00 | A | XXXX | Tunnel X | Second or Later | Second | 1.0mm | Present |

# DEFORMATION AMOUNT MEASURING METHOD, PROGRAM, SERVER DEVICE, AND SYSTEM

CROSS REFERENCE TO RELATED APPLICATIONS

This application is a national stage filing under 35 U.S.C. 371 of PCT/US2016/051215, filed Sep. 12, 2016, which claims the benefit of Japanese Application No. 2015-183136, filed Sep. 16, 2015, the disclosure of which are incorporated by reference in their entirety herein.

TECHNICAL FIELD

The present disclosure relates to a deformation amount measuring method, program, server device, and system.

BACKGROUND

Conventionally, various methods have been proposed for detecting strain, damage, and the like in measurement subjects such as buildings. For example, deformation in a concrete wall of a structure such as a building causes serious damage to the building. Measuring using strain gauges or rulers is known as methods for monitoring the progression of such deformations. However, with these measuring methods, there is a possibility of variation (i.e. measurement error) in the values measured by a measurer, arising from the measurement methods in which strain gauges or rulers are used. Thus, the need to accurately detect deformations is not sufficiently met. In addition, with these measuring methods, it is necessary to perform the measuring near the measurement subject. Therefore, there is a need for a method that enables accurate and convenient deformation measuring, which does not require the measurer to be near the measurement subject.

SUMMARY OF THE INVENTION

An objective of the present disclosure is to provide a deformation amount measuring method by which it is possible to quantitatively and conveniently inspect an amount of deformation of a measurement subject.

At least one method of the present disclosure is a method for measuring an amount of deformation of a measurement subject in which a sheet is used that includes a first layer portion having a first pattern that includes a plurality of line drawings extending in a first direction, and a second layer portion overlaid on the first layer portion and having a second pattern that includes a plurality of line drawings extending in a second direction different than the first direction. The method includes the steps of acquiring post-deformation image data corresponding to a post-deformation image including a post-deformation moire produced as a result of the post-deformation first pattern and second pattern being overlaid, and finding an amount of deformation of the measurement subject from the sheet that has been disposed on the measurement subject.

In the method described above, it is optional that the first layer portion further include a deformation following portion that follows the deformation of the measurement subject; the second layer portion includes a non-deformation following portion that does not follow the deformation of the measurement subject; and the sheet further include a deformation buffer portion that connects the deformation following portion and the non-deformation following portion.

Additionally, it is optional that the step of finding the amount of deformation of the measurement subject include a step of finding an amount of deformation of the deformation following portion on the basis of the post-deformation image data.

The method described above preferably further includes a step of acquiring reference data on the basis of pre-deformation image data corresponding to a pre-deformation image including a pre-deformation moire produced as a result of the pre-deformation first pattern and the second pattern being overlaid.

In the method described above, it is optional that the step of finding the amount of deformation of the deformation following portion include the steps of acquiring a first pitch of the pre-deformation moire from the pre-deformation image, and a first angle of inclination with respect to the second direction of the extending directions of the pre-deformation moire; acquiring at least one of a second pitch of the post-deformation moire from the post-deformation image and a second angle of inclination with respect to the second direction of the extending directions of the post-deformation moire; calculating an amount of change of a pitch of the first pattern using the first pitch and the first angle of inclination and at least one of the second pitch and the second angle of inclination; and finding the amount of deformation of the deformation following portion from the amount of change of the pitch of the first pattern.

In the method described above, it is optional that the step of acquiring the first pitch and the first angle of inclination include a step of acquiring a first spatial frequency information that shows a spatial frequency of the pre-deformation image, and calculating the first pitch and the first angle of inclination from the first spatial frequency information; and the step of acquiring at least one of the second pitch and the second angle of inclination include a step of acquiring a second spatial frequency information that shows a spatial frequency of the post-deformation image, and calculating at least one of the second pitch and the second angle of inclination from the second spatial frequency information.

In the method described above, it is optional that the step of finding the amount of deformation of the deformation following portion further include a step of acquiring an offset angle between the first direction and the second direction; and the amount of change of the pitch of the first pattern be calculated further using the offset angle.

In the method described above, it is optional that the step of acquiring the offset angle include a step of calculating the offset angle using the first pitch.

In the method described above, it is optional that the step of finding the amount of deformation of the deformation following portion include the steps of acquiring both the second pitch and the second angle of inclination; comparing a first amount of change of the pitch of the first pattern calculated on the basis of the second pitch with a second amount of change of the pitch of the first pattern calculated on the basis of the second angle of inclination; and outputting an alarm indicating a possibility that the amount of change of the pitch that is calculated contains a mistake when a difference between the first amount of change and the second amount of change is greater than or equal to a predetermined first calculation threshold.

In the method described above, it is optional that the step of finding the amount of deformation of the deformation following portion include a step of partitioning a pitch change region where the pitch of the line drawings included in the first pattern change from before to after deformation of the deformation following portion, and a pitch constant region where the pitch of the line drawings included in the first pattern do not change from before to after deformation of the deformation following portion; and the amount of deformation of the deformation following portion be found from the post-deformation moire produced in the pitch change region of the post-deformation image.

In the method described above, it is optional that the step of finding the amount of deformation of the deformation following portion further include the steps of calculating an amount of movement of the pre-deformation moire and the post-deformation moire in the pitch constant region and estimating the amount of change of the pitch of the first pattern using the amount of movement; and outputting an alarm indicating a possibility that the amount of change of the pitch that is calculated contains a mistake when a difference between the amount of change of the pitch of the first pattern calculated from the pre-deformation moire and the post-deformation moire produced in the pitch change region, and the estimated amount of change is greater than or equal to a predetermined second calculation threshold.

The method described above preferably further includes a step of outputting a deformation amount alarm indicating that the amount of deformation of the deformation following portion has exceeded a reference value when the amount of deformation of the deformation following portion is greater than or equal to a predetermined deformation amount threshold.

The program of the present disclosure includes a program for measuring an amount of deformation of a measurement subject in which a sheet is used that includes a first layer portion having a first pattern that includes a plurality of line drawings extending in a first direction, and a second layer portion overlaid on the first layer portion and having a second pattern that includes a plurality of line drawings extending in a second direction different than the first direction. The program is configured to cause a computer to execute the steps of acquiring, from the sheet that has been disposed on the measurement subject, post-deformation image data corresponding to a post-deformation image including a post-deformation moire produced as a result of the post-deformation first pattern and second pattern being overlaid; and finding an amount of deformation of the measurement subject on the basis of the post-deformation image data.

The server device of the present disclosure includes a server receiving unit that receives, from a sheet that is disposed on a measurement subject and that includes a first layer portion having a first pattern that includes a plurality of line drawings extending in a first direction, and a second layer portion overlaid on the first layer portion and having a second pattern that includes a plurality of line drawings extending in a second direction different than the first direction, post-deformation image data corresponding to a post-deformation image including a post-deformation moire produced as a result of the post-deformation first pattern and second pattern being overlaid; a server processing unit that finds an amount of deformation of the measurement subject on the basis of the post-deformation image data; and a server sending unit that sends the amount of deformation of the measurement subject to a terminal device.

The server device described above preferably further includes a server memory unit that associates sheet identification information with pre-deformation image data corresponding to a pre-deformation image including a pre-deformation moire produced by the pre-deformation first pattern and second pattern being overlaid, and stores the associated information; and the server processing unit includes a sheet identification information referencing unit that determines the sheet identification information of the post-deformation image data and acquires pre-deformation image data associated with the determined sheet identification information from the server memory unit.

The system of the present disclosure includes a terminal device and a server device capable of communication with each other. The terminal device includes an image data acquisition unit that acquires, from a sheet that is disposed on a measurement subject and that includes a first layer portion having a first pattern that includes a plurality of line drawings extending in a first direction, and a second layer portion overlaid on the first layer portion and having a second pattern that includes a plurality of line drawings extending in a second direction different than the first direction, post-deformation image data corresponding to a post-deformation image including a post-deformation moire produced as a result of the post-deformation first pattern and second pattern being overlaid; a terminal communication unit that sends the post-deformation image data to the server device and receives an amount of deformation of a deformation following portion from the server device; and a display unit that displays an amount of deformation of the measurement subject that has been received. The server device includes a memory unit that stores the post-deformation image data; a server processing unit that finds the amount of deformation of the measurement subject on the basis of the post-deformation image data; and a server communication unit that receives the post-deformation image data from the terminal device and sends the amount of deformation of the measurement subject to the terminal device.

According to the present disclosure, a deformation amount measuring method is provided by which it is possible to quantitatively and conveniently inspect an amount of deformation of a measurement subject.

BRIEF DESCRIPTION OF THE DRAWINGS

FIGS. 4A and 4B are drawings explaining a method for measuring an amount of deformation of a non-deformation following portion of the present disclosure.

FIG. 6A is a partially exploded plan view of the sheet before the deformation following portion deforms; and FIG. 6B is a partially exploded plan view of the sheet after the deformation following portion has deformed.

FIG. 33A is a diagram illustrating a first change state of the sheet; FIG. 33B is a diagram illustrating a second change state of the sheet; FIG. 33C is a diagram illustrating a third change state of the sheet; and FIG. 33D is a diagram illustrating a fourth change state of the sheet.

FIG. 35A illustrates a grid-like first pattern; FIG. 35B illustrates a first pattern with a checkered pattern; FIG. 35C is a drawing illustrating a state where the first pattern and the second pattern depicted in FIG. 35A are overlaid; FIG. 35D is a drawing illustrating a state where the first pattern and the second pattern depicted in FIG. 35B are overlaid; FIG. 35E is a partially exploded view of a state where the first pattern of FIG. 35C is stretched 20%; and FIG. 35F is a partially exploded view of a state where the first pattern of FIG. 35D is stretched 20%.

FIGS. 39A and 39B are drawings showing examples of history tables stored in the memory unit depicted in FIG. 9; FIG. 39A is an example of an information table associated with images; and FIG. 39B is an example of an information table related to sheet part numbers.

FIG. 45A is a drawing illustrating a first state of one example of an image association table; FIG. 45B is a drawing illustrating a second state of the image association table depicted in FIG. 45A; and FIG. 45C is a drawing illustrating one example of a sheet part number table.

FIG. 48A is a drawing illustrating a third state of the image association table depicted in FIG. 45A; and FIG. 48B is a drawing illustrating a fourth state of the image association table depicted in FIG. 45A.

Figure 1B:
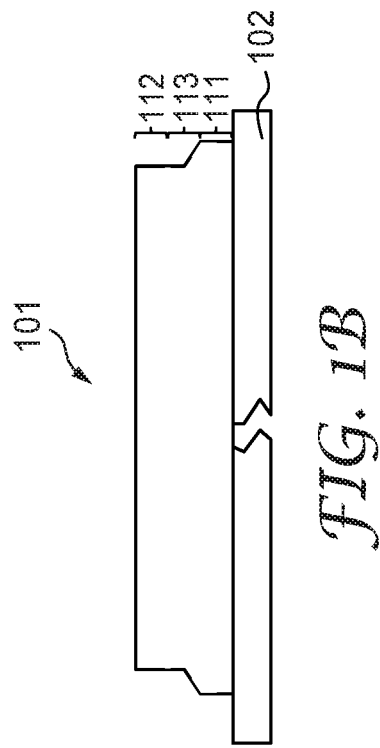
FIGS. 1A and 1B are first drawings illustrating an example of a sheet according to an aspect of the present disclosure.

Embodiments of the present disclosure will be described hereinafter while referencing the drawings. However, it should be understood that the present disclosure is not limited to the drawings or the following embodiments.

DETAILED DESCRIPTION

FIGS. 1A to 3B are drawings illustrating examples of sheets according to one aspect of the present disclosure, and illustrate a state where a sheet 101 is fixed to a measurement subject 102. Referring to FIGS. 1A to 3B, the sheet 101 includes a deformation following portion 111, a non-deformation following portion 112, and a deformation buffer portion 113 interposed between the deformation following portion 111 and the non-deformation following portion 112. In a typical aspect, as illustrated in FIGS. 1A to 3B, the deformation following portion and the non-deformation following portion of the sheet include a first and second main surface of the sheet, respectively.

In the present disclosure, the deformation following portion is a region that has the ability to deform so as to follow deformation of a measurement subject when an amount of deformation occurs in the measurement subject in a state where the sheet is fixed to the measurement subject. In the present disclosure, the non-deformation following portion is a region that substantially does not follow deformation when deformation occurs in the deformation following portion and, accordingly, is a region where deformation substantially does not occur. In the present disclosure, the deformation buffer portion is a region that has deformation buffering capacity sufficient to ensure that the non-deformation following portion substantially does not deform as a result of the deformation of the deformation following portion.

Figure 1A:
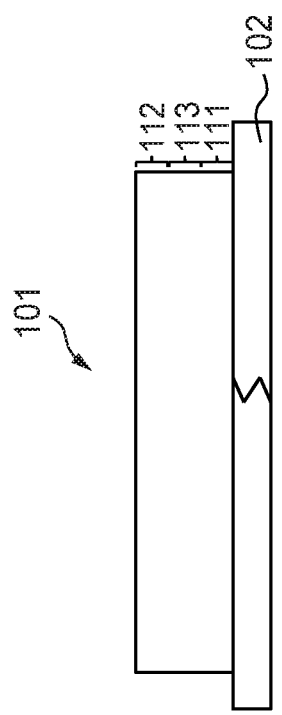

The sheet can be constituted from a single layer or from a plurality of layers. The sheet may have any configuration provided that it has regions that function as the deformation following portion, the non-deformation following portion, and the deformation buffer portion. Accordingly, in an illustrative aspect, the sheet is a single layer, and the single layer has appropriate thickness and physical properties, thereby constituting the deformation following portion, the non-deformation following portion, and the deformation buffer portion. Additionally, in another illustrative aspect, the sheet is formed from a plurality of layers of mutually different materials, thicknesses, and the like, and each of the layers can function individually as the deformation following portion, the non-deformation following portion, or the deformation buffer portion. Additionally, in yet another illustrative aspect, the sheet can be formed from two layers consisting of a layer that functions as the deformation following portion and the deformation buffer portion, and a layer that functions as the non-deformation following portion; or can be formed from two layers consisting of a layer that functions as the deformation following portion, and a layer that functions as the deformation buffer portion and the non-deformation following portion. As described above, the layer configuration of the sheet can be designed as desired, provided that the sheet has regions that function as the deformation following portion, the non-deformation following portion, and the deformation buffer portion. For example, FIGS. 1A and 1B illustrate examples of cases in which the sheet is a single layer, and FIGS. 2A and 2B and FIGS. 3A and 3B illustrate cases in which the sheet is in three layers (e.g. a stretchable layer, an unstretchable layer, and a viscoelastic layer, which are described later).

The deformation following portion has a first pattern that includes a plurality of straight lines extending in a first direction; and the non-deformation following portion has a second pattern that includes a plurality of straight lines extending in a second direction different than the first direction. The sheet of the present disclosure is configured so as to enable the detection of moire fringes produced by the first pattern and the second pattern. More specifically, the first pattern is viewable via the second pattern. Here, "the first pattern is viewable via the second pattern" means that the first pattern can be visualized along with the second pattern when the first and second patterns are observed from a second pattern side among a first pattern side and a second pattern side of the sheet. Means for the visualization can be selected as desired, and examples thereof include pattern imaging under visible light using various types of cameras. According to a configuration in which the first pattern is viewable via the second pattern, the moire fringes produced by the interference between the first pattern and the second pattern are also viewable, and evaluation of three-dimensional deformation of the measurement subject, based on the moire fringes, is possible.

Accordingly, with the sheet of the present disclosure, deformation of the measurement subject can be quantitatively and conveniently evaluated in three-dimensions. In the present disclosure, "deformation of the measurement subject can be evaluated in three-dimensions" means that deformation in every direction of the measurement subject can be evaluated, that is, deformation in each of the X, Y, and Z directions that mutually cross each other at right angles, and deformation in any direction that is a combination of any two or more of the X, Y, and Z directions can be evaluated. Additionally, "can be quantitatively evaluated" means that the amount of deformation of the measurement subject can be detected, and, for example, measurement errors such as variations caused by a measurer do not easily occur. Additionally, "can be conveniently evaluated" means that, for example, it is not necessary to be close to the measurement subject and evaluation is possible from a distance.

In an optional aspect in which the first pattern is viewable via the second pattern, the region of the sheet of the present disclosure from the first pattern, via the second pattern, to the sheet surface, is typically formed from a clear material. In the present disclosure, "clear material" means that total light transmittance of 300 to 830 nm wavelength light is not less than 30%, and more preferably is not less than 80%. The total light transmittance is a value that is measured using a haze meter (e.g. NDH2000 Haze Meter, manufactured by Nippon Denshoku Industries Co., Ltd., Bunkyo-ku, Tokyo, Japan).

Figure 2A:
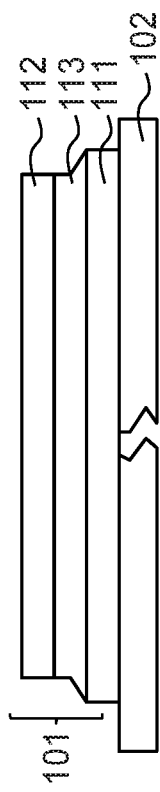
FIGS. 2A and 2B are second drawings illustrating an example of the sheet according to an aspect of the present disclosure.
Figure 2B:
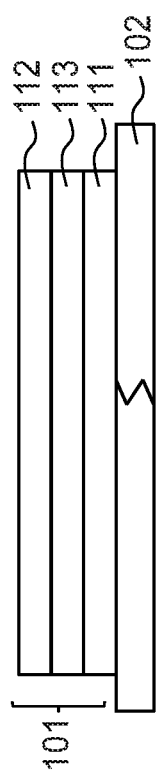
Figure 3B:
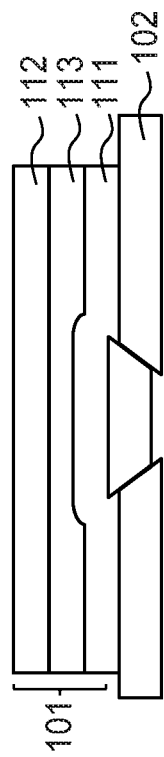
FIGS. 3A and 3B are third drawings illustrating an example of the sheet according to an aspect of the present disclosure.
Figure 3A:
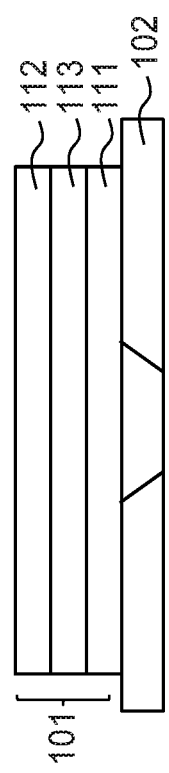

One essential characteristic of the sheet of the present disclosure is that the first pattern becomes strained due to deformation of the deformation following portion, and that the second pattern that the non-deformation following portion has is substantially not affected by the strain in the first pattern, that is, substantially does not become strained. When the sheet has been fixed to a measurement subject, deformation of the measurement subject can be detected in three dimensions by the strain in the first pattern image. That is, deformation in an in-plane direction of the measurement subject such as illustrated in FIGS. 1A and 1B and FIGS. 2A and 2B (FIGS. 1A and 2A illustrate pre-deformation, and FIGS. 1B and 2B illustrate post-deformation), deformation in a thickness direction of the measurement subject such as illustrated in FIGS. 3A and 3B (FIG. 3A illustrates pre-deformation and FIG. 3B illustrates post-deformation), or deformation in a combination thereof cause strain in the first pattern to occur. Moreover, by detecting and analyzing the moire fringes produced by the strain in the first pattern and the unstrained second pattern, deformation that has occurred in the measurement subject can be quantitatively evaluated in three dimensions. Additionally, positions at which the deformation has occurred in the measurement subject can be identified.

When evaluating the deformation in the measurement subject using the sheet of the present disclosure, the moire fringes of the sheet are detected. It is not necessary to bring a device for detecting the moire fringes close to the sheet and, therefore, the sheet of the present disclosure has the advantage of enabling convenient evaluation. In addition, the sheet of the present disclosure is inexpensive and does not require a power source or the like and, therefore, has the advantage of being easily installed.

Any conventionally known patterns used for evaluating deformation by moire fringes can be used as the first pattern and the second pattern. The details of the patterns, for example, the type of pattern shape, pitch, and the like may be appropriately selected depending on the amount of deformation of the target or the like. Examples of the pattern shape include grids, staggered patterns, dots, a plurality of parallel strait lines, and the like. In an illustrative aspect, the first and second patterns can each be a grid having a width of about 0.2 to about 0.4 mm and a pitch of about 0.4 to about 0.8 mm. For example, in a optional application of the sheet of the present disclosure, namely a deformation evaluation of a wall surface of a building, cases are common in which the detection of deformation of a magnitude of, for example, approximately 0.1 to 2.0 mm is desired. A sheet having a size where one side is approximately 100 mm and the pitch is about 0.3 to about 1.0 mm is an example of a pattern shape and pitch suited for such an application.

In a optional aspect, a ratio of the amount of deformation of the non-deformation following portion to 100% of the amount of deformation of the deformation following portion can be about 30% or less, about 20% or less, about 10% or less, or about 0%. In a method for measuring deformation (described later), it is sufficient that the ratio is satisfied at any point in time up until when at least a portion of the sheet breaks. However, in a optional aspect, when the amount of deformation of the deformation following portion is increased from a state of 0 mm, the ratio is satisfied at all points in time until at least a portion of the sheet breaks.

Additionally, in a optional aspect, when the deformation following portion is caused to deform 10 mm, the amount of deformation shown by the non-deformation following portion may be about 3 mm or less, about 2.0 mm or less, about 1.0 mm or less, or about 0 mm.

Each of the deformations is measured by the following method or a method understood by a person skilled in the art as being equivalent thereto.

FIGS. 4A and 4B are drawings explaining a method for measuring the amount of deformation of a non-deformation following portion of the present disclosure. FIG. 4A is a top view and FIG. 4B is a side view. Referring to FIGS. 4A and 4B, the sheet 101 of the present disclosure having a predetermined size (e.g. 100 mm (length)×25 mm (width)) and two rectangular plates 103 (e.g. metal plates such as stainless steel plates) to which the sheet can be fixed are prepared. A deformation following portion 111 side surface of the sheet 101 is fixed on a surface of the plates 103 so as to span the two plates 103 in a length direction L. The fixing is performed using an adhesive or the like. Each of the two plates 103 is gripped by a gripping tool (not illustrated) and the two plates 103 are pulled (as illustrated in FIG. 4B) in directions away from each other (i.e. directions indicated by arrows A in FIG. 4A) at 5 mm/sec by a tensile testing machine (e.g. SHIMADZU AUTOGRAPH AGS-X, manufactured by Shimadzu Corporation, Kyoto, Japan) until a distance between the plates reaches a predetermined distance (e.g. 10 mm). Here, the pulling operations are continued even in cases where, for example, the deformation following portion breaks. A length L1 of the non-deformation following portion 112 side surface of the sheet at this time is measured (measured at the location where the length is the greatest), and the amount of deformation of the non-deformation following portion 112 is found by subtracting a length of the non-deformation following portion 112 prior to the testing (e.g. 100 mm, as described above) from the length L1. The accuracy of the evaluation of the amount of deformation based on the moire fringes produced by the first pattern and the second pattern is considered to be excellent when either the amount of deformation of the non-deformation following portion is about 30% or less of the amount of deformation of the deformation following portion or; the amount of deformation of the non-deformation following portion is about 3 mm or less when the deformation following portion has been deformed 10 mm.

In an illustrative aspect, in cases where the sheet is a single layer, examples of the material of the single layer include polyacrylate and the like. If the single layer is excessively thin, there will be cases where the non-deformation following portion deforms due to the deformation of the deformation following portion. On the other hand, if the single layer is excessively thick, there will be cases where the first pattern and the second pattern will shift depending on the observation angle and, as a result, there will be cases where the visibility of the moire fringes decline. As such, a thickness of the single layer is preferably from about 100 µm to about 1.5 mm, or from about 500 µm to about 1.0 mm. Additionally, it is optional that the single layer have viscosity, elasticity, or viscoelasticity as physical properties. Note that in the present disclosure, "the sheet is a single layer" means that the presence of layers (e.g. an adhesive layer and the like) that substantially do not contribute to the detection of the deformation of the measurement subject is not excluded.

In a optional aspect, the deformation following portion includes a stretchable layer that has the first pattern. In a optional aspect, the non-deformation following portion includes an unstretchable layer that has the second pattern. In a optional aspect, the deformation buffer portion includes a viscoelastic layer. In a optional aspect, the sheet is formed from the stretchable layer, the unstretchable layer, and the viscoelastic layer. However, in this case, the presence of layers (e.g. an adhesive layer and the like) that substantially do not contribute to the detection of the deformation of the measurement subject is not excluded.

In a typical aspect, the stretchable layer and the viscoelastic layer are adhered to each other by the tackiness of the stretchable layer itself, the tackiness of a tacky layer itself, another adhesive layer, or a combination of two or more thereof. Additionally, in a typical aspect, the viscoelastic layer and the unstretchable layer are adhered to each other by the tackiness of a tacky layer itself, the tackiness of the unstretchable layer itself, another adhesive layer, or a combination thereof.

Stretchable Layer

The stretchable layer may be formed by any material that has stretchability sufficient to function as the deformation following portion. In a certain aspect, from the perspective of viewability of the pattern, the stretchable layer is clear. In a optional aspect, the stretchable layer includes at least one type of polymer selected from the group consisting of polyolefins, olefin copolymers, vinyl copolymers, (meth) acrylic polymers, (meth)acrylic copolymers, and polyurethanes. Note that in the present disclosure, "(meth)acrylic" means acrylic or methacrylic.

In a optional aspect, the stretchable layer includes a carboxyl group-containing (meth)acrylic copolymer (A) and an amino group-containing (meth)acrylic copolymer (B) at an (A):(B) mass ratio of about 10:90 to about 90:10. In this case, the stretchable layer can have excellent weather resistance and excellent conformability to an adherend.

In a optional aspect, the carboxyl group-containing (meth) acrylic copolymer (A) may be obtained by copolymerizing a composition including a monoethylenically unsaturated monomer and a carboxyl group-containing unsaturated monomer as main components.

In a optional aspect, the amino group-containing (meth) acrylic copolymer (B) may be obtained by copolymerizing a composition including a monoethylenically unsaturated monomer and an amino group-containing unsaturated monomer as main components.

The copolymerization of each of the carboxyl group-containing (meth)acrylic copolymer (A) and the amino group-containing (meth)acrylic copolymer (B) is preferably performed by radical polymerization. In this case, solution polymerization, suspension polymerization, emulsion polymerization, bulk polymerization, or a similar known polymerization method can be used. Examples of polymerization initiators that can be used include organic peroxides such as benzoyl peroxide, lauroyl peroxide, and bis(4-tertiary-butylcyclohexyl) peroxydicarbonate, and azo-based polymerization initiators including 2,2'-azobis-isobutyronitrile, 2,2'-azobis-2-methylbutyronitrile, 4,4'-azobis-4-cyanovaleric acid, dimethyl 2,2'-azobis(2-methylpropionate), azobis-2,4-dimethylvaleronitrile (AVN), and the like. An amount of the polymerization initiator used may be from about 0.05 to about 5 parts by mass per 100 parts by mass of the monomer blend.

In the stretchable layer, the Tg of one of the carboxyl group-containing (meth)acrylic copolymer (A) and the amino group-containing (meth)acrylic copolymer (B) is preferably set to 0° C. or higher, and the other is preferably set to 0° C. or lower. This is because the (meth)acrylic copolymer that has the high Tg provides high tensile strength to the stretchable layer, and the (meth)acrylic copolymer that has the low Tg provides the stretchable layer with excellent elongation characteristics.

In a optional aspect, a weight-average molecular weight of each of the carboxyl group-containing (meth)acrylic copolymer (A) and the amino group-containing (meth) acrylic copolymer (B) is about 10,000 or greater, about 50,000 or greater, or about 100,000 or greater and is about 10,000,000 or less or about 1,000,000 or less.

In a optional aspect, examples of the monoethylenically unsaturated monomer include monomers expressed by general formula $CH_2=CR_1COOR_2$ (wherein $R_1$ is hydrogen or a methyl group and $R_2$ is a straight or branched alkyl group, phenyl group, alkoxyalkyl group, or phenoxyalkyl group); aromatic vinyl monomers such as styrene, α-methyl styrene, and vinyl toluene; and vinyl esters such as vinyl acetate. Examples of such monomers that can be used include methyl (meth)acrylate, ethyl (meth)acrylate, n-butyl (meth) acrylate, isoamyl (meth)acrylate, n-hexyl (meth) acrylate, 2-ethylhexyl (meth)acrylate, isooctyl (meth)acrylate, isononyl (meth)acrylate, decyl (meth)acrylate, dodecyl (meth)acrylate, phenoxyethyl (meth)acrylate and other phenoxyalkyl (meth)acrylates, methoxypropyl (meth)acrylate, 2-methoxybutyl (meth)acrylate, and other alkoxyalkyl (meth)acrylates, and the like. One or two or more kinds of monoethylenically unsaturated monomers can be used depending on the purpose in order to obtain the desired glass transition temperature, tensile strength, and elongation characteristics.

For example, the (meth)acrylic copolymer with a Tg of 0° C. or higher can easily be obtained by copolymerizing a composition including, as a main component, a (meth) acrylic monomer such as methyl methacrylate (MMA), or n-butyl methacrylate (BMA) which, when polymerized alone, has a homopolymer with a Tg of 0° C. or higher.

Additionally, the (meth)acrylic copolymer with a Tg of 0° C. or lower can easily be obtained by copolymerizing a composition including, as a main component, a component such as ethyl acrylate (EA), n-butyl acrylate (BA), or 2-ethylhexyl acrylate (2EHA) which, when polymerized alone, has a homopolymer with a Tg of 0° C. or lower.

Here, the glass transition temperatures (Tg) of the carboxyl group-containing (meth)acrylic copolymer (A) and the amino group-containing (meth)acrylic copolymer (B) are found through the FOX equation (the following equation), where each polymer is copolymerized from n types of monomers.

$$1/Tg = X_1/(Tg_1+273.15) + X_2/(Tg_2+273.15) + \ldots + X_n/(Tg_n+273.15)$$

($Tg_1$: Glass-transition point of homopolymer of component 1;
$Tg_2$: Glass-transition point of homopolymer of component 2;
$X_1$: Weight fraction of monomer of component 1 added when polymerizing
$X_2$: Weight fraction of monomer of component 2 added when polymerizing
$X_1+X_2+\ldots+X_n=1$)

Examples of the carboxyl group-containing unsaturated monomer that is copolymerized with the monoethylenically unsaturated monomer described above to form the carboxyl group-containing (meth)acrylic copolymer include acrylic acid, methacrylic acid, maleic acid, itaconic acid, ω-carboxy polycaprolactone monoacrylate, phthalic acid mono hydroxyethyl (meth)acrylate, β-carboxyethyl acrylate, 2-(meth)acryloyloxyethyl succinate, and 2-(meth) acryloyloxyethyl hexahydrophthalic acid.

The carboxyl group-containing (meth)acrylic copolymer preferably is obtained by copolymerizing a composition including the monoethylenically unsaturated monomer as a main component (specifically, in a range of from about 80 to about 95.5 parts by mass), and the carboxyl group-containing unsaturated monomer in a range of from about 0.5 to about 20 parts by mass.

Examples of the amino group-containing unsaturated monomer that is copolymerized with the monoethylenically unsaturated monomer described above to form the amino group-containing (meth)acrylic copolymer include monomers having a tertiary amino group, represented by N,N-dimethylaminoethyl acrylate (DMAEA), N,N-dimethylaminoethyl methacrylate (DMAEMA), and other dialkylaminoalkyl (meth)acrylates; N,N-dimethylaminopropyl acrylamide (DMAPAA), N,N-dimethylaminopropyl methacrylamide, and other dialkylaminoalkyl (meth)acrylamides; and vinyl imidazole and other vinyl monomers having nitrogen-containing heterocyclic rings.

The amino group-containing (meth)acrylic polymer preferably is obtained by copolymerizing a composition including the monoethylenically unsaturated monomer as a main component (specifically, in a range of from about 80 to about 95.5 parts by mass), and the amino group-containing unsaturated monomer in a range of from about 0.5 to about 20 parts by mass.

After individually copolymerizing the carboxyl group-containing (meth)acrylic copolymer and the amino group-containing (meth)acrylic copolymer in the manners described above, the stretchable layer can be formed through a normal film forming method. For example, the stretchable layer can be formed by blending a solution of these polymers, coating the solution on a release surface of a liner, and drying/solidifying the solution. Ordinary coaters can be used as the coating apparatus, and examples thereof include bar coaters, knife coaters, roll coaters, die coaters, and the like. The solidification operation is the same as a drying operation in the case of a coating material including a volatile solvent, or a cooling operation of a melted resin component. Additionally, the stretchable layer can be formed through a melt extrusion molding method.

In the forming of the stretchable layer, a stretchable layer that has the desired tensile strength and elongation characteristics can be obtained by changing the compounding ratio of the carboxyl group-containing (meth)acrylic copolymer and the amino group-containing (meth)acrylic copolymer. Specifically, of the carboxyl group-containing (meth)acrylic copolymer and the amino group-containing (meth)acrylic copolymer, the compounding ratio of the polymer with the relatively high Tg to the polymer with the relatively low Tg can be set to from about 10:90 to about 90:10, from about 20:80 to about 90:10, or from about 30:70 to about 90:10. In a optional aspect, an amount of the copolymer with the relatively high Tg is greater than an amount of the copolymer with the relatively low Tg.

In a optional aspect, the stretchable layer further includes a crosslinking agent that has a functional group that reacts with carboxyl groups (C) in addition to the carboxyl group-containing (meth)acrylic copolymer (A) and the amino group-containing (meth)acrylic copolymer (B). The crosslinking agent contributes to the crosslinking of the carboxyl group-containing (meth)acrylic copolymer (A) and the amino group-containing (meth)acrylic copolymer (B). A net structure is formed by the crosslinking and, as a result, the elongation characteristics of the stretchable layer at low temperatures are further improved. Advantageously, the crosslinking agent has a functional group that can react with caboxyl groups and specific examples thereof include bisamide-based crosslinking agents (e.g. RD1054, manufactured by 3M), aziridine-based crosslinking agents (e.g. CHEMITITE PZ33, manufactured by Nippon Shokubai Co., Ltd.; NeoCry 1CX-100, manufactured by Avecia), carbodiimide-based crosslinking agents (Carbodilite V-03, V-05, and V-07, manufactured by Nisshinbo Holdings Inc.), epoxy-based crosslinking agents (E-AX, E-5XM, and ESC, manufactured by Soken Chemical & Engineering Co., Ltd.), and the like. An amount of the crosslinking agent used is from about 0.1 to about 5 parts by mass per 100 parts by mass of the carboxyl group-containing (meth)acrylic copolymer (A).

The stretchable layer may, as desired, further include one or more types of various additives. Examples of the additives include antioxidants, ultraviolet absorbers, light stabilizers, plasticizers, lubricants, antistatic agents, flame retardants, fillers, and the like.

In a optional aspect, the stretchable layer has strength whereby breakage does not occur in cases of deformation of, for example, a magnitude of a few mm. From this perspective, the stretchable layer preferably has a tensile strength of about 100 MPa or less. Additionally, from this perspective, a thickness of the stretchable layer may, for example, be from about 10 to about 150 µm or from about 30 to about 100 µm.

In a optional aspect, the stretchable layer has a first and a second main surface, and has the first pattern on the first main surface. The first pattern is, for example, a print layer. The stretchable layer that has the print layer can be formed, for example, by a method in which a desired pattern is directly printed on a surface of an stretchable film formed from polymers such as those described above, a method in which a print layer that has a desired pattern and is formed on a substrate is transferred to a stretchable film, or a similar method. The printing can be performed by ink jet printing, gravure printing, letterpress printing, flexo printing, screen printing, electrostatic copying, sublimation heat dissipation transferring, or the like. In an illustrative aspect, the stretchable layer and the viscoelastic layer are fixed to each other such that the first main surface described above faces the viscoelastic layer. Such a configuration is advantageous because the first pattern is protected by the viscoelastic layer and is not prone to being damaged. In another illustrative aspect, the second main surface described above may face the viscoelastic layer. In this case, the first pattern may be protected by a coating layer or the like.

Unstretchable Layer

The unstretchable layer may be formed by any material that has unstretchability sufficient to function as the non-deformation following portion. From the perspective of viewability of the pattern, the unstretchable layer is typically clear.

In a optional aspect, the unstretchable layer includes at least one type of polymer selected from the group consisting of polyester, polyolefin, and polyvinyl. The unstretchable layer typically is a hard film. A commercially available product may be used as the hard film, and examples thereof include polyester, polyolefin, polyvinyl, polystyrene, polyacrylates, polymethacrylates, polyimides, polyurethanes, polyimides, polyamides, polysulfones, polyethers, polyacetals, polyphenylene, poly epoxy resins, phenol resins, nylon, polycarbonate, and the like.

In a typical aspect, there are cases where the unstretchable layer is exposed in the environment when in use. As such, it is optional that the unstretchable layer have excellent weather resistance. From this perspective, the unstretchable layer is preferably polyester.

In a typical aspect, the unstretchable layer has strength sufficient to ensure that the unstretchable layer substantially does not deform when deformation occurs in the stretchable layer. From this perspective, the unstretchable layer preferably has a tensile strength of about 50 MPa or greater. Additionally, from this perspective, a thickness of the unstretchable layer may, for example, be from about 10 to about 150 µm or from about 50 to about 100 µm.

In a optional aspect, the unstretchable layer has a first and a second main surface, and has the second pattern on the first main surface. The second pattern is, for example, a print layer. The unstretchable layer that has the print layer can be formed, for example, by a method in which a desired pattern is directly printed on a surface of an unstretchable film, a method in which a print layer that has a desired pattern and is formed on a substrate is transferred to an unstretchable film, or a similar method. The printing can be performed by ink jet printing, gravure printing, letterpress printing, flexo printing, screen printing, electrostatic copying, sublimation heat dissipation transferring, or the like. In an illustrative aspect, the unstretchable layer and the viscoelastic layer are fixed to each other such that the first main surface described above faces the viscoelastic layer. Such a configuration is advantageous because the second pattern is protected by the viscoelastic layer and is not prone to being damaged. In another illustrative aspect, the second main surface described above may face the viscoelastic layer. In this case, the second pattern may be protected by a coating layer or the like.

Viscoelastic Layer

In the present disclosure, the viscoelastic layer has the ability to mitigate the deformation of the deformation following portion through elastic deformation action, and can be formed from any viscoelastic material that has deformation buffering capacity sufficient to ensure that the non-deformation following portion substantially does not deform as a result of the deformation of the deformation following portion. From the perspective of viewability of the pattern, the viscoelastic layer is typically clear.

In a optional aspect, the viscoelastic layer includes at least one type of polymer selected from the group consisting of polyolefin and olefin copolymers (hereinafter, also collectively referred to as "olefin (co)polymers"), vinyl copolymers (e.g. vinyl chloride polymers and the like), (meth) acrylic polymers and (meth)acrylic copolymers (hereinafter, also collectively referred to as "(meth)acrylic (co)polymers"; e.g., poly(meth)acrylate, copolymers of acrylic acid and acrylamide, and the like), polyurethanes (e.g. polyether urethanes, polyester urethanes, and the like), and silicone polymers (e.g. methyl vinyl silicone and the like). Additionally, the viscoelastic layer may be a rubber layer, and examples of the rubber include butane-based rubbers, butyl-based rubbers, and the like.

Examples of the raw material monomer of the (meth) acrylic (co)polymer include a (meth)acrylic monomer having straight or branched alkyl groups with 14 to 22 carbons (hereinafter, also referred to as "C14-22 (meth)acrylic monomer"), and examples thereof include isostearyl (meth) acrylate, cetyl (meth)acrylate, n-stearyl (meth)acrylate, n-behenyl (meth)acrylate, isomyristyl (meth)acrylate, isopalmityl (meth)acrylate, and the like.

The raw material monomer may include a carboxyl group-containing monomer such as an unsaturated monocarboxylic acid (e.g., acrylic acid, methacrylic acid, and the like), an unsaturated dicarboxylic acid (e.g., maleic acid, itaconic acid, and the like), ω-carboxy polycaprolactone monoacrylate, phthalic acid monohydroxyethyl (meth)acrylate, β-carboxyethyl acrylate, 2-(meth)acryloyloxyethyl succinate, 2-(meth)acryloyloxyethyl hexahydrophthalic acid, and the like.

For example, in cases where the raw material monomer includes the C14-22 (meth)acrylic monomer and the carboxyl group-containing monomer, a composition thereof can be set to from about 5 to about 8 mass % of the carboxyl group-containing monomer to from about 92 to about 95 mass % of the C14-22 monomer. It is advantageous that an amount of the carboxyl group-containing monomer be greater than or equal to about 5 mass %, because a shear storage modulus G' of the viscoelastic layer will be great and cohesive force will be excellent. Additionally, it is advantageous in terms of deformation buffer performance as a loss tangent tan δ will be large. On the other hand, it is advantageous that the amount of the carboxyl group-containing monomer be less than or equal to 8 mass %, because temperature dependency of the deformation buffer performance will be small.

Examples of the olefin (co)polymers include saturated polyolefins, that is, polyolefins that are substantially free of double bonds and triple bonds between the carbons. For example, it is optional that 90% or more of the bonds between the carbons included in the saturated polyolefins be single bonds. Examples of the saturated polyolefins include polyethylene, polybutene, polypropylene, polyisobutylene, poly-α-olefin, ethylene-propylene copolymer, ethylene-α-olefin copolymer, propylene-α-olefin copolymer, hydrogenated polybutadiene, and the like. A single type of saturated polyolefin may be used or a combination of two or more types may be used.

A noncrystalline polymer may be used for the saturated polyolefin. Here, "noncrystalline polymer" refers to a polymer for which a degree of crystallinity is extremely low or a crystalline state is impossible. With noncrystalline polymers, the glass transition temperature is measured, but the melting point is not measured. In cases where a noncrystalline polymer is used, the shear storage modulus G' at from 0 to 40° C. of the viscoelastic layer is adjusted to, for example, from $1.5 \times 10^4$ to $5.0 \times 10^6$ Pascals (Pa). As a result, excellent deformation buffering performance can be obtained and also the viscoelastic layer can be adhered to the other layers in an excellent manner.

Additionally, a block copolymer including a saturated polyolefin block and an aromatic vinyl monomer block (hereinafter, "block copolymer") can also be used. This block copolymer includes a block formed from polyolefins that are substantially free of double bonds and triple bonds between the carbons and a block formed from aromatic vinyl monomers. It is optional that 90% or more of the bonds between the carbons included in the saturated polyolefin block be single bonds. Examples of the aromatic vinyl monomers include styrene, p-methyl styrene, α-methyl styrene, indene, and the like. A single type may be used or a combination of two or more types may be used. Examples of the block copolymer include styrene-ethylene-propylene-styrene block copolymer, styrene-ethylene-propylene block copolymer, styrene-ethylene-butylene-styrene block copolymer, and the like.

A noncrystalline substance may be used for the saturated polyolefin block. In cases where a noncrystalline substance is used, the shear storage modulus G' at from 0 to 40° C. of the viscoelastic layer is adjusted to, for example, from about $1.5 \times 10^4$ to about $5.0 \times 10^6$ Pascals (Pa). As a result, excellent deformation buffering performance can be obtained and also the viscoelastic layer can be adhered to the other members in an excellent manner.

A compounding ratio of the saturated polyolefin and/or the block copolymer can be set to from about 2 to about 40 parts by mass per 100 parts by mass of the (meth)acrylic (co)monomer. If the compounding ratio is higher than or equal to about 2 parts by mass, the obtained viscoelastic layer will have low temperature dependency, and if the compounding ratio is lower than or equal to 40 parts by mass, weather resistance will be excellent, and it will be advantages in terms of reliability over extended periods of use and adhesion to other members.

Weight-average molecular weight of the (meth)acrylic (co)polymer can be set to a range of from about 10,000 to about 2,000,000. This range is advantageous because the obtained viscoelastic layer will be advantageous in reliability over extended periods of use.

In addition to the polymers described above, the viscoelastic layer may also include a tackifying resin such as rosin-based resin, modified rosin-based resin (hydrogenated rosin-based resins, disproportionated rosin-based resin, polymerized rosin-based resins), terpene resin, terpene phenol resin, aromatic modified terpene resin, $C_5$-based and $C_9$-based petroleum resins, coumarone resin, and the like. Additionally, additives that are ordinarily used may be included, examples thereof including thickeners, thixotropic agents, bulking agents, fillers, and the like.

More specific examples of viscoelastic materials that can be used in the viscoelastic layer are described in, for example, Japanese Unexamined Patent Application Publication No. 2009-249485A and Japanese Unexamined Patent Application Publication No. 2006-28224A.

If the viscoelastic layer is excessively thin, there will be cases where the unstretchable layer deforms due to the deformation of the stretchable layer. On the other hand, if the viscoelastic layer is excessively thick, there will be cases where the first pattern and the second pattern will shift depending on the observation angle and, as a result, there will be cases where the visibility of the moire fringes decline. In a optional aspect, a thickness of the viscoelastic layer is from about 100 μm to about 1.5 mm, or from about 500 μm to about 1.0 mm.

Additional Layers

In addition to the stretchable layer, the unstretchable layer, and the viscoelastic layer, the sheet may further include additional layers, such as the adhesive layer described above. Typically, the adhesive layer is a pressure sensitive adhesive layer containing an adhesive polymer, and examples thereof include a single-layered pressure sensitive adhesive film and a double-sided adhesive sheet having two pressure sensitive adhesive layers.

The adhesive layer can, for example, be formed from a coating film of an adhesive containing an adhesive polymer. Preferably, the adhesive contains an adhesive polymer and a crosslinking agent for crosslinking the adhesive polymer. In the present disclosure, "adhesive polymer" is defined as a polymer that exhibits adhesion at room temperature (about 25° C.). Examples of the adhesive polymer include acrylic polymers, polyurethanes, polyolefins, polyesters, and the like.

Characteristics of the Sheet

In a optional aspect, when the sheet is subjected to tensile testing, the stretchable layer exhibits tensile strength of greater than or equal to 0.5 MPa and less than or equal to 100 MPa, and elongation of greater than or equal to 3% and less than or equal to 200%. In a optional aspect, when the sheet is subjected to tensile testing, the unstretchable layer exhibits tensile strength of greater than or equal to 50 MPa and less than or equal to 350 MPa, and elongation of greater than or equal to 1% and less than or equal to 200%. In a optional aspect, when the sheet is subjected to tensile testing, the viscoelastic layer exhibits tensile strength of greater than or equal to 0.01 MPa and less than or equal to 100 MPa and elongation of greater than or equal to 10% and less than or equal to 3000%.

The tensile strength and the elongation are measured under the following conditions in accordance with the method stipulated in JIS K 6251 (2010 edition, ISO37).

Measurement sample shape: Dumbbell No. 3 as described in JIS K 6251
Tension rate: 300 mm/min
Measurement temperature: 23±1° C.

A tensile strength T (unit: MPa) is found by measuring a maximum tensile force F (unit: N) until reaching breakage of the layers of the measurement sample and a cross-section area A (unit: mm$^2$) of the layers of the measurement sample, and solving the following equation.

$$T=F/A$$

An elongation E (unit: %) is found by measuring a distance between gauge lines L1 (unit: mm) at a time of breakage of the layers in the measurement sample and a distance between gauge lines L0 (25 mm), and solving the following equation.

$$E=(L1-L0)/L0\times100$$

When subjecting the sheet of the present disclosure to the tensile testing described above, normally, the layers sequentially break, and in an illustrative aspect, the unstretchable layer, the viscoelastic layer, and the stretchable layer break in that order. Accordingly, in the method described above, influences by the other layers are included in the values measured as the tensile strength and the elongation of each layer. However, in the present disclosure, such measurement values are defined as the tensile strength and the elongation of each layer in the sheet.

In a optional aspect, when only the stretchable layer of the sheet is pulled in the sheet in-plane direction, the stretchable layer breaks before the unstretchable layer breaks. This can be confirmed in the method for measuring an amount of deformation described above while referring to FIGS. 4A and 4B due to the fact that the stretchable layer breaks before the unstretchable layer breaks.

Additionally, in a optional aspect, at a time of breakage of the stretchable layer described above, the elongation of the unstretchable layer is from 0 to 35% of the elongation of the stretchable layer. This ratio can be evaluated in the method for measuring an amount of deformation described above while referring to FIGS. 4A and 4B as a ratio between the elongation of the stretchable layer and the elongation of the unstretchable layer at the time of breakage of the stretchable layer. This ratio contributes to a highly accurate evaluation of the amount of deformation of the measurement subject using the moire fringes.

In a optional aspect, the deformation following portion side surface of the sheet has adhesiveness with respect to the measurement subject. This adhesiveness can be imparted by the tackiness of the deformation following portion (e.g. the stretchable layer) itself or by another adhesive layer. A optional aspect of the adhesive layer is as mentioned above. The adhesion characteristics of the deformation following portion side surface of the sheet are defined as adhesive force to a mortar plate in accordance with JIS K 5600 (ISO 2409), and an example thereof is about 1.0 N/cm$^2$ or greater in a shearing direction. Such adhesion characteristics are advantageous because the sheet can be excellently fixed to the measurement subject in cases where the measurement subject is, for example, concrete, metal, or the like.

In an optional aspect, the sheet of the present disclosure is formed from a material that is clear in all regions, with the exception of the first and second patterns.

Aspects of the First Pattern and the Second Pattern

Figure 5A:
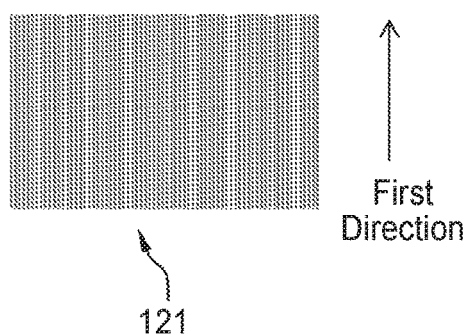
FIG. 5A is a plan view of a deformation following portion.
Figure 5B:
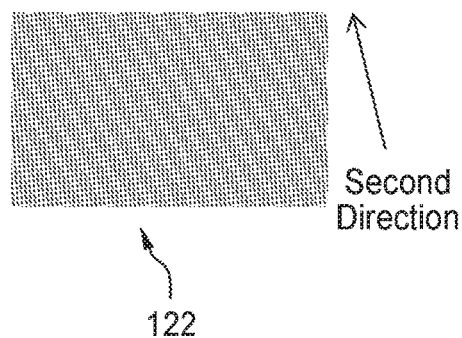
FIG. 5B is a plan view of the non-deformation following portion.
Figure 5C:
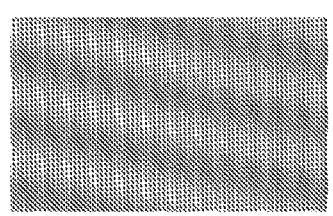
FIG. 5C is a plan view of the sheet in which the non-deformation following portion is overlaid on the deformation following portion.
Figure 5D:
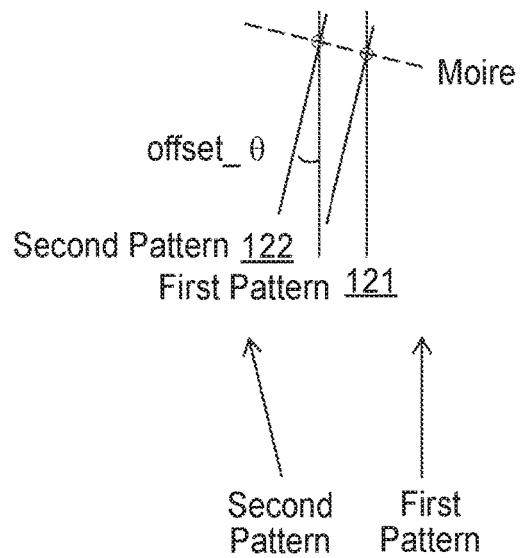
FIG. 5D is a partially exploded view of FIG. 5C.

FIG. 5A is a plan view of the deformation following portion 111; FIG. 5B is a plan view of the non-deformation following portion 112; FIG. 5C is a plan view of the sheet 101 in which the non-deformation following portion 112 is overlaid on the deformation following portion 111; and FIG. 5D is a partially exploded view of FIG. 5C.

A first pattern 121 that includes a plurality of straight lines extending in a first direction is formed on a first main surface of the deformation following portion 111; and a second pattern 122 that includes a plurality of straight lines extending in a second direction different than the first direction is formed on a first main surface of the non-deformation following portion 112. That is, the first pattern 121 and the second pattern 122 are formed such that an angle between the first direction in which the straight lines included in the first pattern 121 extend and the second direction in which the straight lines included in the second pattern 122 extend is a fixed offset angle offset_$\theta$.

FIG. 6A is a partially exploded plan view of the sheet 101 before the deformation following portion 111 deforms; and FIG. 6B is a partially exploded plan view of the sheet 101 after the deformation following portion 111 has deformed.

A pitch of the straight lines included in each of the first pattern 121 and the second pattern 122 before the deformation following portion 111 deforms is referred to as pitch. The pitch of the straight lines included in the first pattern 121 after the deformation following portion 111 has deformed changes to pitch+$\Delta$pitch_st. The non-deformation following portion 112 does not deform and, therefore, even after the deformation following portion 111 has deformed, the pitch of the straight lines included in the first pattern 121 is maintained as pitch.

A pitch of the moire before the deformation following portion 111 deforms is referred to as a first pitch moire_pitch1, and an angle of inclination between a third direction orthogonal to the first direction of the moire before the deformation following portion 111 deforms and the extending direction of the moire is referred to as a first angle of inclination moire_$\theta$1. A pitch of the moire after the deformation following portion 111 has deformed is referred to as a second pitch moire_pitch2, and an angle of inclination between the third direction after the deformation following portion 111 has deformed and the extending direction of the moire is a second angle of inclination moire_$\theta$2.

Deformation Testing of the Sheet According to the Embodiment

Figure 7A:
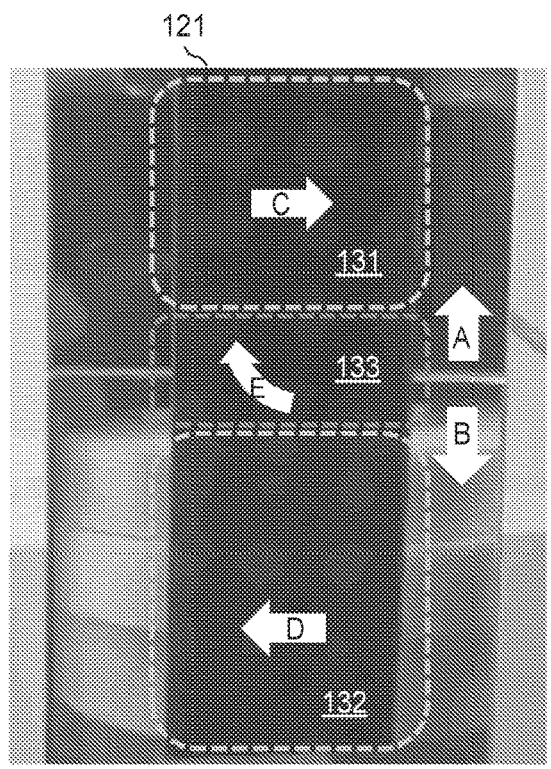
FIG. 7A is a plan view of the sheet according to an embodiment, that has been subjected to deformation testing.
Figure 7B:
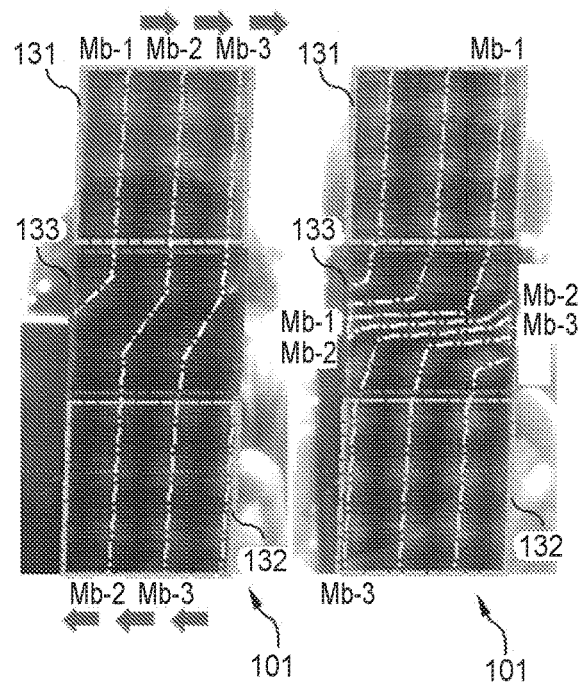
FIG. 7B is a drawing illustrating a change in the form of the moire, caused by the deformation of a pitch change region of the sheet of FIG. 7A.

FIG. 7A is a plan view of the sheet according to an embodiment that has been subjected to deformation testing; and FIG. 7B is a drawing illustrating a change in the form of the moire, caused by the deformation of a pitch change region of the sheet of FIG. 7A. The left drawing of FIG. 7B illustrates a first change state in which the pitch change region of the sheet has been stretched, and the right drawing of FIG. 7B illustrates a second change state in which the pitch change region of the sheet has been further stretched, more than in the first change state of the sheet.

In the deformation testing, in the sheet 101, a first pitch constant region 131 where the shape of the sheet does not deform due to being fixed is moved in a direction indicated by an arrow A, and a second pitch constant region 132 where the shape of the sheet does not deform due to being fixed is moved in a direction indicated by an arrow B. A pitch change region 133 positioned between the first pitch constant region 131 and the second pitch constant region 132 is stretched due to the first pitch constant region 131 and the second pitch constant region 132 being moved in the directions of the arrow A and the arrow B, respectively.

Due to the stretching of the pitch change region 133 as indicated by an arrow C in FIG. 7A, the moire produced in the first pitch constant region 131 moves to the right side while constantly maintaining the pitch. On the other hand, due to the stretching of the pitch change region 133 as indicated by an arrow D in FIG. 7A, the moire produced in the second pitch constant region 132 moves to the left side while constantly maintaining the pitch. That is, due to the stretching of the pitch change region 133, moires Mb-1 to Mb-3 of FIG. 7B move to the right side while constantly maintaining the pitch in the first pitch constant region 131, and move to the left side while constantly maintaining the pitch in the second pitch constant region 132. An amount of movement of the moire of the first pitch constant region 131 and the second pitch constant region 132 correlates to the amount of deformation of the pitch change region 133 and, therefore, it is possible to estimate the amount of deformation of the pitch change region 133 from the amount of movement of the moire of the first pitch constant region 131 and the second pitch constant region 132.

Due to the stretching of the pitch change region 133, the pitch of the moire produced in the pitch change region 133 gradually narrows and, as indicated by an arrow E in FIG. 7A, the moire rotates in the clockwise direction. That is, due to the stretching of the pitch change region 133, the pitch of the moire Mb-1 to Mb-3 of FIG. 7B becomes narrow and the moire Mb-1 to Mb-3 rotate in the clockwise direction in the pitch change region 133. An amount of change of the pitch of the moire of the pitch change region 133 correlates to the amount of deformation of the pitch change region 133 and, therefore, it is possible to calculate the amount of deformation of the pitch change region 133 from the amount of change of the pitch of the moire of the pitch change region 133. Additionally, an amount of change of the angle of inclination of the moire of the pitch change region 133 correlates to the amount of deformation of the pitch change region 133 and, therefore, it is possible to calculate the amount of deformation of the pitch change region 133 from the amount of change of the angle of inclination of the moire of the pitch change region 133.

Figure 8:
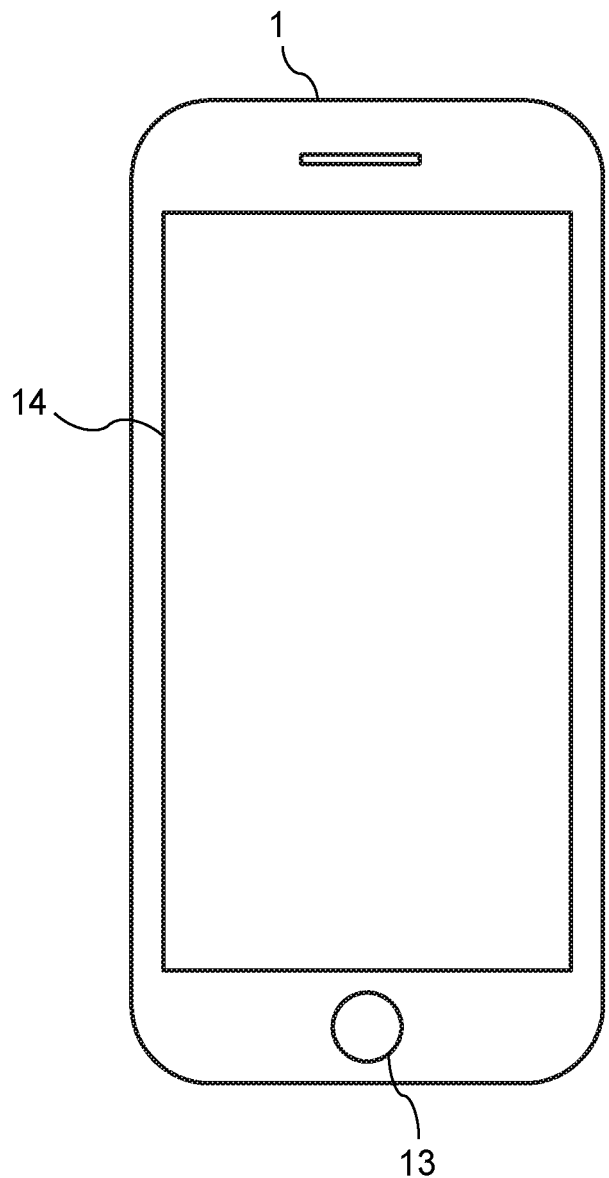
FIG. 8 is a front view of a deformation amount measuring device according to a first embodiment.
Figure 9:
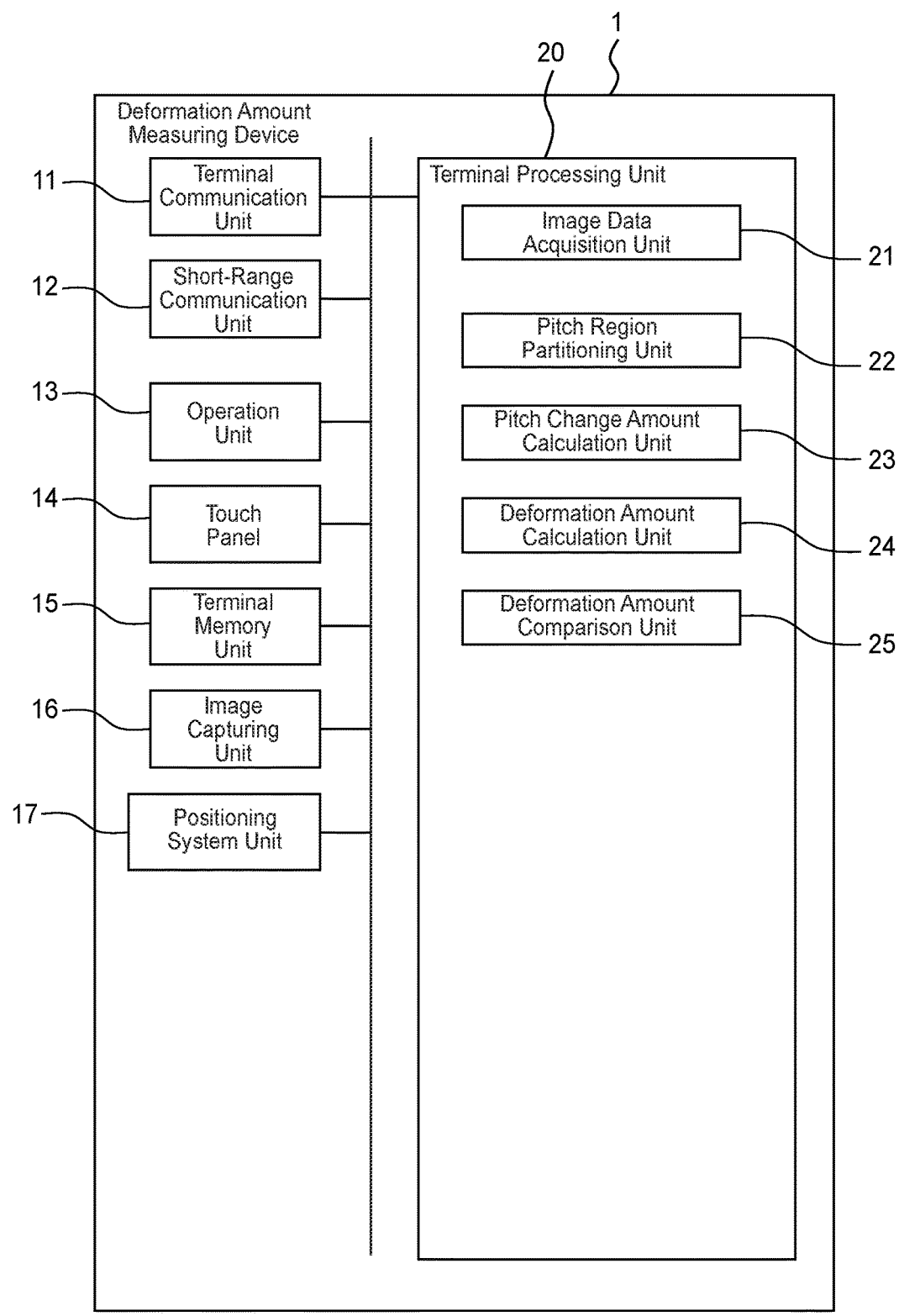
FIG. 9 is a block diagram of the deformation amount measuring device depicted in FIG. 8.

Configuration and Function of the Deformation Amount Measuring Device According to a First Embodiment FIG. 8 is a front view of a deformation amount measuring device according to a first embodiment; and FIG. 9 is a block diagram of the deformation amount measuring device according to the first embodiment.

The deformation amount measuring device 1 is a multi-functional mobile phone (i.e. a smartphone), and is capable of executing connection to a wireless communication network, short-range communication, predetermined application programs, and the like. As such, the deformation amount measuring device 1 includes a terminal communication unit 11, a short-range communication unit 12, an operation unit 13, a touch panel 14, a terminal memory unit 15, an image capturing unit 16, a positioning system unit 17, and a terminal processing unit 20. Note that the deformation amount measuring device 1 may be any communication device that has communication functions and, for example, may be a terminal device such as a personal digital assistant (PDA), a mobile gaming device, a portable music player, or a tablet computer.

The terminal communication unit 11 is provided with a communication interface circuit that includes an antenna designed to primarily operate in the 2.1 GHz receiving band, and connects the deformation amount measuring device 1 to a communication network. The terminal communication unit 11 establishes a code division multiple access (CDMA) or similar wireless signal line with a base station (not illustrated) on a channel allocated by the base station. Moreover, the terminal communication unit 11 supplies data received from the base station to the terminal processing unit 20. Additionally, the terminal communication unit 11 sends data supplied from the terminal processing unit 20 to the base station. Note that the terminal communication unit 11 preforms data communication with a server (not illustrated) in accordance with hypertext transfer protocol (HTTP).

Additionally, the terminal communication unit 11 is provided with a communication interface circuit that includes an antenna designed to primarily operate in the 2.4 GHz receiving band, and that bypasses the base station and performs wireless communication via Wi-Fi® or a similar a wireless LAN base station.

The short-range communication unit 12 is provided with an interface circuit for performing short-range wireless communication in accordance with Bluetooth LE (Low Energy)® or a similar communication system, and performs short-range wireless communication with other terminal devices and the like. Moreover, the short-range communication unit 12 supplies data received from the other terminal devices and the like to the terminal processing unit 20. Additionally, the short-range communication unit 12 sends data supplied from the terminal processing unit 20 to the other terminal devices and the like. Note that the short-range communication unit 12 may be provided with an interface circuit for performing short-range wireless communication in accordance with Bluetooth®, Radio Frequency Identification (RFID), ZigBee or a similar communication system.

The operation unit 13 may be any device provided that operation of the deformation amount measuring device 1 is possible, and examples thereof include keyboards and the like. A user can use this device to input characters, numbers, and the like. The operation unit 13 receives commands from the user, generates signals corresponding to the received commands, and outputs the signals to the terminal processing unit 20.

The touch panel 14 may be any device, provided that output of moving images, still images, and the like is possible, and examples thereof include touch panel display devices. The touch panel 14 displays moving images corresponding to moving image data, still images corresponding to still image data, and the like supplied from the terminal processing unit 20. The touch panel 14 receives commands of the user by tapping, dragging, flicking, or other contact, generates signals corresponding to the received commands, and outputs the signals to the terminal processing unit 20.

The terminal memory unit 15 is provided with, for example, semiconductor memory. The terminal memory unit 15 stores driver programs, operating system programs, application programs, data, and the like used in the processing by the terminal processing unit 20. For example, as driver programs, the terminal memory unit 15 stores a mobile phone communication device driver program and a wireless LAN communication device driver program for controlling the terminal communication unit 11. Additionally, the terminal memory unit 15 stores a short-range wireless communication device driver program for controlling the short-range communication unit 12, an input device driver program for controlling the operation unit 13, an output device driver program for controlling the touch panel 14, and the like. Additionally, as operating system programs, the terminal memory unit 15 stores a connection control program for executing a short-range wireless communication system of the Bluetooth LE® standard, a connection control program for mobile phones and wireless LANs, and the like. Additionally, as application programs, the terminal memory unit 15 stores various programs including web browser programs for acquiring and displaying web pages. The computer programs may be installed to the terminal memory unit 15 using a known setup program or the like, from a computer-readable portable recording medium such as semiconductor memory that includes flash memory or the like.

Additionally, as data, the terminal memory unit 15 stores information and data used in image capture processing and deformation amount measuring processing, and data required for image capture processing and deformation amount measuring processing. Furthermore, the terminal memory unit 15 may temporarily store temporary data pertaining to a predetermined processing.

The image capturing unit 16 is provided with imaging elements disposed in an array, and an element driver for driving the imaging elements. The imaging elements include a charge-coupled device (CCD) sensor or an active pixel sensor (APS), and a color filter, and accumulate charge corresponding to incident light. The element driver converts the charges accumulated in each of the imaging elements into electrical signals and outputs these electrical signals to the terminal processing unit 20.

The positioning system unit 17 measures a position where the deformation amount measuring device 1 exists, in accordance with commands from the terminal processing unit 20. The positioning system unit 17 includes an antenna designed to primarily operate in the 1.5 GHz receiving band, and receives GPS signals from a GPS satellite (not illustrated). The positioning system unit 17 decodes the GPS signals and acquires time information and the like. Moreover, the positioning system unit 17 calculates a pseudo-distance from the GPS satellite to the positioning system unit 17 on the basis of the time information and the like, determines the position (latitude, longitude, altitude, and the like) where the deformation amount measuring device 1 exists by solving a system of equations obtained by substituting the pseudo-distance, and outputs the position as position information.

The terminal processing unit 20 is provided with one or a plurality of processors and peripheral circuits thereof. The terminal processing unit 20 integrally controls the overall operations of the deformation amount measuring device 1 and, for example, is a central processing unit (CPU). The terminal processing unit 20 controls the operations of the terminal communication unit 11, the short-range communication unit 12, and the like so that the various processes of the deformation amount measuring device 1 are executed with appropriate procedures corresponding to the programs stored in the terminal memory unit 15, the operations of the operation unit 13 and the touch panel 14, and the like. The terminal processing unit 20 executes processing on the basis of the programs (the driver programs, the operating system programs, the application programs, and the like) stored in the terminal memory unit 15. Additionally, the terminal processing unit 20 can execute a plurality of programs (the application programs and the like) in parallel.

The terminal processing unit 20 includes an image data acquisition unit 21, a pitch region partitioning unit 22, a pitch change amount calculation unit 23, a deformation amount calculation unit 24, and a deformation amount comparison unit 25. Each of the components of the terminal processing unit 20 is a functional module that is implemented by a program executed on the processor of the terminal processing unit 20. Alternatively, each of the components that is provided in the terminal processing unit 20 may be implemented in the deformation amount measuring device 1 as an independent integrated circuit, microprocessor, or firmware.

Figure 10:
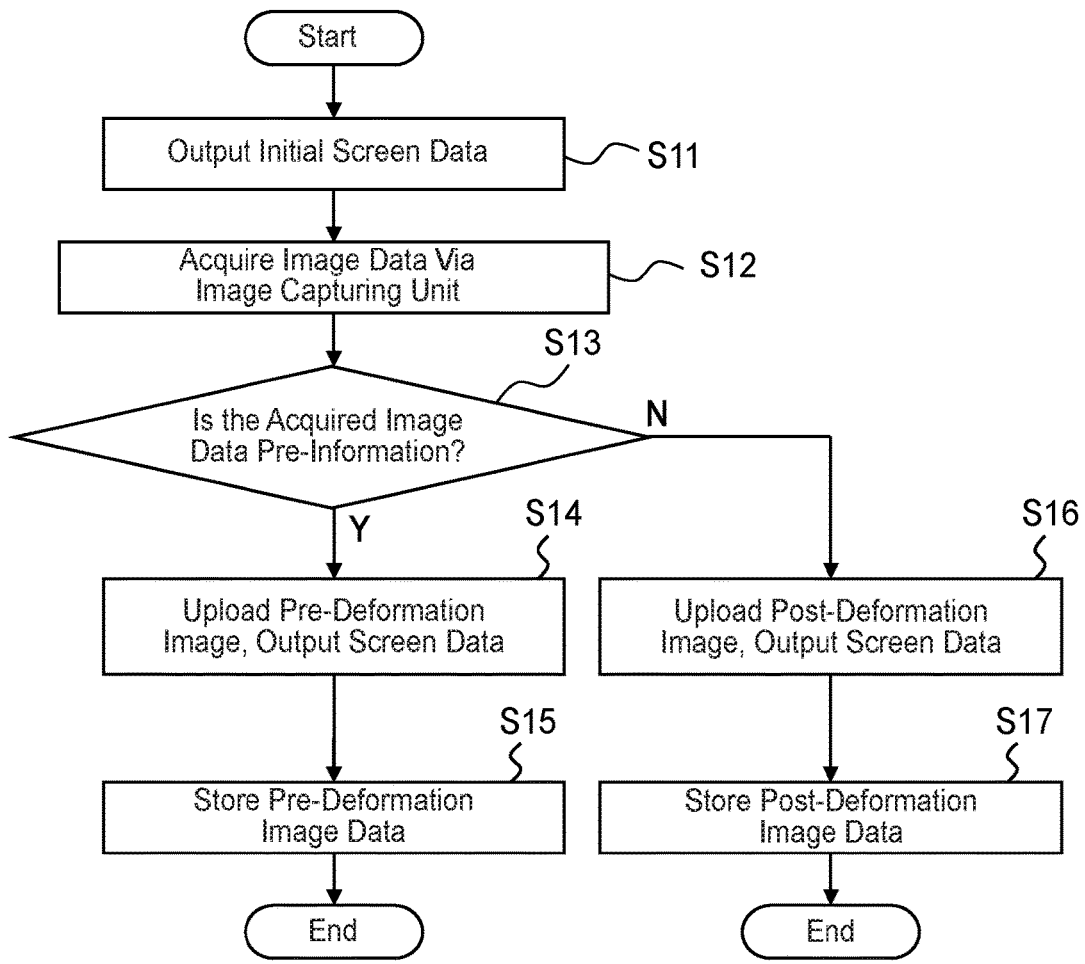
FIG. 10 is a flow chart of image capture processing by the deformation amount measuring device depicted in FIG. 9.

Image Capture Processing by the Deformation Amount Measuring Device According to the First Embodiment FIG. 10 is a flow chart of image capture processing by the deformation amount measuring device 1.

When the image capture processing is selected via the touch panel 14, the image data acquisition unit 21 outputs initial screen data to the touch panel 14 (S11).

Figure 11:
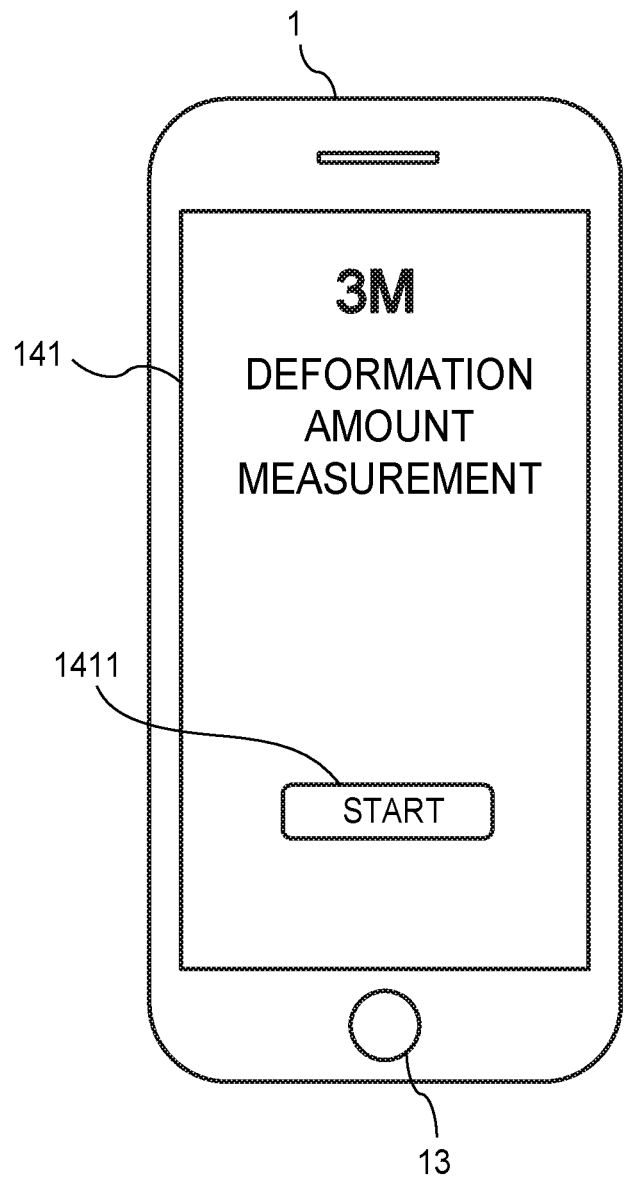
FIG. 11 is drawing illustrating one example of an initial screen.

FIG. 11 is drawing illustrating one example of an initial screen corresponding to the initial screen data.

The initial screen 141 has a start button portion 1411. When the start button portion 1411 is touched, the image data acquisition unit 21 starts the imaging operation. Next, the image data acquisition unit 21 acquires image data via the image capturing unit 16 in accordance with a pressing operation of an operator (not illustrated) of the operation unit 13 (S12). When the image data acquisition unit 21 acquires the image data via the image capturing unit 16, a sheet ID is generated that is provided to the sheet in order to identify the sheet included in the captured image. The image data acquisition unit 21 may associate the image data corresponding to the captured image with the sheet ID and store the associated data in a table in the terminal memory unit 15. Additionally, when the image data acquisition unit 21 acquires the image data via the image capturing unit 16, the image data acquisition unit 21 may display the sheet ID in a selectable manner on the touch panel 14. Next, the image data acquisition unit 21 determines if the image data acquired in S12 is pre-deformation image data of the sheet 101 or post-deformation image data of the sheet 101 (S13). In one example, the image data acquisition unit 21 displays an image on the touch panel 14 that is selectable by an operator (not illustrated) for selecting whether the captured image is a pre-deformation or post-deformation image of the sheet 101. Then, the image data acquisition unit 21 determines whether the acquired image data is pre-deformation image data or post-deformation image data on the basis of the selection by the operator (not illustrated).

When the acquired image data is determined to be pre-deformation image data of the sheet 101, the initial screen 141 outputs pre-deformation image display screen data to the touch panel 14 (S14). Additionally, when the acquired image data is determined to be post-deformation image data of the sheet 101, the initial screen 141 outputs post-deformation image display screen data to the touch panel 14 (S16).

Figure 12A:
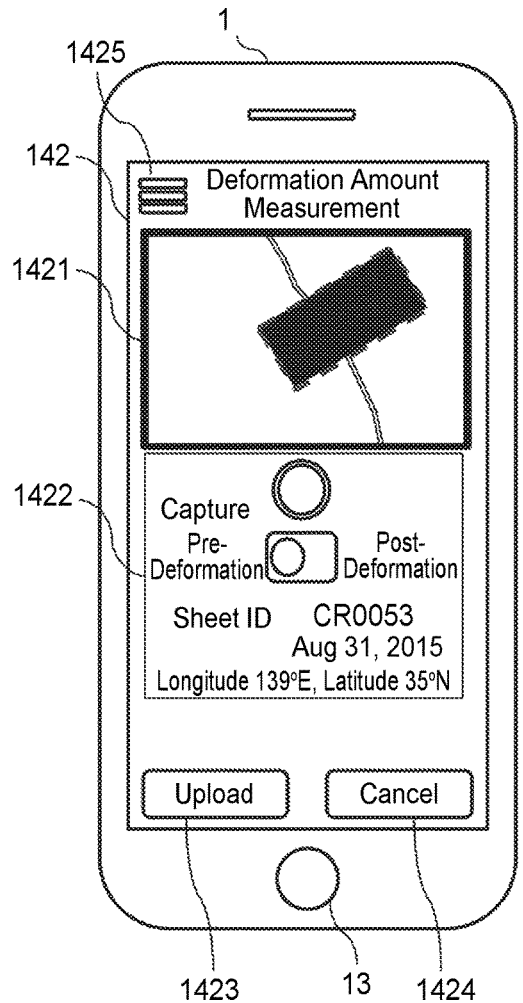
FIG. 12A is a drawing illustrating one example of a pre-deformation image display screen.
Figure 12B:
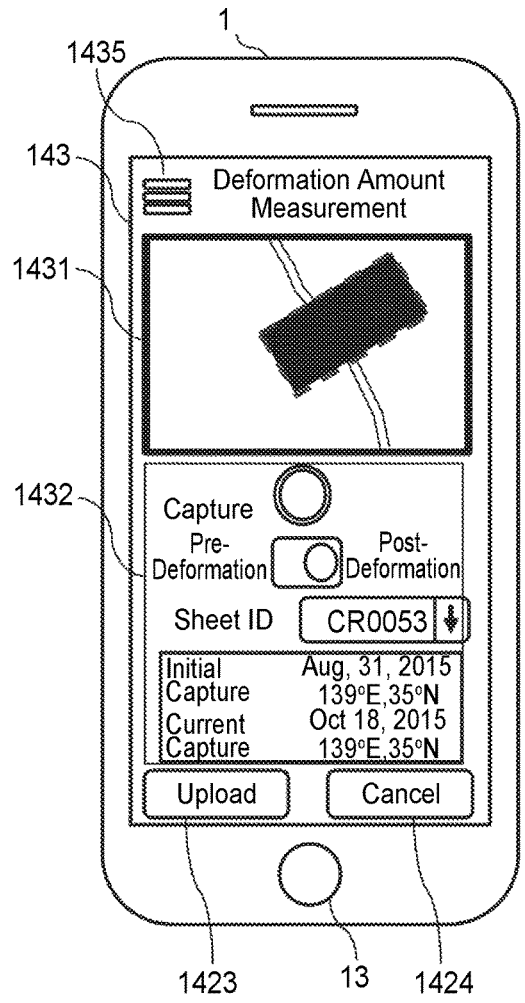
FIG. 12B is a drawing illustrating one example of a post-deformation image display screen.

FIG. 12A is a drawing illustrating one example of a pre-deformation image display screen; and FIG. 12B is a drawing illustrating one example of a post-deformation image display screen.

The pre-deformation image display screen 142 has a captured image display portion 1421, an image capture conditions display portion 1422, an upload button portion 1423, a cancel button portion 1424, and a settings selection portion 1425. An image of the pre-deformation sheet 101 corresponding to image data acquired via the image capturing unit 16 is displayed in the captured image display portion 1421. Image capture conditions of the image data acquired via the image capturing unit 16, such as image capture time, image capture location, and the like, are displayed in the image capture conditions display portion 1422. Additionally, the image capture conditions display portion 1422 displays a captured image selection portion in which whether the captured image is a pre-deformation image or a post-deformation image can be selected. In the pre-deformation image display screen 142, pre-deformation is selected in the captured image selection portion by the operator (not illustrated). When the upload button portion 1423 is touched, the image data acquisition unit 21 stores the acquired pre-deformation image data in the memory unit (S15), and uploads the acquired pre-deformation image data to a server (not illustrated). When the cancel button portion 1424 is touched, the deformation amount measuring device 1 assumes a state where an image can be captured. When the settings selection portion 1425 is touched, the image data acquisition unit 21 outputs settings screen data to the touch panel 14.

The post-deformation image display screen 143 has a captured image display portion 1431, an image capture conditions display portion 1432, an upload button portion 1433, a cancel button portion 1434, and a settings selection portion 1435. An image of the post-deformation sheet 101 corresponding to image data acquired via the image capturing unit 16 is displayed in the captured image display portion 1431. Image capture conditions of the image data associated with the same sheet ID acquired via the image capturing unit 16, such as image capture time, image capture location, and the like, are displayed in the image capture conditions display portion 1432. Additionally, the sheet ID is selectably displayed in the image capture conditions display portion 1432. Additionally, the image capture conditions display portion 1422 displays a captured image selection portion in which whether the captured image is a pre-deformation image or a post-deformation image can be selected. In the post-deformation image display screen 143, post-deformation is selected in the captured image selection portion by the operator (not illustrated). When the upload button portion 1433 is touched, the image data acquisition unit 21 stores the acquired post-deformation image data in the memory unit (S17), and uploads the acquired post-deformation image data to a server (not illustrated). When the cancel button portion 1434 is touched, the deformation amount measuring device 1 assumes a state where an image can be captured. When the settings selection portion 1435 is touched, the image data acquisition unit 21 outputs settings screen data to the touch panel 14 in order to display a settings screen 144 on the touch panel 14.

Figure 13:
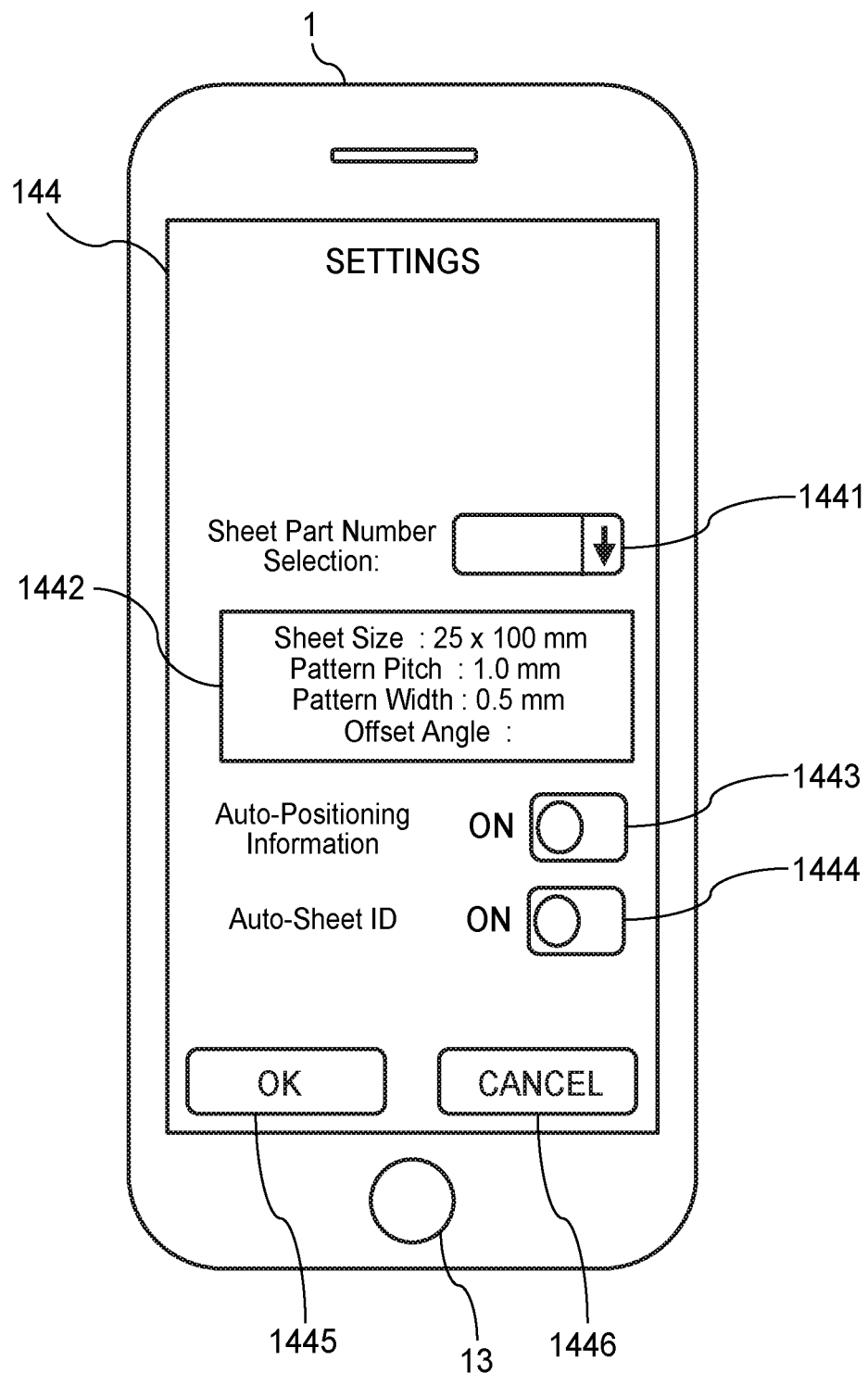
FIG. 13 is drawing illustrating one example of a settings screen.

FIG. 13 is drawing illustrating one example of the settings screen.

The settings screen 144 includes a sheet part number selection portion 1441, a sheet condition display portion 1442, a position information selection portion 1443, a sheet ID selection portion 1444, an OK button portion 1445, and a cancel button portion 1446. The sheet part number selection portion 1441 selectably displays part numbers of the sheet 101. The sheet condition display portion 1442 displays the selectable sheet part numbers. Additionally, the sheet condition display portion 1442 displays a sheet size, a pattern pitch, a pattern width, and an offset angle corresponding to the selected sheet part number. The position information selection portion 1443 selectably displays whether or not location information is to be acquired. The sheet ID selection portion 1444 selectably displays whether or not a sheet ID is to be automatically assigned. When the OK button portion 1445 is touched, the image data acquisition unit 21 stores the setting data indicating the settings displayed on the settings screen 144 in the terminal memory unit 15. When the cancel button portion 1446 is touched, the image data acquisition unit 21 outputs the pre-deformation image display screen data to the touch panel 14 in order to re-display the pre-deformation image display screen 142 in place of the settings screen 144.

Figures 14A, 14B:
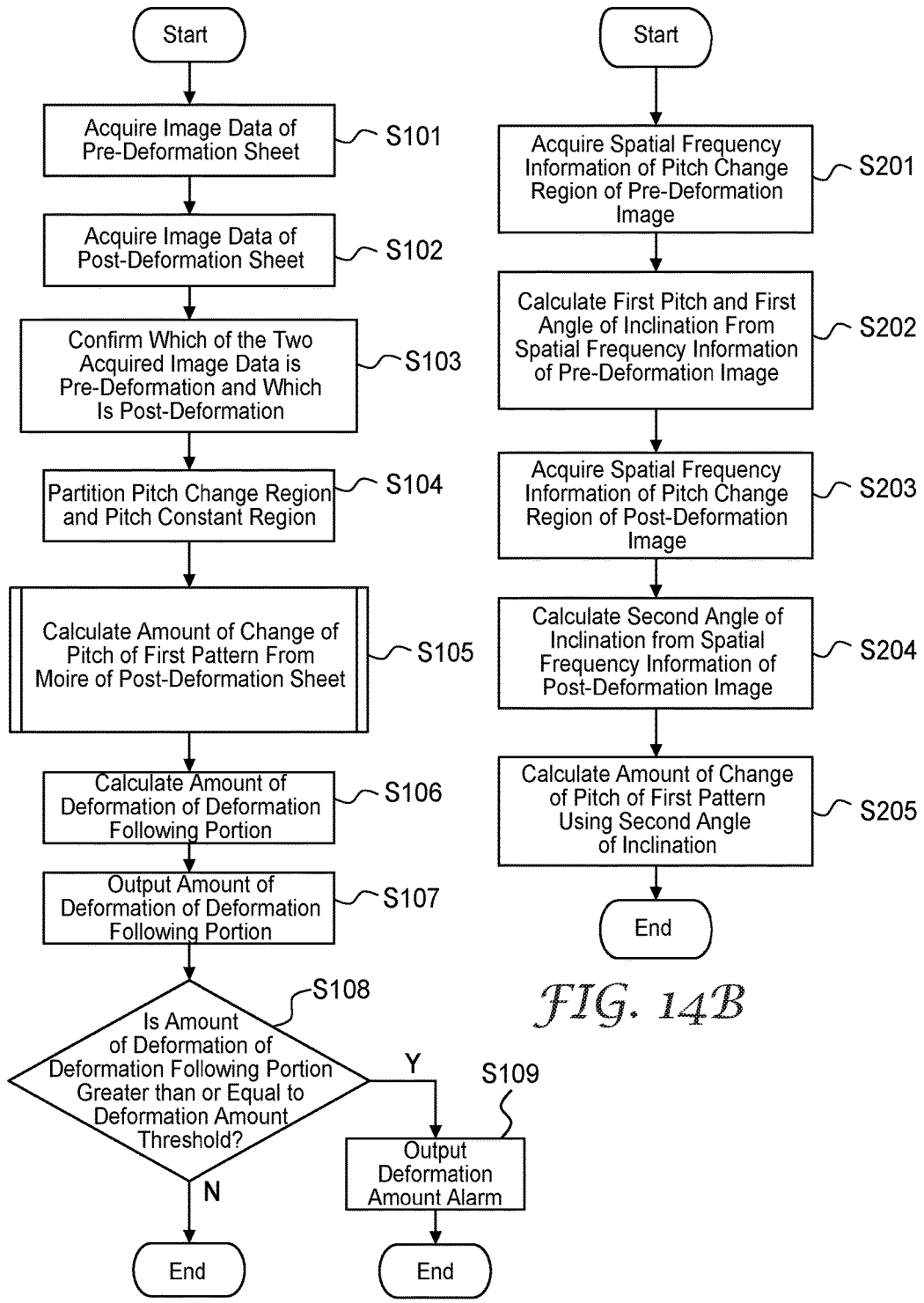
FIG. 14A is a flow chart of deformation amount measuring processing by the deformation amount measuring device depicted in FIG. 9.
FIG. 14B is a more detailed flow chart of the processing of S105 of FIG. 14A.

Deformation Amount Measuring Processing by the Deformation Amount Measuring Device According to the First Embodiment FIG. 14A is a flow chart of the deformation amount measuring processing by the deformation amount measuring device; and FIG. 14B is a more detailed flow chart of the processing of S105 of FIG. 14A.

First, the image data acquisition unit 21 acquires image data corresponding to an image of the pre-deformation sheet 101 that has been adhered to the measurement subject. The image is captured by an operator (not illustrated) via the image capturing unit 16 (S101). The image data acquisition unit 21 can acquire the image data corresponding to the image of the pre-deformation sheet 101 that is stored in the terminal memory unit 15. Then, the image data acquisition unit 21 acquires image data corresponding to an image of the post-deformation sheet 101 that has been adhered to the measurement subject. The image is captured by an operator (not illustrated) using the image capturing unit 16 (S102). The image data acquisition unit 21 can acquire the image data corresponding to the image of the post-deformation sheet 101 that is stored in the terminal memory unit 15. Next, the image data acquisition unit 21 determines which of the two image data acquired in S101 and S102 is the image data corresponding to the image of the pre-deformation sheet 101 and which is the image data corresponding to image of the post-deformation sheet 101 (S103). In one example, the image data acquisition unit 21 determines which of the two image data corresponds to the image of the pre-deformation sheet 101 and which of the two image data corresponds to the image of the post-deformation sheet 101 on the basis of the date and time on which the two image data were recorded in the terminal memory unit 15. In another example, the image data acquisition unit 21 displays a selectable image on the touch panel 14 for selecting which of the two image data corresponds to the image of the pre-deformation sheet 101 and which corresponds to the image of the post-deformation sheet 101, and determines the before-after relationship between the two image data on the basis of selection operations by an operator (not illustrated).

Next, the pitch region partitioning unit 22 partitions the pitch change region and the pitch constant region on the basis of differences between the image data of the pre-deformation sheet 101 acquired in S101 and the image data of the post-deformation sheet 101 acquired in S102 (S104). The pitch change region is a region where the pitch of the plurality of straight lines included in the first pattern 121 changes in accordance with the deformation of the deformation following portion 111 of the sheet 101, from before to after deformation of the deformation following portion 111. On the other hand, the pitch constant region is a region where the pitch of the plurality of straight lines included in the first pattern 121 does not change from before to after deformation of the deformation following portion because the deformation following portion 111 of the sheet 101 does not deform.

At each predetermined range, the pitch region partitioning unit 22 sequentially compares frequency components included in the regions corresponding to each of the image acquired in S101 and the image acquired in S102. The pitch region partitioning unit 22 determines a region where a difference, between the frequency components included in the regions corresponding to each of the image acquired in S101 and the image acquired in S102, is greater than or equal to a predetermined threshold to be the pitch change region. Additionally, the pitch region partitioning unit 22 determines a region where a difference, between the frequency components included in the regions corresponding to each of the image acquired in S101 and the image acquired in S102, is less than the predetermined threshold to be the pitch constant region. The pitch region partitioning unit 22 may partition the pitch change region and the pitch constant region by other image processing as well.

Next, the pitch change amount calculation unit 23 calculates the amount of change of the pitch of the first pattern 121 from the pitch of the moire of the post-deformation sheet 101 (S105). First, the pitch change amount calculation unit 23 acquires spatial frequency information of the pitch change region of the image of the pre-deformation sheet 101 (S201).

Figure 15A:
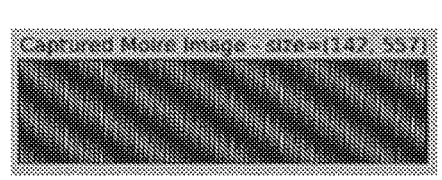
FIG. 15A is a drawing illustrating an example of an image captured by an image capturing unit.
Figure 15B:
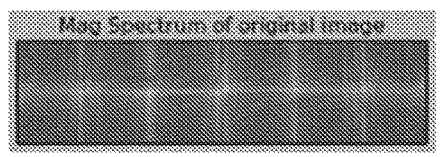
FIG. 15B is a first processing image obtained by processing the image depicted in FIG. 15A.
Figure 15C:
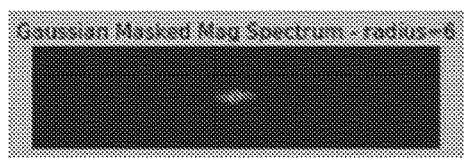
FIG. 15C is a second processing image obtained by further processing the first processing image depicted in FIG. 15B.
Figure 15D:
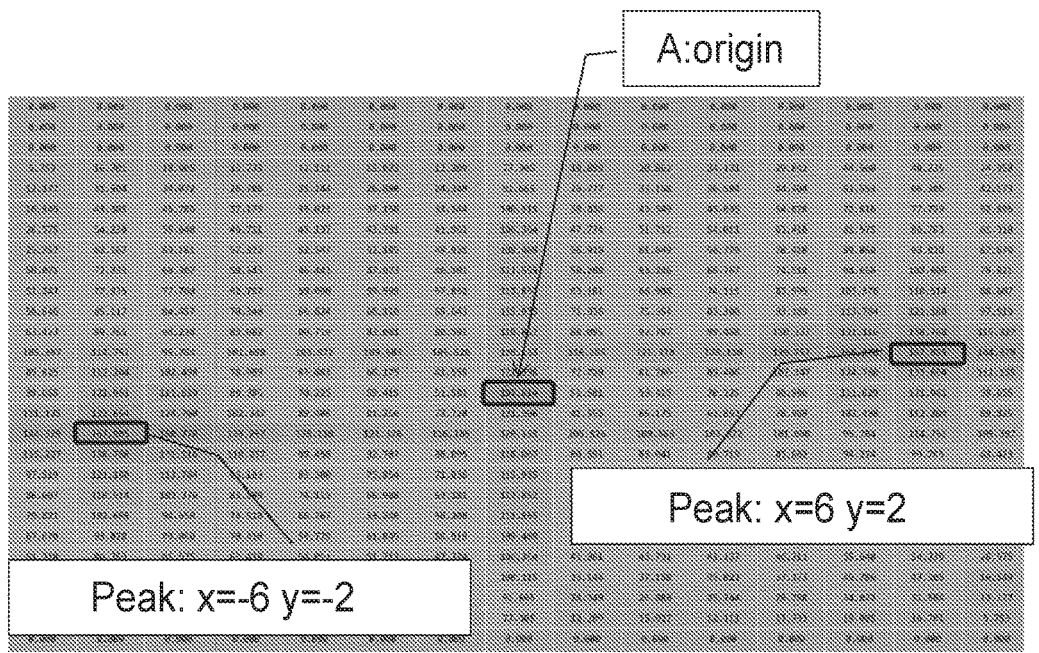
FIG. 15D is a drawing showing spatial frequency information extracted from the second processing image depicted in FIG. 15C.

FIG. 15A is a drawing illustrating one example of an image captured by the image capturing unit 16. FIG. 15B is a first processing image obtained by processing the image depicted in FIG. 15A; FIG. 15C is a second processing image obtained by further processing the first processing image depicted in FIG. 15B; and FIG. 15D is a drawing showing spatial frequency information extracted from the second processing image depicted in FIG. 15C. A pixel count in the X direction of the image depicted in FIG. 15A is 557 and a pixel count in the Y direction is 142.

The pitch change amount calculation unit 23 performs 2D fast Fourier transform (2D FFT) on the image data corresponding to the image captured by the image capturing unit 16 depicted in FIG. 15A and, as a result, acquires image data corresponding to the first processing image depicted in FIG. 15B. Next, the pitch change amount calculation unit 23 performs band-pass filter (BPF) processing on the image data corresponding to the first processing image depicted in FIG. 15B and, as a result, acquires image data corresponding to the second processing image depicted in FIG. 15C. As a result of subjecting the first processing image to the band-pass filter processing, the frequency components corresponding to the straight lines included in the first pattern 121 and the second pattern 122 that are included in the first processing image are removed. Then, the pitch change amount calculation unit 23 acquires spatial frequency information shown in FIG. 15D from the image data corresponding to the second processing image depicted in FIG. 15C. An X-direction component and a Y-direction component of the number of elements between each of the elements of the spatial frequency information shown in FIG. 15D and the origin indicated by an arrow A correspond, respectively, to an X-direction component and a Y-direction component of the spatial frequency included in the image depicted in FIG. 15A. Additionally, the values within the elements of the spatial frequency information are spectral intensities at the spatial frequency corresponding to the position of each element. In one example, the spatial frequency information is acquired from the second processing image by a program written in Python.

Next, the pitch change amount calculation unit 23 calculates the pitch of the pre-deformation moire, namely the first pitch moire_pitch1, and the pitch of the pre-deformation moire, namely the first angle of inclination moire_$\theta$1 from the spatial frequency information of the pitch change region of the image of the pre-deformation sheet 101 (S202).

First, the pitch change amount calculation unit 23 determines the X-direction component and the Y-direction component of the spatial frequency of the moire from the values within the elements included in the spatial frequency information acquired in S201. The pitch change amount calculation unit 23 determines the X-direction component of the numbers of elements and the Y-direction component of the number of elements between the elements having the greatest value therein and the origin to be an X-direction component $fx$ and a Y-direction component $fy$ of the spatial frequency included in the image. In the example illustrated in FIG. 15D, the values within the elements ±6 from the origin in the X direction and ±2 from the origin in the Y direction are the greatest and, therefore, the X-direction component fx of the spatial frequency included in the image is 6 and the Y-direction component fy of the spatial frequency included in the image is 2.

Next, the pitch change amount calculation unit 23 corrects the Y-direction component fy of the spatial frequency in accordance with an aspect ratio of the image captured by the image capturing unit 16. A corrected Y-direction component fy' of the spatial frequency is expressed from a pixel count Npx in the X direction of the image captured by the image capturing unit 16, a pixel count Npy in the X direction of the image captured by the image capturing unit 16, and the Y-direction component fy of the spatial frequency before correction as:

$$fy' = (Npx/Npy) \times fy$$

The pixel count in the X direction of the image depicted in FIG. 15A is 557 and the pixel count in the Y direction is 142. Therefore, the corrected Y-direction component fy' of the spatial frequency on the image depicted in FIG. 15A is:

$$fy' = (Npx/Npy) \times fy$$
$$= (557/142) \times 2$$
$$= 7.8$$

Next, the pitch change amount calculation unit 23 calculates the pitch of the pre-deformation moire, namely the first pitch moire_pitch1, and the pitch of the pre-deformation moire, namely the first angle of inclination moire_θ1 from the X-direction component fx of the spatial frequency and the corrected Y-direction component fy' of the spatial frequency. The first pitch moire_pitch1 and the first angle of inclination moire_θ1 are expressed as:

$$\text{moire\_pitch1} = \sqrt{(fx^2 + fy'^2)}$$

$$\text{moire\_θ1} = \arctan(fy'/fx)$$

The first pitch moire_pitch1 and the first angle of inclination moire_θ1 of the image depicted in FIG. 15A are:

$$\text{moire\_pitch1} = \sqrt{(fx^2 + fy'^2)} = \sqrt{(6^2 + 7.8^2)} = 9.8$$

$$\text{moire\_θ1} = \arctan(fy'/fx) = \arctan(7.8/6) = 52.4°$$

Next, the pitch change amount calculation unit 23 acquires spatial frequency information of the pitch change region of the image of the post-deformation sheet 101 (S203). Next, the pitch change amount calculation unit 23 calculates the angle of inclination of the image of the post-deformation sheet 101, namely the second angle of inclination moire_θ2 from the spatial frequency information of the pitch change region of the image of the post-deformation sheet 101 (S204). The processing of S203 and the processing of calculating the second angle of inclination moire_θ2 of S204 are the same as the processing of S201 and the processing of calculating the first angle of inclination moire_θ1 of S202, respectively. As such, detailed description thereof is omitted.

Then, the pitch change amount calculation unit 23 calculates the amount of change of the pitch of the first pattern 121 from the offset angle offset_θ of the sheet 101, the first pitch moire_pitch1, the first angle of inclination moire_θ1, and the second angle of inclination moire_θ2 (S205).

Figure 16:
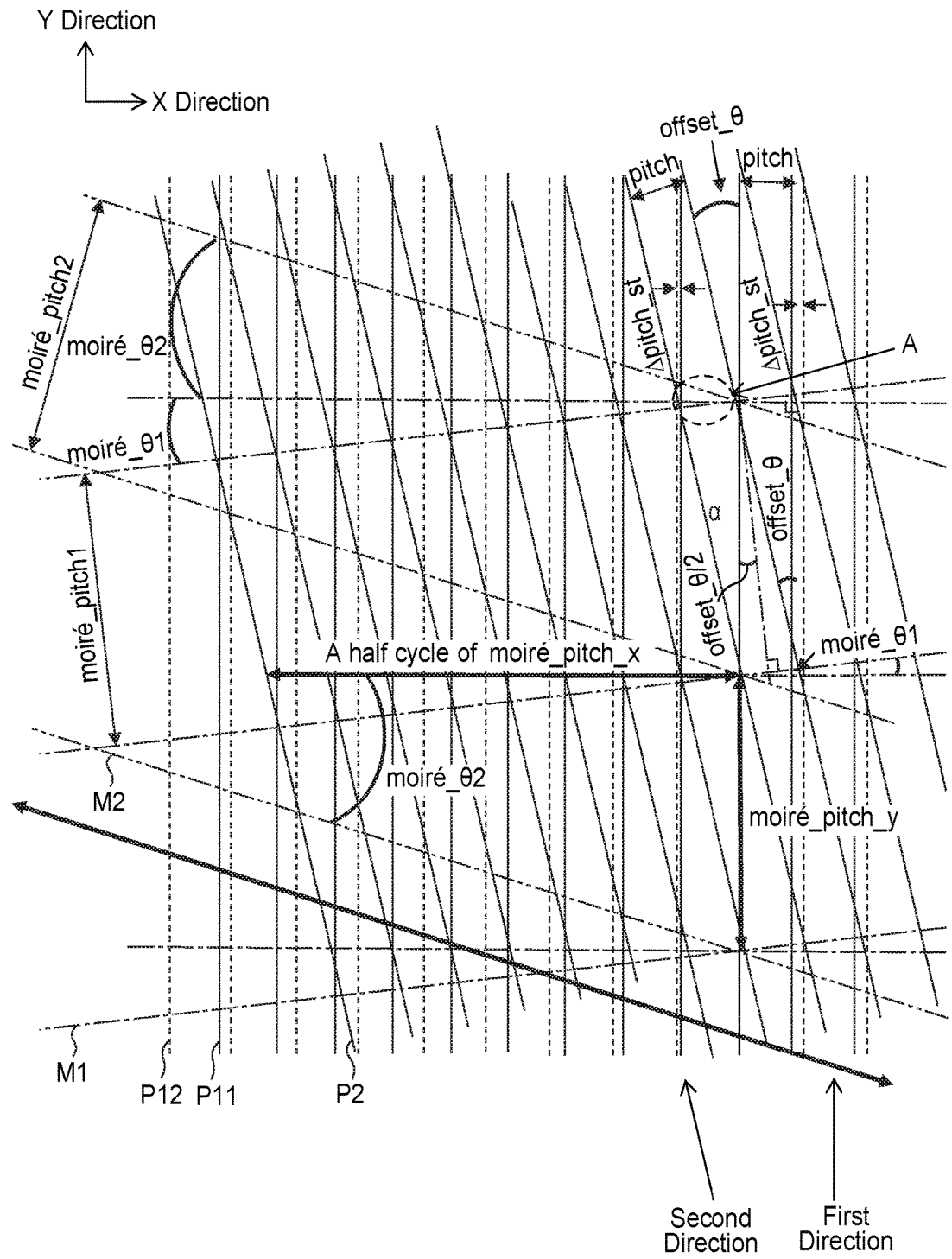
FIG. 16 is a first diagram for explaining the processing of S205 shown in FIG. 14B.

FIG. 16 is a first diagram for explaining the processing of S205. An interval between a plurality of parallel straight lines P11 (depicted as solid lines) extending in a first direction represents the pre-deformation pitch of the first pattern 121, "pitch"; and an interval between a plurality of parallel straight lines P12 (depicted as dashed lines) extending in the first direction represents the post-deformation pitch of the first pattern 121, "pitch+Δpitch_st". Additionally, an interval between a plurality of parallel straight lines P2 (depicted as solid lines) extending in a second direction represents the pitch of the second pattern 122, "pitch". The pitch of the second pattern 122, "pitch" and the pitch of the first pattern 121, "pitch" are identical. Additionally, an interval between a plurality of parallel straight lines M1 (depicted as dot-dash lines) represents the first pitch moire_pitch1 of the pre-deformation moire, and an interval between a plurality of parallel straight lines M2 (depicted as dot-dot-dash lines) represents the second pitch moire_pitch2 of the post-deformation moire. The X-direction component of the second pitch moire_pitch2 is depicted as moire_pitch_x, and the Y-direction component of the second pitch moire_pitch2 is depicted as moire_pitch_y. The sheet 101 deforms in the X direction, that is, the direction orthogonal to the first direction. Accordingly, the Y-direction component of the pitch of the moire does not change from before to after deformation of the sheet 101, and is constant at the moire_pitch_y.

The Y-direction component moire_pitch_y, indicated as "α" in FIG. 16, of the second pitch of the moire is expressed from the first pitch moire_pitch1 of the pre-deformation moire and the offset angle offset_θ by:

[Equation 1]

$$\text{moire\_pitch\_y} = \alpha = \frac{\text{moire\_pitch\_init}}{\cos(\text{offset\_}\theta/2)}$$

Figure 17A:
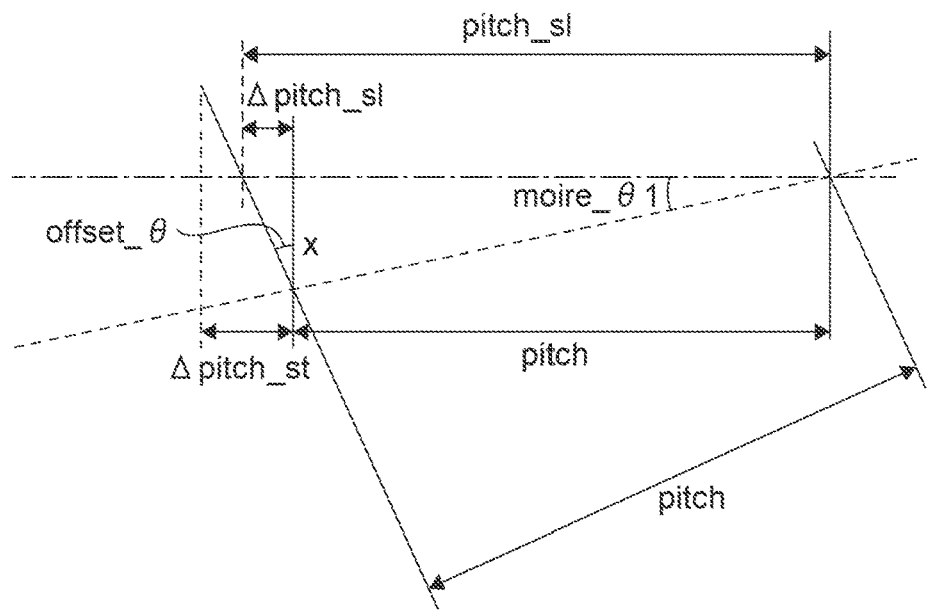
FIG. 17A is a second diagram for explaining the processing of S205 shown in FIG. 14B.
Figure 17B:
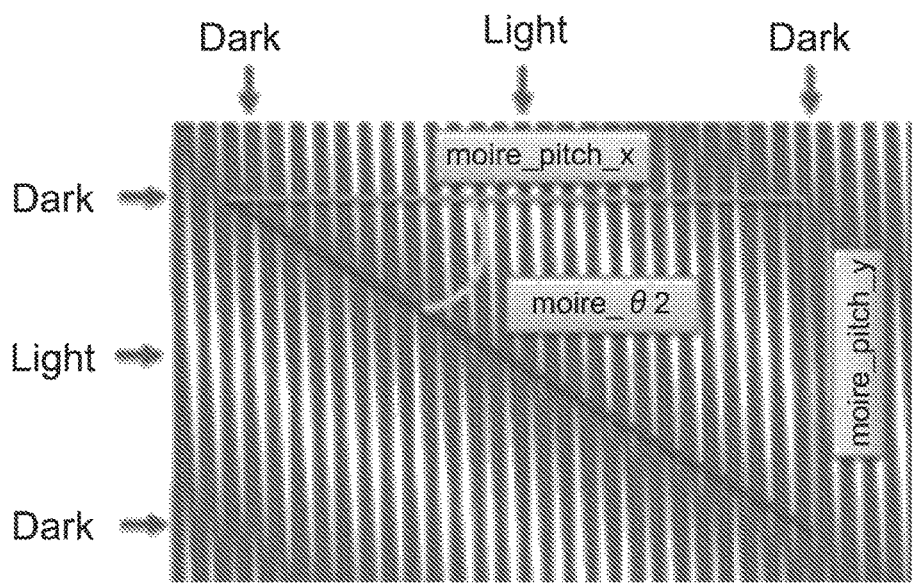
FIG. 17B is a third drawing for explaining the processing of S205 shown in FIG. 14B.

FIG. 17A is a second diagram for explaining the processing of S205; and FIG. 17B is a third diagram for explaining the processing of S205. FIG. 17A is a partially exploded view of a portion of FIG. 16 surrounded by the dashed line indicated by the arrow A; and FIG. 17B is a third diagram for explaining the processing of S205. In FIG. 17A, offset_θ represents the offset angle, pitch represents the pre-deformation pitch of the first pattern 121 and the pre-deformation pitch of the second pattern 122, Δpitch_st represents the amount of change of the pitch of the first pattern 121 from before to after deformation, and moire_θ1 represents the first angle of inclination. Additionally, an inclination pitch pitch_sl and a difference inclination pitch Δpitch_sl are variables that are used in calculations. The inclination pitch pitch_sl is defined by the pitch (pitch) and the first angle of inclination moire_θ1 of the second pattern 122, and the difference inclination pitch Δpitch_sl is a difference between the inclination pitch pitch_sl and the pitch (pitch) of the second pattern 122.

The offset angle offset_θ is expressed from the difference inclination pitch Δpitch_sl and a length represented as X in FIG. 17A by:

[Equation 2]

$$\tan(\text{offset\_}\theta) = \frac{\Delta\text{pitch\_sl}}{x}$$

Additionally, the first angle of inclination moire_θ1 is expressed from the pitch (pitch) of the pre-deformation first pattern 121 and the length represented as X in FIG. 17A by:

[Equation 3]

$$\tan(\text{moire}\_\theta 1) = \frac{x}{\text{pitch}}$$

The difference inclination pitch Δpitch_sl is expressed by expanding these two equations by:

$$\Delta\text{pitch}\_sl = \text{pitch} \cdot \tan(\text{offst}\_\theta) \cdot \tan(\text{moire}\_\theta 1) \quad \text{[Equation 4]}$$

On the other hand, the inclination pitch pitch_sl is expressed from the pitch (pitch) of the pre-deformation first pattern 121 and the difference inclination pitch Δpitch_sl by:

$$\text{pitch}\_sl = \text{pitch} + \Delta\text{pitch}\_sl \quad \text{[Equation 5]}$$

Additionally, the amount of change Δpitch_st of the pitch of the first pattern 121 from before to after deformation, the inclination pitch pitch_sl, and the difference inclination pitch Δpitch_sl are expressed by:

[Equation 6]

$$n \cdot (\Delta\text{pitch}\_st - \Delta\text{pitch}\_sl) = \frac{\text{pitch}\_sl}{2}$$

Here, "n" is a multiple showing how many times the inclination pitch pitch_sl a half cycle of the X component moire_pitch of the second pitch of the post-deformation moire is equal to. From the equations described above, the multiple n is expressed by:

[Equation 7]

$$n = \frac{\text{pitch}\_sl}{2 \cdot (\Delta\text{pitch} - \Delta\text{pitch}\_sl)}$$

On the other hand, the X component moire_pitch_x of the second pitch of the post-deformation moire, the inclination pitch pitch_sl, and the multiple n are expressed by:

$$\text{moire}\_\text{pitch}\_x = 2 \cdot n \cdot \text{pitch}\_sl \quad \text{[Equation 8]}$$

From these relationships, the X component moire_pitch_x of the second pitch of the post-deformation moire can be expressed by:

[Equation 9]

$$\text{moire}\_\text{pitch}\_x = \frac{\text{pitch}\_sl^2}{\Delta\text{pitch}\_st - \Delta\text{pitch}\_sl}$$

Additionally, as illustrated in FIG. 17B, the X component moire_pitch_x of the second pitch of the post-deformation moire, the X component moire_pitch_y of the second pitch of the post-deformation moire, and the second angle of inclination moire_θ2 can be expressed by:

[Equation 10]

$$\tan(\text{moire}\_\theta 2) = \frac{\text{moire}\_\text{pitch}\_y}{\text{moire}\_\text{pitch}\_x}$$

From the equations described above, the amount of change Δpitch_st of the pitch of the first pattern 121 from before to after deformation is expressed by:

[Equation 11]

$$\Delta\text{pitch}\_st = \frac{\text{pitch}\_sl^2 \cdot \tan(\text{moire}\_\theta 2)}{\text{moire}\_\text{pitch}\_y} + \Delta\text{pitch}\_sl \quad (1)$$

[Equation 12]

$$\Delta\text{pitch}\_sl = \text{pitch} \cdot \tan(\text{offset}\_\theta) \cdot \tan(\text{moire}\_\theta 1)$$

[Equation 13]

$$\text{pitch}\_sl = \text{pitch} + \Delta\text{pitch}\_sl$$

The pitch change amount calculation unit 23 calculates the amount of change Δpitch_st of the pitch of the first pattern 121 from before to after deformation using Equation (1).

Next, the deformation amount calculation unit 24 calculates the amount of deformation of the deformation following portion 111 (S106). The deformation amount calculation unit 24 calculates the amount of deformation of the deformation following portion 111 by multiplying the amount of change Δpitch_st of the pitch of the first pattern 121 from before to after deformation by the number of straight lines of the first pattern 121 included in the pitch change region. Next, the deformation amount calculation unit 24 outputs the amount of deformation of the deformation following portion 111 calculated in S105 (S107).

Figure 18:
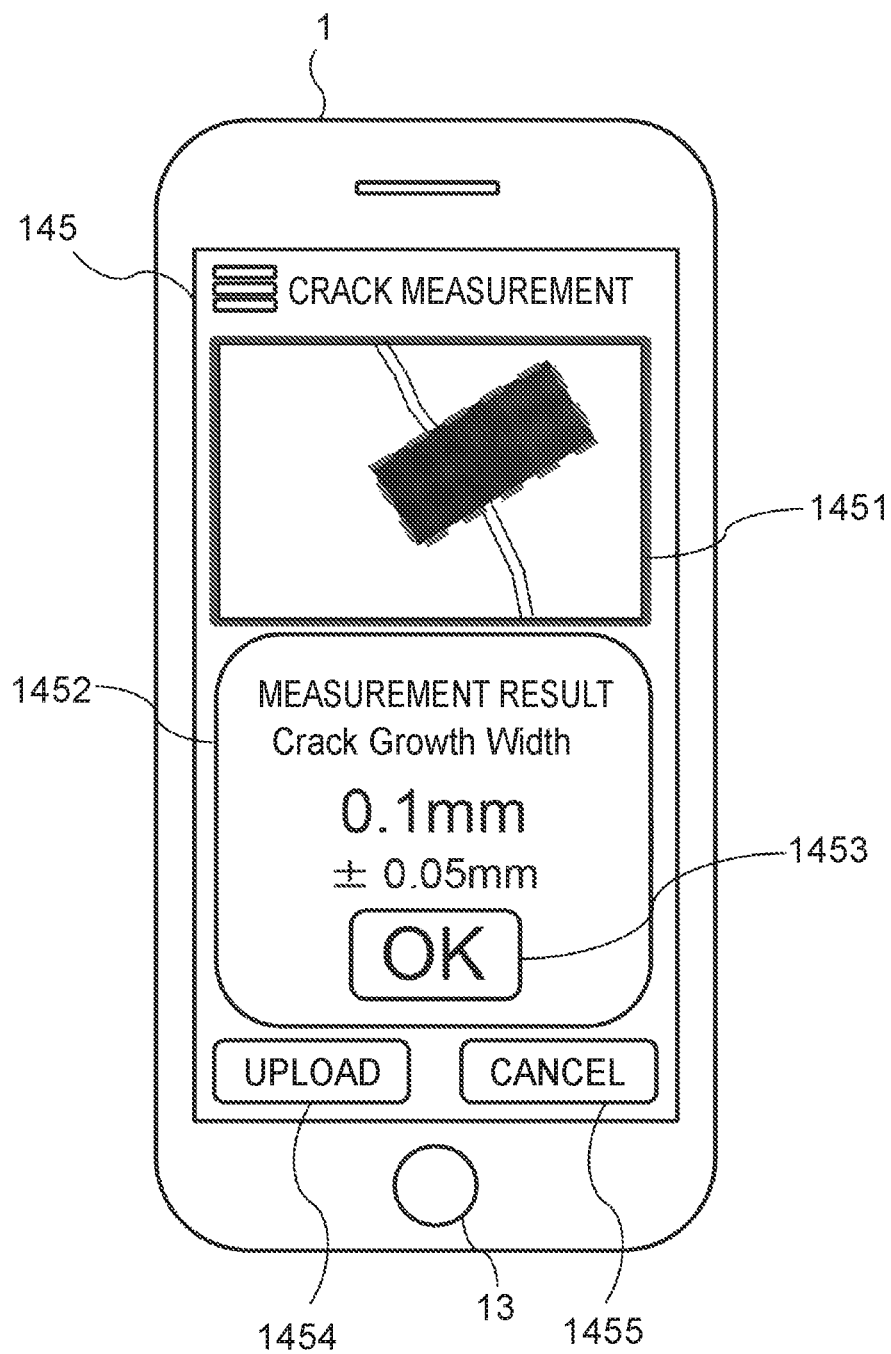
FIG. 18 is drawing illustrating one example of a deformation amount output screen.

FIG. 18 is drawing illustrating one example of a deformation amount output screen to which the deformation amount calculation unit 24 outputs the amount of deformation of the deformation following portion 111.

The deformation amount output screen 145 has a captured image display portion 1451, a deformation amount display portion 1452, an OK button portion 1453, an upload button portion 1454, and a cancel button portion 1455. An image of the post-deformation sheet 101 corresponding to image data acquired via the image capturing unit 16 is displayed in the captured image display portion 1451. The deformation amount display portion 1452 displays the calculated amount of deformation of the deformation following portion 111 as a crack growth width, and also displays a measurement margin of error. In one example, a background of the deformation amount display portion 1452 may be displayed as blue. When the OK button portion 1453 is touched, the calculated amount of deformation of the deformation following portion 111 is stored in the terminal memory unit 15. When the upload button portion 1454 is touched, the deformation amount calculation unit 24 uploads the calculated amount of deformation of the deformation following portion 111 to a server (not illustrated). When the cancel button portion 1446 is touched, the deformation amount measuring device 1 assumes a state where an image can be captured.

Next, the deformation amount comparison unit 25 compares the amount of deformation of the deformation following portion 111 calculated in S106 with a predetermined deformation amount threshold (S108). Additionally, the deformation amount comparison unit 25 outputs a deformation amount alarm indicating that the amount of deformation of the deformation following portion 111 calculated in S106 has exceeded a reference value when the amount of deformation of the deformation following portion 111 calculated in S106 is greater than or equal to a predetermined deformation amount threshold (S109).

Figure 19:
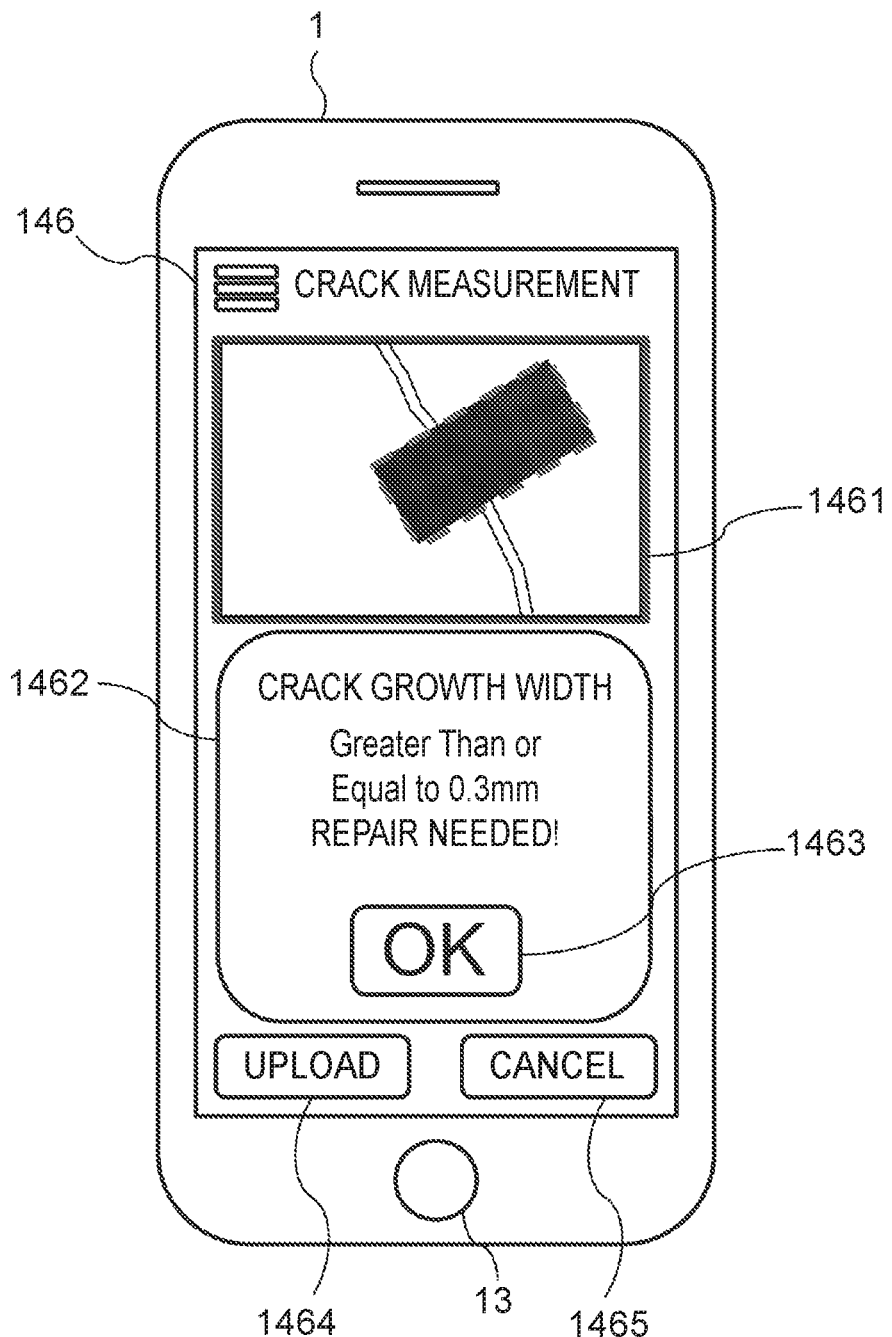
FIG. 19 is drawing illustrating one example of a deformation amount alarm output screen.

FIG. 19 is drawing illustrating one example of a deformation amount output screen to which the deformation amount comparison unit 25 outputs the deformation amount alarm of the deformation following portion 111.

The deformation amount alarm output screen 146 has a captured image display portion 1461, a deformation amount display portion 1462, an OK button portion 1463, an upload button portion 1464, and a cancel button portion 1465. An image of the post-deformation sheet 101 corresponding to image data acquired via the image capturing unit 16 is displayed in the captured image display portion 1461. The deformation amount display portion 1462 displays the calculated amount of deformation of the deformation following portion 111 as a crack growth width, and also displays that the crack growth width has, in one example, exceeded 0.3 mm, that is, the deformation amount threshold. In one example, a background of the deformation amount display portion 1462 may be displayed as red. When the OK button portion 1453 is touched, the fact that the calculated amount of deformation of the deformation following portion 111 has exceeded the deformation amount threshold is stored in the terminal memory unit 15. When the upload button portion 1454 is touched, the fact that the calculated amount of deformation of the deformation following portion 111 has exceeded the deformation amount threshold is stored in the terminal memory unit 15. When the cancel button portion 1446 is touched, the deformation amount measuring device 1 assumes a state where an image can be captured.

Figure 20:
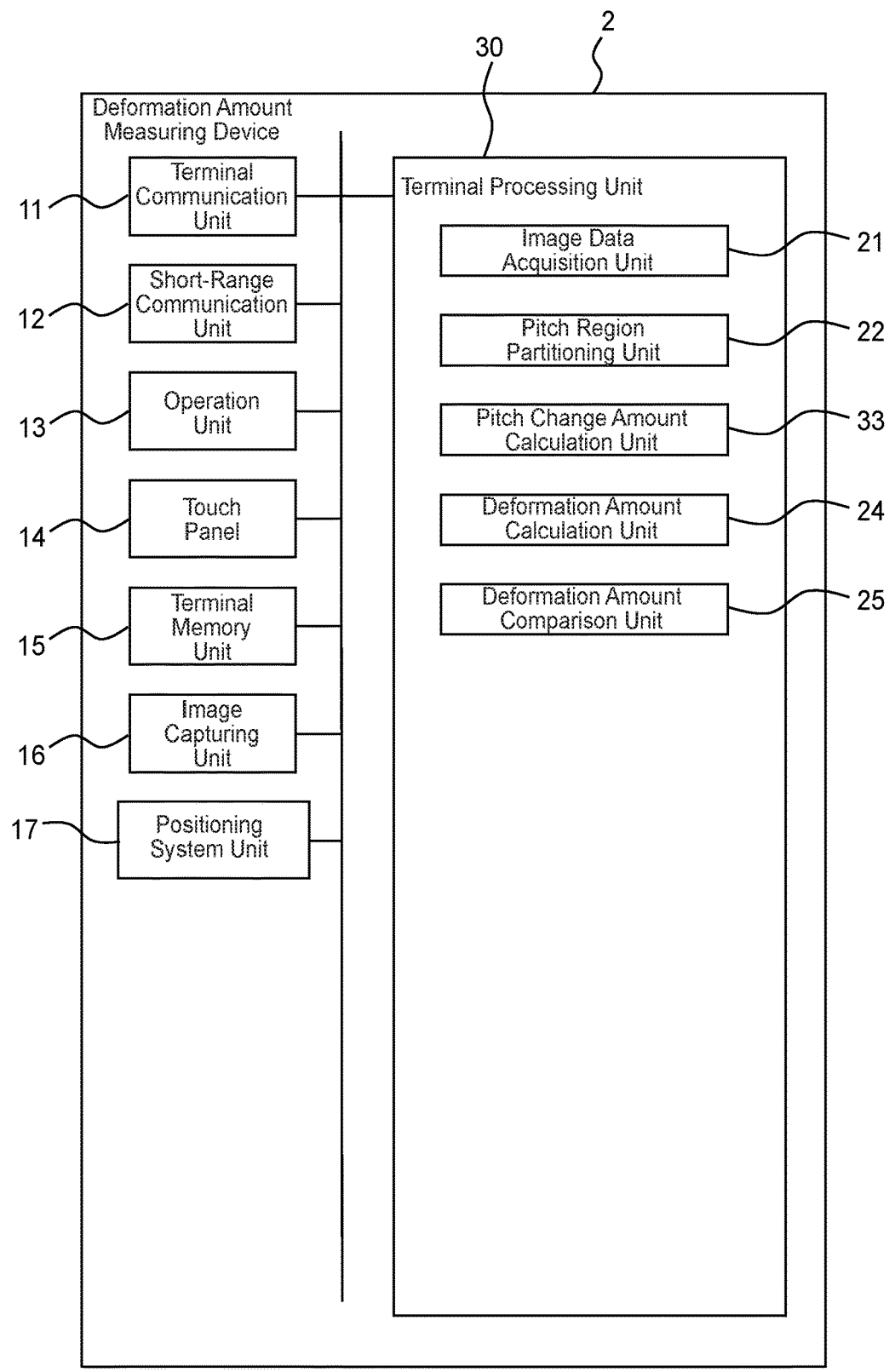
FIG. 20 is a block diagram of a deformation amount measuring device according to a second embodiment.

Configuration and Function of the Deformation Amount Measuring Device According to a Second Embodiment FIG. 20 is a block diagram of a deformation amount measuring device according to a second embodiment.

A deformation amount measuring device 2 differs from the deformation amount measuring device 1 in that the deformation amount measuring device 2 has a terminal processing unit 30, that is provided with a pitch change amount calculation unit 33 instead of the pitch change amount calculation unit 23, instead of the terminal processing unit 20. Constituents of the deformation amount measuring device 2 other than the pitch change amount calculation unit 33 have identical configuration and function as the constituents of the deformation amount measuring device 1 marked by the same reference numerals. As such, detailed description thereof is omitted.

Figures 21A, 21B:
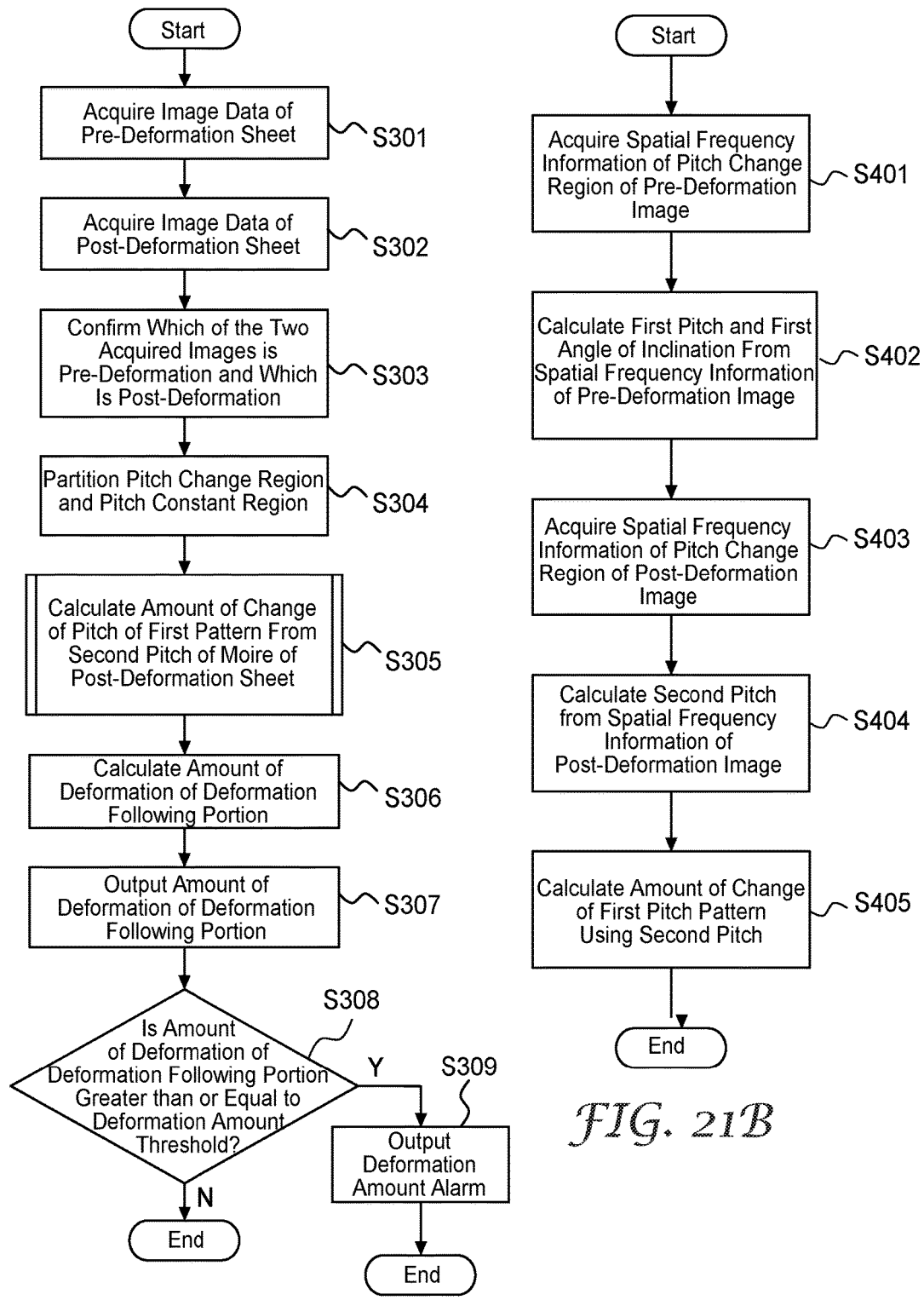
FIG. 21A is a flow chart of deformation amount measuring processing using the deformation amount measuring device depicted in FIG. 20.
FIG. 21B is a more detailed flow chart of the processing of S305 of FIG. 21A.

Deformation Amount Measuring Processing by the Deformation Amount Measuring Device According to the Second Embodiment FIG. 21A is a flow chart of deformation amount measuring processing by the deformation amount measuring device 2; and FIG. 21B is a more detailed flow chart of the processing of S305 of FIG. 21A.

The processing of S301 to S304 and S306 to S309 (except S305) shown in FIG. 21A is the same as the processing of S101 to S104 and S106 to S109 described while referencing FIG. 14A. As such, detailed description thereof is omitted. The processing of S401 to S403 shown in FIG. 21B is the same as the processing of S201 to S203 described while referencing FIG. 14B. As such, detailed description thereof is omitted.

In S404, the pitch change amount calculation unit 33 executes the same processing as for calculating the first angle of inclination moire_θ1 of S202, and calculates the second pitch moire_pitch2, namely the pitch of the post-deformation moire from the spatial frequency information of the pitch change region of the image of the post-deformation sheet 101. Then, the pitch change amount calculation unit 33 calculates the amount of change of the pitch of the first pattern 121 from the offset angle offset_θ of the sheet 101, the first pitch moire_pitch1, the first angle of inclination moire_θ1, and the second pitch moire_pitch2 (S405).

Figure 22:
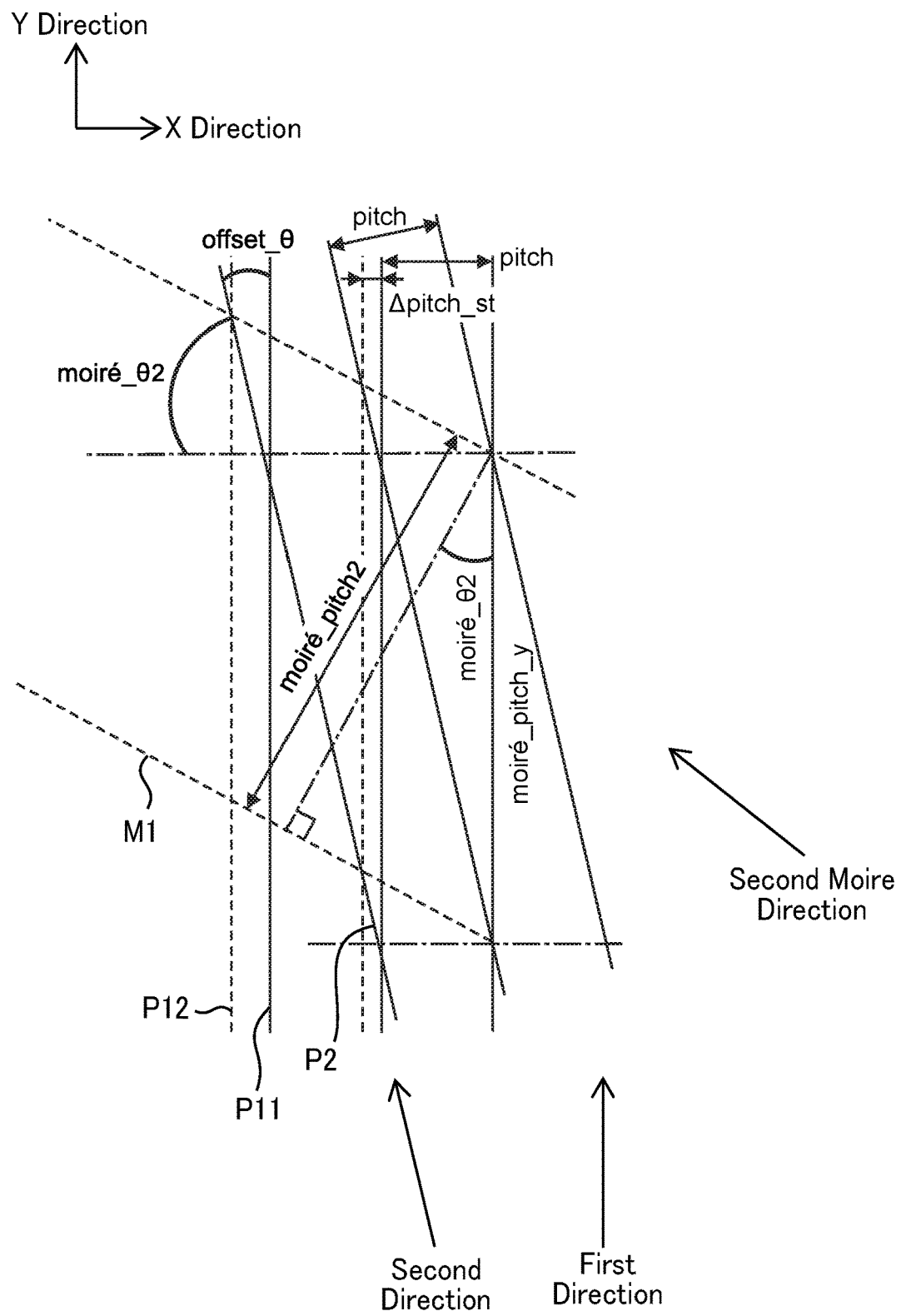
FIG. 22 is a diagram for explaining the processing of S405 shown in FIG. 21B.

FIG. 22 is a diagram for explaining the processing of S405. An interval between a plurality of parallel straight lines P11 (depicted as solid lines) extending in a first direction represents the pre-deformation pitch of the first pattern 121, "pitch"; and an interval between a plurality of parallel straight lines P12 (depicted as dashed lines) extending in the first direction represents the post-deformation pitch of the first pattern 121, "pitch+Δpitch_st". Additionally, an interval between a plurality of parallel straight lines P2 (depicted as solid lines) extending in a second direction represents the pitch of the second pattern 122, "pitch". The pitch of the second pattern 122, "pitch" and the pitch of the first pattern 121, "pitch" are identical. Additionally, an interval between parallel straight lines M2 (depicted as dashed lines) extending in the second moire direction represents the second pitch moire_pitch2 of the post-deformation moire. The sheet 101 deforms in the X direction, that is, the direction orthogonal to the first direction. Accordingly, the Y-direction component of the pitch of the moire does not change from before to after deformation of the sheet 101, and is constant at the moire_pitch_y.

The second angle of inclination moire_θ2 of the moire, the second pitch moire_pitch2 of the moire, and the Y-direction component moire_pitch_y of the second pitch are expressed by:

[Equation 14]

$$\cos(\text{moire\_}\theta2) = \frac{\text{moire\_pitch2}}{\text{moire\_pitch\_y}}$$

and hereinafter are:

[Equation 15]

$$\text{moire\_}\theta2 = \arccos\left(\frac{\text{moire\_pitch2}}{\text{moire\_pitch\_y}}\right)$$

When this equation is substituted into Equation (1),

[Equation 16]

$$\Delta\text{pitch\_st} = \frac{\text{pitch\_sl}^2 \cdot \tan\left(\cos^{-1}\frac{\text{moire\_pitch2}}{\text{moire\_pitch\_y}}\right)}{\text{moire\_pitch\_y}} + \Delta\text{pitch\_sl} \quad (2)$$

is obtained. The pitch change amount calculation unit 33 calculates the amount of change Δpitch_st of the pitch of the first pattern 121 from before to after deformation using Equation (2).

Figure 23:
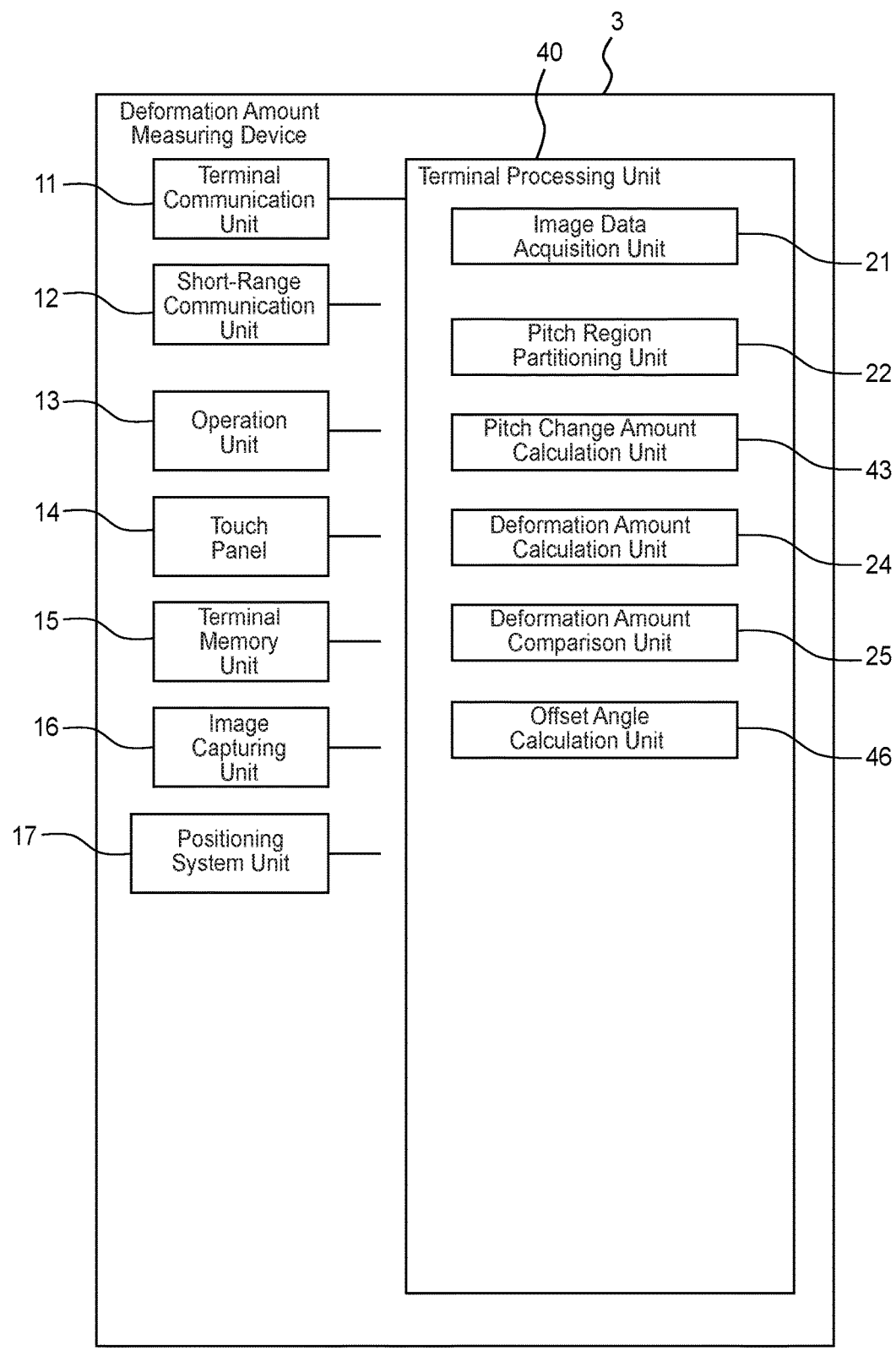
FIG. 23 is a block diagram of a deformation amount measuring device according to a third embodiment.

Configuration and Function of the Deformation Amount Measuring Device According to a Third Embodiment FIG. 23 is a block diagram of a deformation amount measuring device according to a third embodiment.

A deformation amount measuring device 3 differs from the deformation amount measuring device 1 in that the deformation amount measuring device 3 has a terminal processing unit 40 that is provided with a pitch change amount calculation unit 43 instead of the pitch change amount calculation unit 23, and an offset angle calculation unit 46, instead of the terminal processing unit 20. Constituents of the deformation amount measuring device 3 other than the offset angle calculation unit 43 and the offset angle calculation unit 46 have identical configuration and function as the constituents of the deformation amount measuring device 1 marked by the same reference numerals. As such, detailed description thereof is omitted.

Figures 24A, 24B:
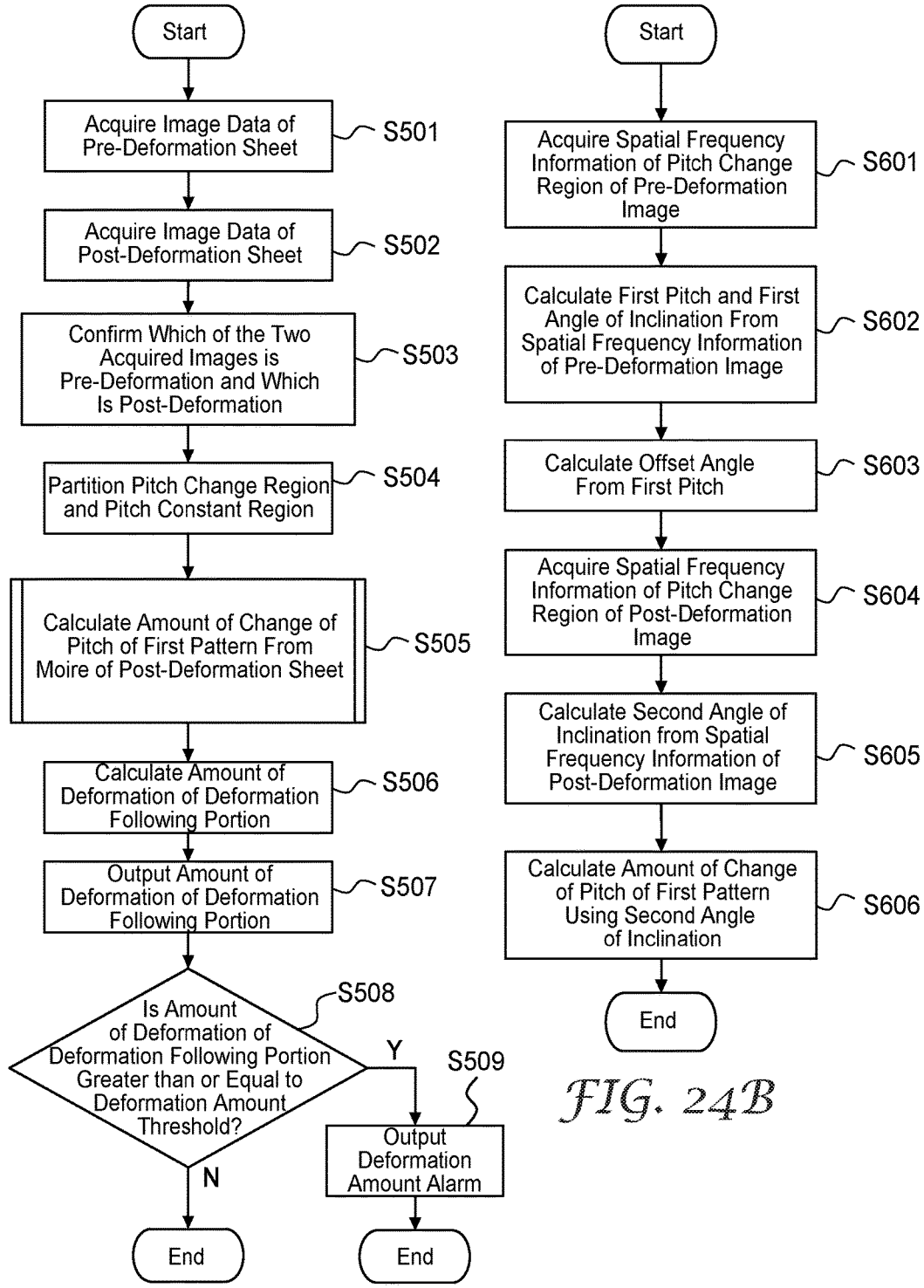
FIG. 24A is a flow chart of deformation amount measuring processing using the deformation amount measuring device depicted in FIG. 23.
FIG. 24B is a more detailed flow chart of the processing of S505 of FIG. 24A.

Deformation Amount Measuring Processing by the Deformation Amount Measuring Device According to the Third Embodiment FIG. 24A is a flow chart of deformation amount measuring processing by the deformation amount measuring device 2; and FIG. 24B is a more detailed flow chart of the processing of S505 of FIG. 24A.

The processing of S501 to S504 and S506 to S509 (except S505) shown in FIG. 24A is the same as the processing of S101 to S104 and S106 to S109 described while referencing FIG. 14A. As such, detailed description thereof is omitted. The processing of S601, S602, and S604 shown in FIG. 24B is the same as the processing of S201 to S203 described while referencing FIG. 14B. As such, detailed description thereof is omitted.

In S603, the deformation amount measuring device 3 calculates the offset angle between the first direction in which the first pattern 121 extends and the second direction in which the second pattern 122 extends from the pitch (pitch) of the pre-deformation first pattern 121 and the first pitch moire_pitch1 of the pre-deformation moire.

Figure 25:
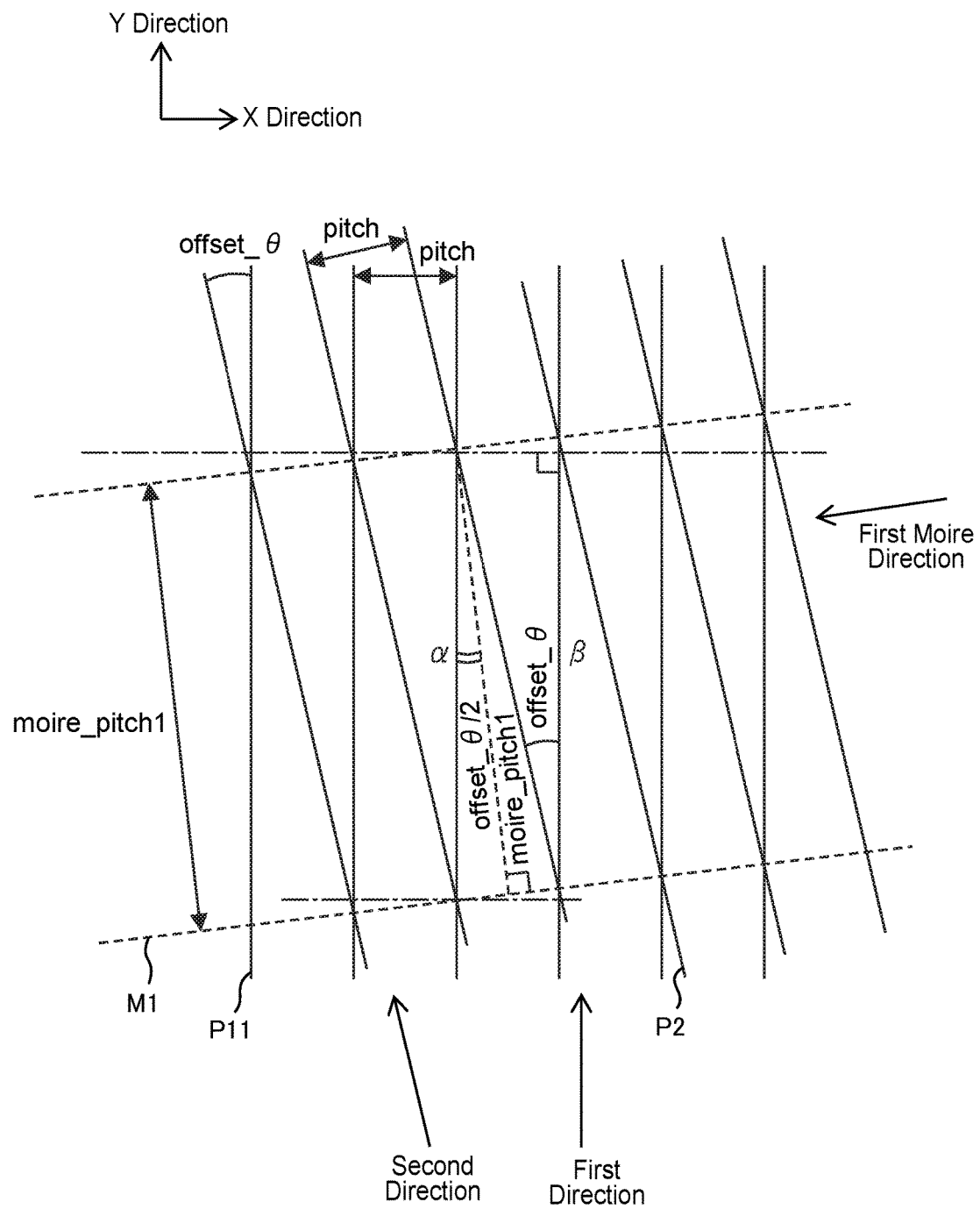
FIG. 25 is a diagram for explaining the processing of S603 shown in FIG. 24B.

FIG. 25 is a diagram for explaining the processing of S603. An interval between a plurality of parallel straight lines P11 (depicted as solid lines) extending in the first direction represents the pre-deformation pitch of the first pattern 121, "pitch"; and an interval between a plurality of parallel straight lines P2 (depicted as solid lines) extending in the second direction represents the pitch (pitch) of the second pattern 122. The pitch of the second pattern 122, "pitch" and the pitch of the first pattern 121, "pitch" are identical. Additionally, an interval between a plurality of parallel straight lines M1 (depicted as dashed lines) extending in the first moire direction represents the first pitch moire_pitch1 of the pre-deformation moire.

The offset angle offset_θ is expressed from the second angle of inclination moire_θ2 of the moire, the pitch (pitch) of the first pattern 121, and the first pitch moire_pitch1 of the moire or an initial angle moire_angle_initial of the moire by:

[Equation 17]

$$\text{Offset}\_\theta = 2 \cdot \arcsin\left(\frac{picth}{2*\text{moire\_pitch1}}\right) \quad (3)$$

or by:

$$\text{offset\_angle} = 2 \cdot \text{moire\_angle\_initial} \quad (4)$$

The offset angle calculation unit 46 calculates the offset angle offset_θ using Equation (3) or Equation (4).

In S605, the pitch change amount calculation unit 43 executes the same processing as for calculating the first angle of inclination moire_θ1 of S202, and calculates the second pitch moire_pitch2, namely the pitch of the post-deformation moire from the spatial frequency information of the pitch change region of the image of the post-deformation sheet 101. Then, the pitch change amount calculation unit 33 calculates the amount of change of the pitch of the first pattern 121 from the offset angle offset_θ calculated in S603, the first pitch moire_pitch1, the first angle of inclination moire_θ1, and the second pitch moire_pitch2 (S606).

Figure 26:
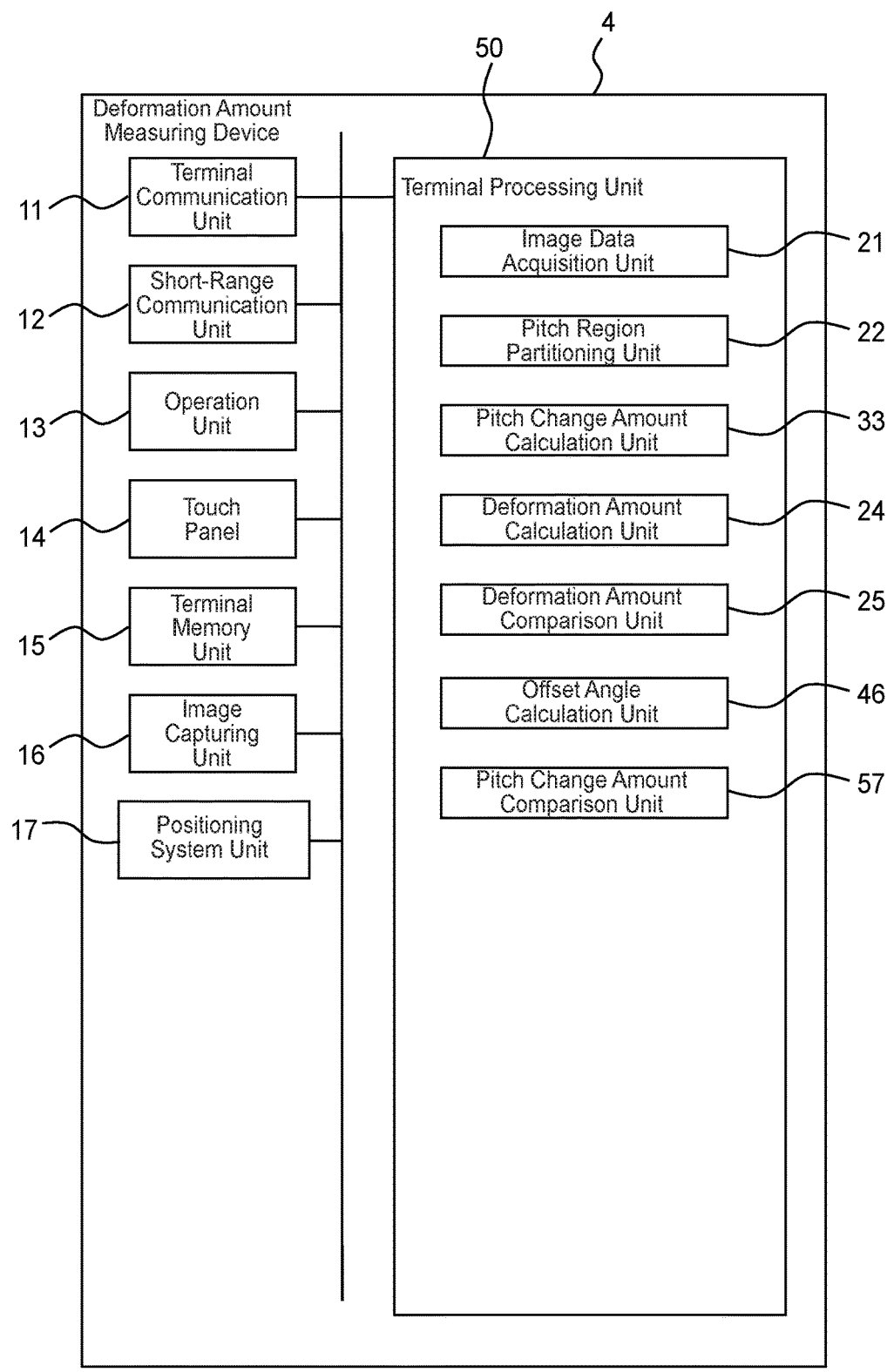
FIG. 26 is a block diagram of a deformation amount measuring device according to a fourth embodiment.

Configuration and Function of the Deformation Amount Measuring Device According to a Fourth Embodiment FIG. 26 is a block diagram of a deformation amount measuring device according to a fourth embodiment.

A deformation amount measuring device 4 differs from the deformation amount measuring device 3 in that the deformation amount measuring device 4 has a terminal processing unit 50 that is provided with a pitch change amount calculation unit 53 instead of the pitch change amount calculation unit 43, and a pitch change amount comparison unit 57, instead of the terminal processing unit 40. Constituents of the deformation amount measuring device 4 other than the pitch change amount calculation unit 53 and the pitch change amount comparison unit 57 have identical configuration and function as the constituents of the deformation amount measuring device 3 marked by the same reference numerals. As such, detailed description thereof is omitted.

Figure 27:
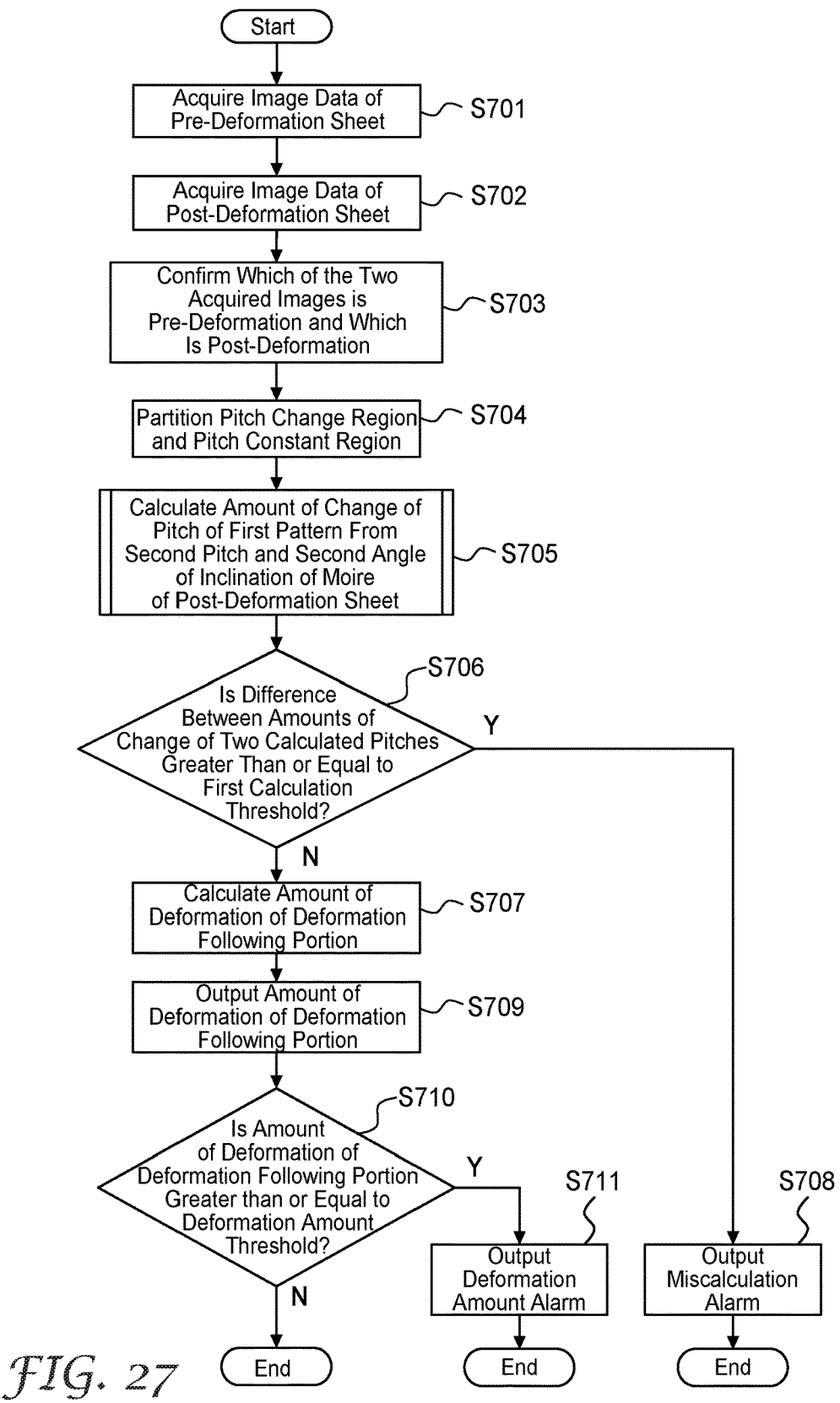
FIG. 27 is a flow chart of deformation amount measuring processing using the deformation amount measuring device depicted in FIG. 26.
Figure 28:
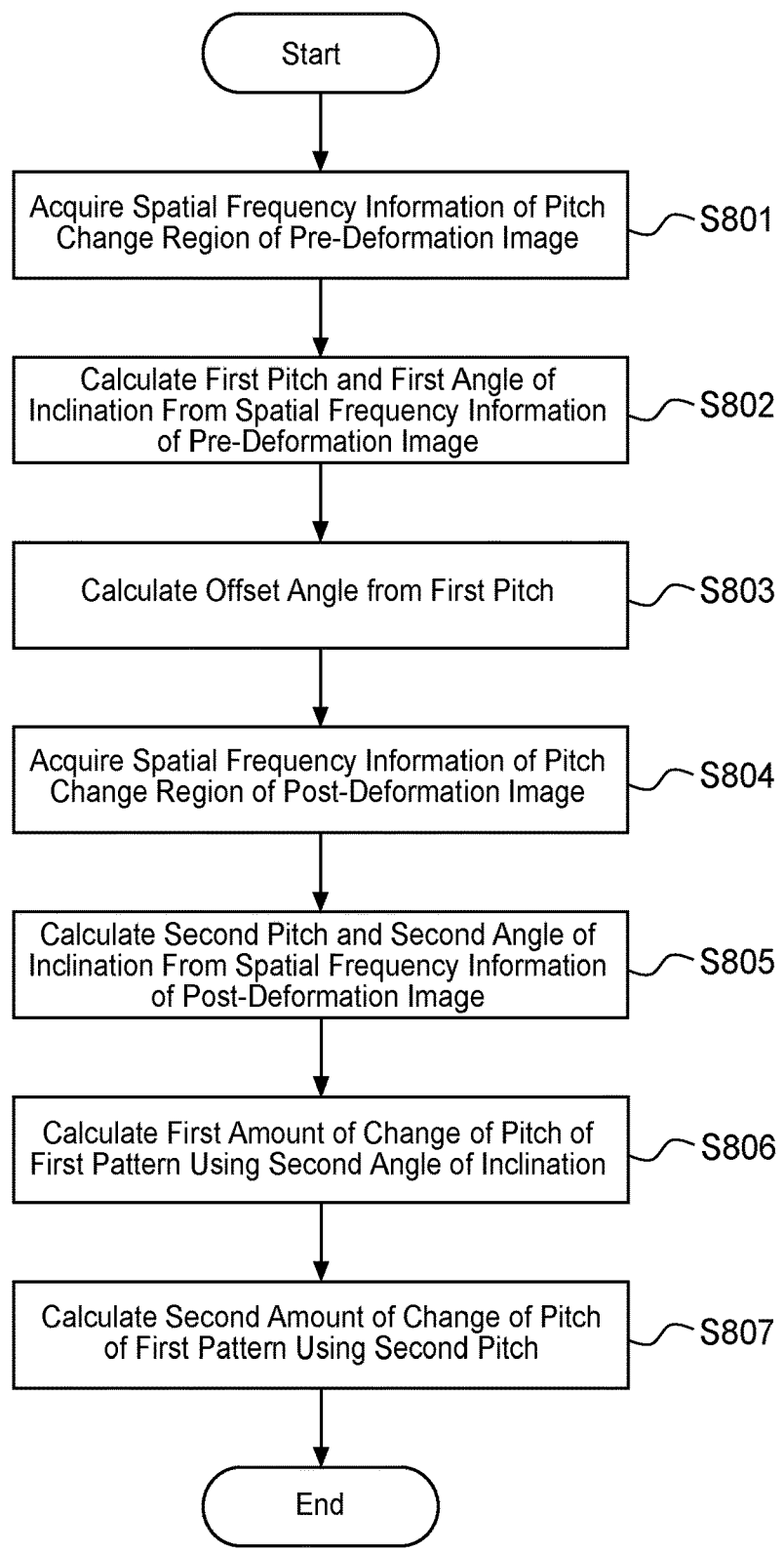
FIG. 28 is a more detailed flow chart of the processing of S705 shown in FIG. 26.

Deformation Amount Measuring Processing by the Deformation Amount Measuring Device According to the Fourth Embodiment FIG. 27 is a flow chart of deformation amount measuring processing by the deformation amount measuring device 4; and FIG. 28 is a more detailed flow chart of the processing of S705 shown in FIG. 26.

The processing of S701 to S703, S706, and S709 to S711 (except S705, S706, and S708) shown in FIG. 27 is the same as the processing of S501 to S503 and S505 to S508 described while referencing FIG. 24A. As such, detailed description thereof is omitted. The processing of S801 to S804 shown in FIG. 28 is the same as the processing of S601 to S604 described while referencing FIG. 24B. As such, detailed description thereof is omitted.

In S805, the pitch change amount calculation unit 53 calculates the angle of inclination of the post-deformation moire, namely the second angle of inclination moire_θ2 and the pitch of the post-deformation moire, namely the second pitch moire_pitch2 from the spatial frequency information of the pitch change region of the image of the post-deformation sheet 101. The processing of calculating the second angle of inclination moire_θ2 and the processing of calculating the second pitch moire_pitch2 are the same as the processing of S204 and the processing of S404, respectively. As such, detailed description thereof is omitted.

Next, the pitch change amount calculation unit 53 calculates a first amount of change of the pitch of the first pattern 121 from the offset angle offset_θ, the first pitch moire_pitch1, the first angle of inclination moire_θ1, and the second angle of inclination moire_θ2 (S806). Next, the pitch change amount calculation unit 53 calculates a second amount of change of the pitch of the first pattern 121 from the offset angle offset_θ, the first pitch moire_pitch1, the first angle of inclination moire_θ1, and the second pitch moire_pitch2 (S807). The processing of S806 and S807 are the same as the processing of S205 and the processing of S405, respectively. As such, detailed description thereof is omitted.

Next, the pitch change amount comparison unit 57 compares a difference between the first amount of change of the first pattern 121 calculated in S806 and the second amount of change of the first pattern 121 calculated in S807 with a predetermined first calculation threshold (S706). The first amount of change of the first pattern 121 calculated in S806 is calculated using the second angle of inclination moire_θ2, and the second amount of change of the first pattern 121 calculated in S807 is calculated using the second pitch moire_pitch2. The pitch change amount comparison unit 57 determines the calculation accuracy of the amount of change of the pitch of the first pattern 121 by determining whether or not the difference between the first amount of change and the second amount of change, which are obtained through different calculation methods, is greater than or equal to the predetermined first calculation threshold.

When the pitch change amount comparison unit 57 has determined that the difference between the first amount of change and the second amount of change of the first pitch is less than the predetermined first calculation threshold, the deformation amount calculation unit 24 calculates the amount of deformation of the deformation following portion 111 (S707). On the other hand, when the pitch change amount comparison unit 57 has determined that the difference between the first amount of change and the second amount of change of the first pitch is greater than or equal to the predetermined first calculation threshold, the pitch change amount comparison unit 57 outputs a miscalculation alarm indicating a possibility that the amount of change of the first pitch that is calculated contains a mistake (S708).

Figure 29:
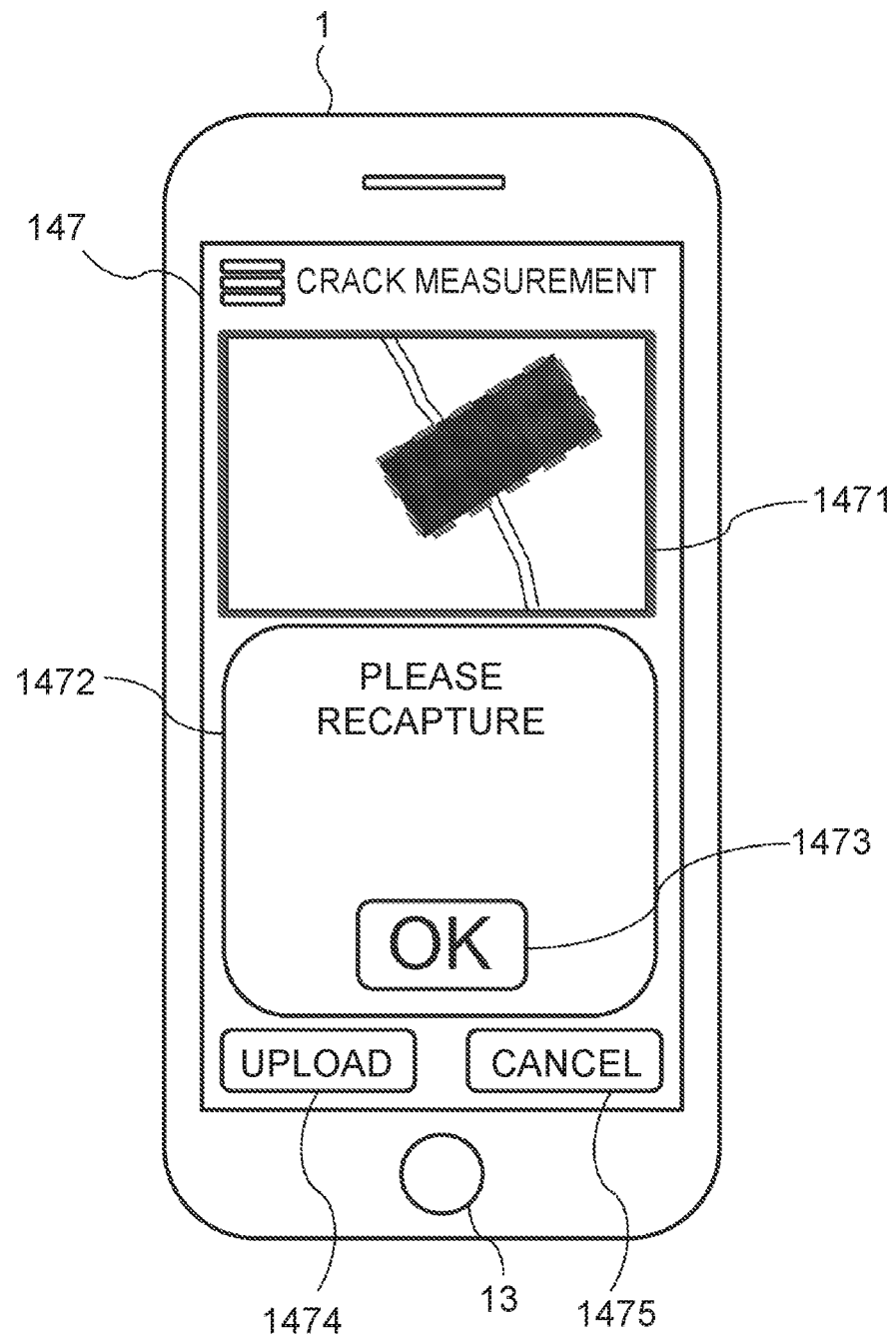
FIG. 29 is drawing illustrating one example of a miscalculation alarm output screen.

FIG. 29 is drawing illustrating one example of a miscalculation alarm output screen to which the pitch change amount comparison unit 57 outputs the miscalculation alarm.

The miscalculation alarm output screen 147 has a captured image display portion 1471, a recapture command display portion 1472, an OK button portion 1473, an upload button portion 1474, and a cancel button portion 1475. An image of the post-deformation sheet 101 corresponding to image data acquired via the image capturing unit 16 is displayed in the captured image display portion 1471. The recapture command display portion 1472 displays a command indicating that the sheet 101 is to be recaptured. In one example, a background of the recapture command display portion 1472 may be displayed as yellow. When the OK button portion 1453 is touched, the deformation amount measuring device 1 assumes a state where an image can be captured. When the upload button portion 1454 is touched, the fact that recapturing has been commanded is stored in the terminal memory unit 15, and the fact that recapturing has been commanded is uploaded to a server (not illustrated). When the cancel button portion 1446 is touched, the deformation amount measuring device 1 assumes a state where an image can be captured.

Figure 30:
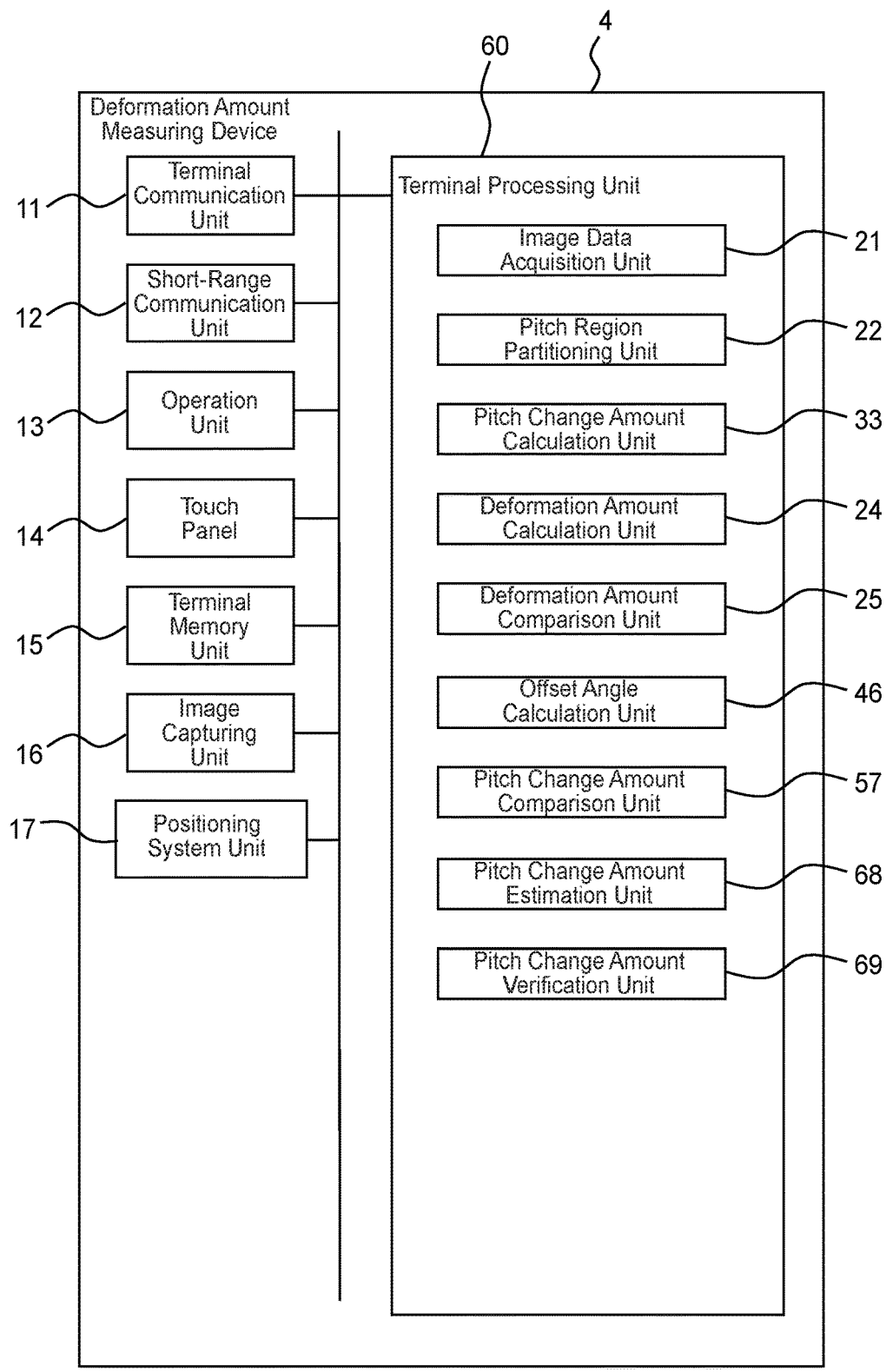
FIG. 30 is a block diagram of a deformation amount measuring device according to a fifth embodiment.

Configuration and Function of the Deformation Amount Measuring Device According to a Fifth Embodiment FIG. 30 is a block diagram of a deformation amount measuring device according to a fifth embodiment.

A deformation amount measuring device 5 differs from the deformation amount measuring device 4 in that the deformation amount measuring device 5 has a terminal processing unit 60 that is provided with a pitch change amount estimation unit 68 and a pitch change amount verification unit 69, instead of the terminal processing unit 50. Constituents of the deformation amount measuring device 5 other than the pitch change amount estimation unit 68 and the pitch change amount verification unit 69 have identical configuration and function as the constituents of the deformation amount measuring device 4 marked by the same reference numerals. As such, detailed description thereof is omitted.

Figure 31:
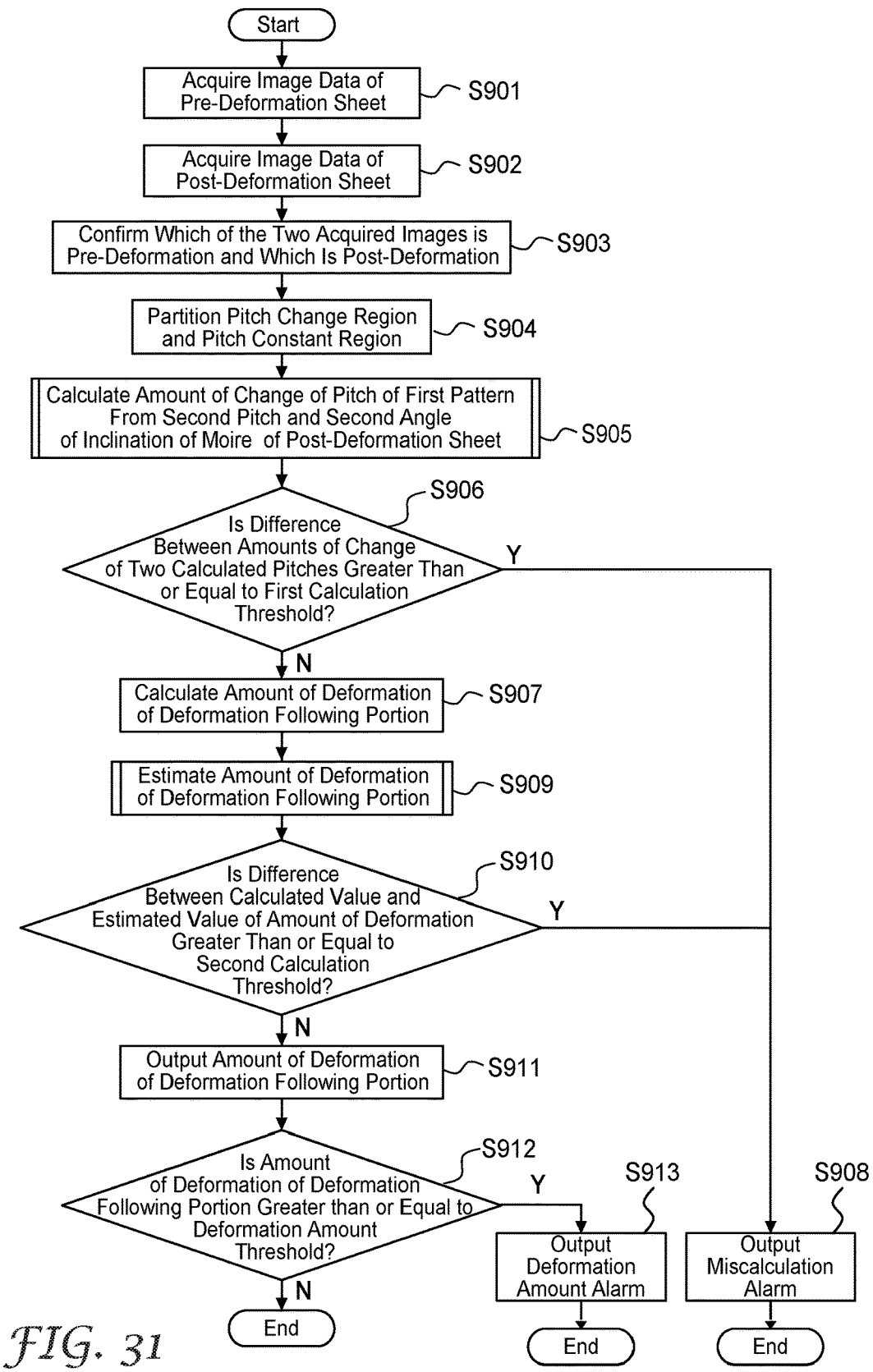
FIG. 31 is a flow chart of deformation amount measuring processing using the deformation amount measuring device depicted in FIG. 30.
Figure 32:
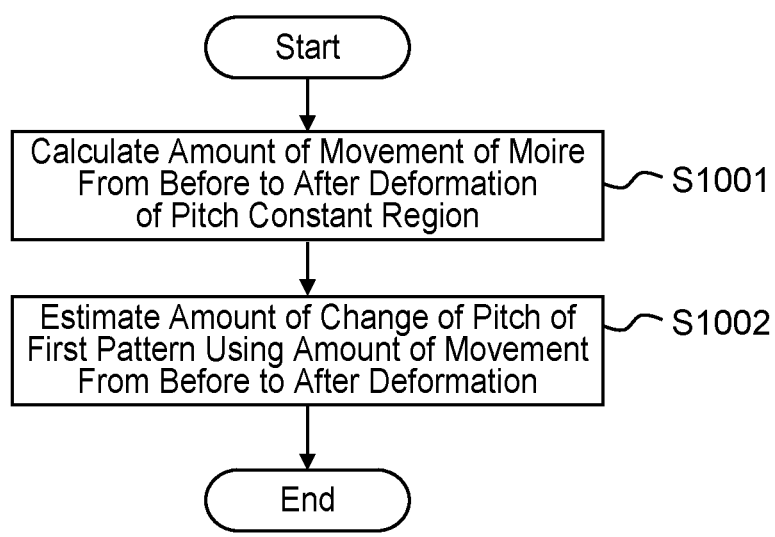
FIG. 32 is a more detailed flow chart of the processing of S908 shown in FIG. 31.

Deformation Amount Measuring Processing by the Deformation Amount Measuring Device According to the Fifth Embodiment FIG. 31 is a flow chart of deformation amount measuring processing by the deformation amount measuring device 2; and FIG. 32 is a more detailed flow chart of the processing of S909 shown in FIG. 31.

The processing of S901 to S908 and S911 to S913 (except S909, S910) shown in FIG. 31 is the same as the processing of S701 to S711 described while referencing FIG. 27. As such, detailed description thereof is omitted.

In S909, the pitch change amount estimation unit 68 estimates the amount of change of the pitch of the first pattern 121. First, the pitch change amount estimation unit 68 calculates an amount of movement of the moire from before to after deformation in the pitch constant region (S1001). Next, the pitch change amount estimation unit 68 estimates the amount of change of the pitch of the first pattern 121 from the amount of movement of the moire estimated in S1001 (S1002).

Figures 33A, 33B:
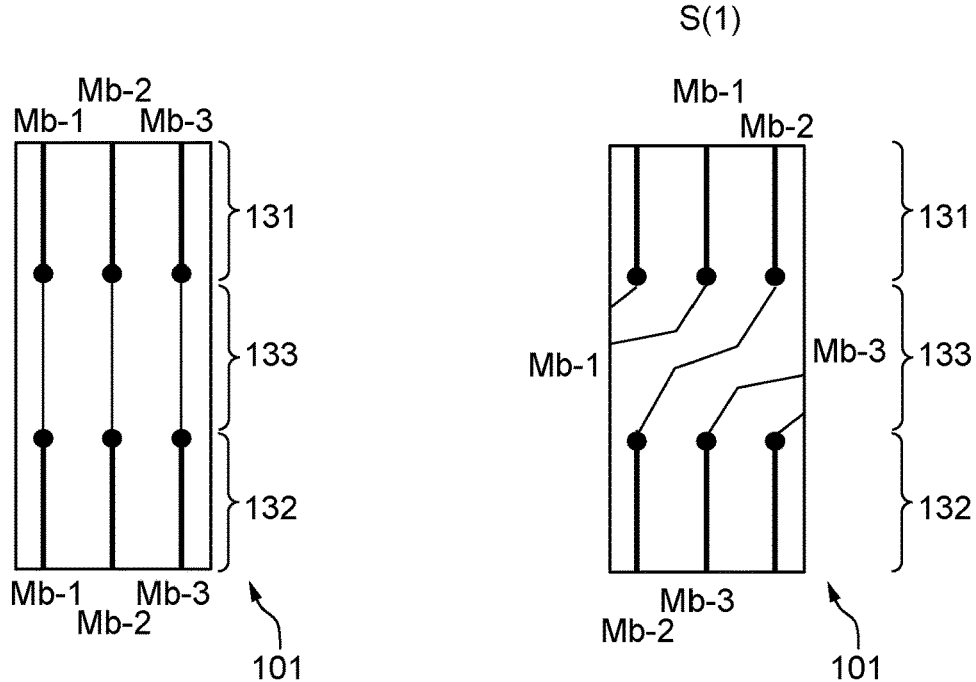
FIGS. 33A to 33D are first diagrams for describing estimation processing of a pitch change amount estimation unit.
Figures 33C, 33D:
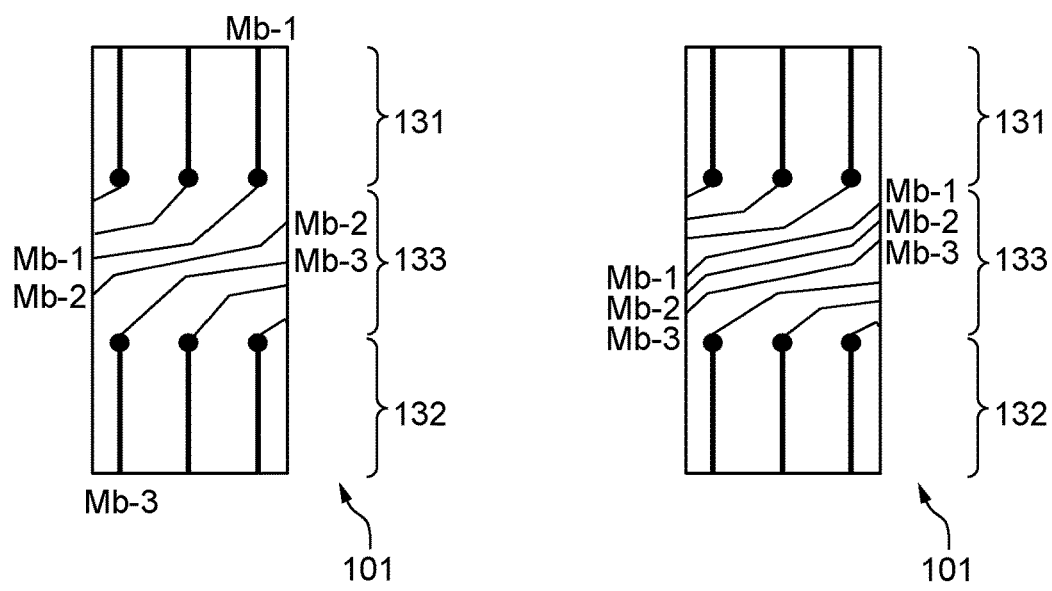

FIGS. 33A to 33D are first drawings for explaining the estimation processing of the pitch change amount estimation unit 68. FIG. 33A is a diagram illustrating a first change state of the sheet 101; and FIG. 33B is a diagram illustrating a second state in which the pitch change region has been further stretched, more than in the first change state. FIG. 33C is a diagram illustrating a third change state in which the pitch change region has been further stretched, more than in the second change state; and FIG. 33D is a diagram illustrating a fourth change state in which the pitch change region has been further stretched, more than in the third change state.

The sheet 101 includes the first pitch constant region 131, the second pitch constant region 132, and the pitch change region 133. Additionally, the sheet 101 includes a first moire Mb-1, a second moire Mb-2, and a third moire Mb-3. In the first change state, each of the first moire Mb-1, the second moire Mb-2, and the third moire Mb-3 is stretched linearly from the first pitch constant region 131 to the second pitch constant region 132. In the second change state, the first moire Mb-1, the second moire Mb-2, and the third moire Mb-3 move 1 pitch in the right direction in the first pitch constant region 131, and move 1 pitch in the left direction in the second pitch constant region 132. In the second change state, the first moire Mb-3 deviates from the second pitch constant region 132, and the third moire Mb-3 deviates from the first pitch constant region 131. In the third change state, the first moire Mb-1 and the second moire Mb-2 move 1 pitch in the right direction in the first pitch constant region 131, and the second moire Mb-2 and the third moire Mb-3 move 1 pitch in the left direction in the second pitch constant region 132. In the third change state, the second moire Mb-3 deviates from the first pitch constant region 132 and the second pitch constant region 132. In the fourth change state, the first moire Mb-1 to the ??? moves 1 pitch in the right direction in the first pitch constant region 131, and the fourth moire Mb-3 moves 1 pitch in the left direction in the second pitch constant region 132. In the fourth change state, the first moire Mb-3 deviates from the first pitch constant region 131, and the third moire Mb-3 deviates from the second pitch constant region 132.

The moire that are produced in the first pitch constant region 131 and the second pitch constant region 132 move in opposite directions while maintaining a constant pitch. The pitch change amount estimation unit 68 estimates an amount of stretching of the pitch change region 133, that is, the amount of deformation of the deformation following portion 111, from the amount of movement of the moire produced in the first pitch constant region 131 and the second pitch constant region 132.

Figure 34:
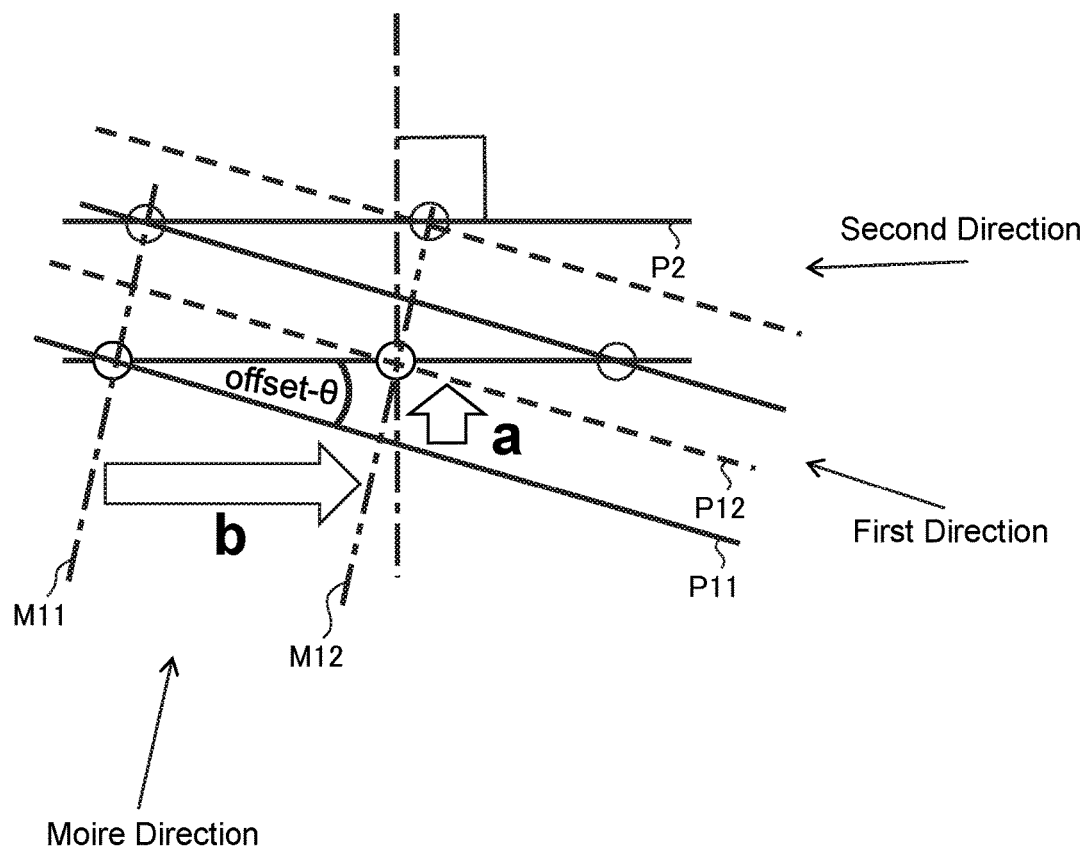
FIG. 34 is a second diagram for explaining the estimation processing of the pitch change amount estimation unit depicted in FIG. 30.

FIG. 34 is a second diagram for explaining the estimation processing of the pitch change amount estimation unit 68. FIG. 34 is a partially exploded view of the first pitch constant region 131. Straight lines P11 (depicted as solid lines) extending in a first direction represent the first pattern 121 before the stretching of the pitch change region 133; and straight lines P12 (depicted as dashed lines) extending in the first direction represent the first pattern 121 after the stretching of the pitch change region 133. Straight lines P2 extending in a second direction represent the second pattern 122. Straight lines M11 (depicted as dot-dash lines) extending in a moire direction represent the moire before the stretching of the pitch change region 133; and straight lines M12 (depicted as dot-dot-dash lines) extending in the moire direction represent the moire after the stretching of the pitch change region 133.

A relationship between an amount of movement a of the first pattern 121 indicated by an arrow a, an amount of movement b of the moire indicated by an arrow b, and the offset angle offset_θ can be expressed as:

$$a = b \times \tan(\text{offset\_}\theta) \quad (5)$$

The pitch change amount estimation unit 68 estimates the amount of stretching a of the pitch change region 133, that is, the amount of deformation of the deformation following portion 111, using Equation (5).

Next, the pitch change amount verification unit 69 compares a difference between the amount of deformation of the deformation following portion 111 calculated in S907 and the amount of deformation of the deformation following portion 111 estimated in S909 with a predetermined second calculation threshold (S910). When the pitch change amount verification unit 69 has determined that the difference between the calculated value and the estimated value of the amount of deformation is less than the predetermined second calculation threshold, the amount of deformation of the deformation following portion 111 calculated in S907 is output (S911). On the other hand, when the pitch change amount verification unit 69 has determined that the difference between the calculated value and the estimated value of the amount of deformation is greater than or equal to the predetermined second calculation threshold, a miscalculation alarm is output indicating a possibility that the amount of deformation of the deformation following portion 111 that is calculated contains a mistake (S708).

Effects of the Deformation Amount Measuring Device According to the Embodiments

In the deformation amount measuring device according to the embodiments, the amount of change of the pitch of the first pattern is found from the moire produced by overlaying the first pattern including the plurality of straight lines extending in the first direction with the second pattern including the plurality of straight lines extending in the second direction different than the first direction. The deformation amount measuring device according to the embodiments can quantitatively and conveniently verify the amount of deformation of the measurement subject by finding the amount of deformation of the measurement subject on the basis of the post-deformation image data corresponding to the post-deformation image including the post-deformation moire of the sheet that includes the first pattern and the second pattern.

Additionally, with the deformation amount measuring devices according to the first and second embodiments, the first angle of inclination and the first pitch of the moire of the pre-deformation sheet are calculated and, therefore, even in cases where variation occurs in the pitch of the first pattern and the second pattern at a time of manufacturing the sheet, the amount of deformation of the measurement subject can be calculated with excellent accuracy.

Additionally, with the deformation amount measuring device according to the third embodiment, the offset angle between the first direction in which the first pattern is stretched and the second direction in which the second pattern is stretched, from the moire of the pre-deformation sheet, is calculated. With the deformation amount measuring devices according to the third embodiment, the offset angle between the first direction and the second direction is calculated and, therefore, even in cases where variation occurs in the offset angle at a time of manufacturing the sheet, the amount of deformation of the measurement subject can be calculated with excellent accuracy.

Additionally, with the deformation amount measuring device according to the fourth embodiment, it is determined whether or not the difference between the first amount of change of the pitch of the first pattern 121 calculated from the angle of inclination of the post-deformation moire and the second amount of change of the pitch of the first pattern 121 calculated from the pitch of the post-deformation moire is greater than or equal to a threshold. With the deformation amount measuring device according to the fourth embodiment, the calculation accuracy of the amount of change of the pitch of the first pattern is determined as a result of the determination of whether or not the difference between the first amount of change and the second amount of change is greater than or equal to the threshold. Therefore, the calculation accuracy of the amount of change of the pitch of the first pattern can be improved.

Additionally, with the deformation amount measuring device according to the fifth embodiment, it is determined whether or not the difference between the amount of change of the pitch of the first pattern 121 estimated from the pitch constant region and the amount of change of the pitch of the first pattern 121 calculated from the pitch of the post-deformation moire is greater than or equal to a threshold. With the deformation amount measuring device according to the fifth embodiment, the calculation accuracy of the amount of change of the pitch of the first pattern can be further improved as a result of the determination of whether or not the difference between the calculated amount of change and the estimated amount of change is greater than or equal to the threshold.

Modified Examples of the First Pattern and the Second Pattern

The first pattern 121 and the second pattern 122 of the sheet 101 each include a plurality of parallel straight lines. However, it is sufficient that the sheet according to the embodiments includes a first pattern including a plurality of line drawings extending in a first direction, and a second pattern including a plurality of line drawings extending in a second direction different than the first direction. For example, each of the first pattern and the second pattern may be a pattern including straight lines arranged in a grid-like form, a checker pattern, a plurality of sine waves extending in the same direction, or the like.

Figure 35A:
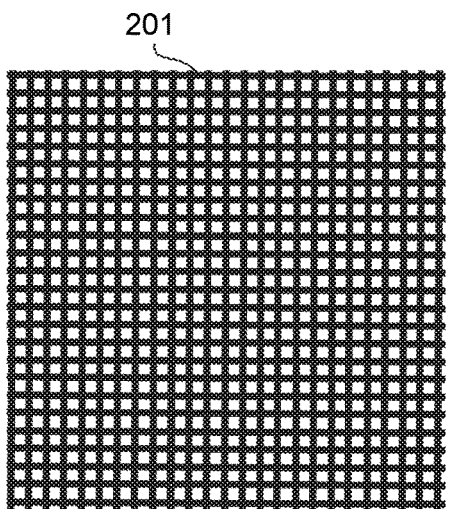
FIGS. 35A to 35F are drawings illustrating modified examples of a first pattern and a second pattern.
Figure 35B:
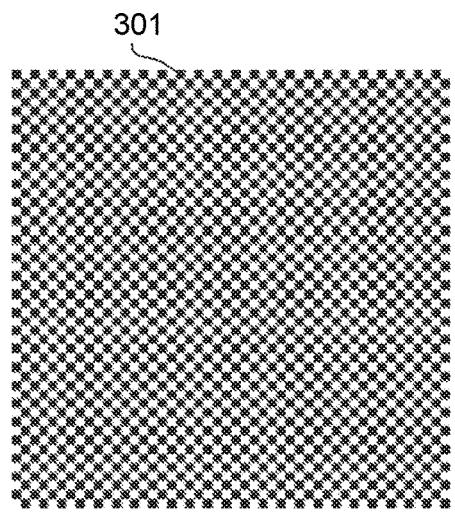
Figure 35C:
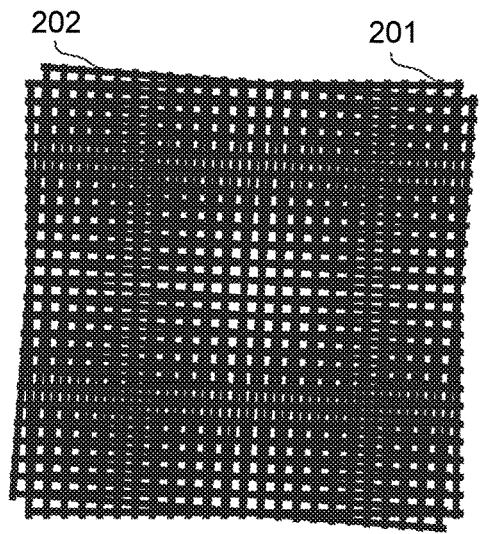
Figure 35D:
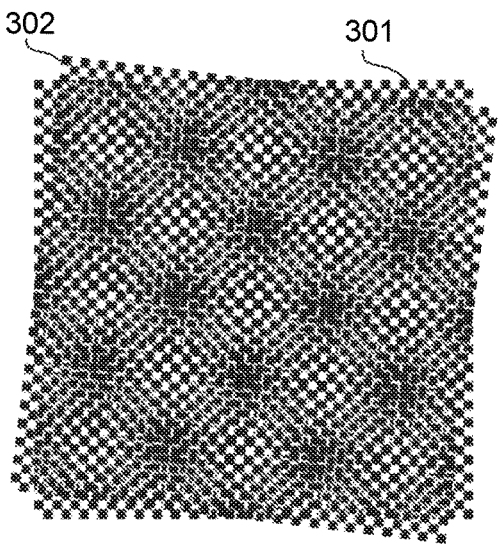
Figure 35E:
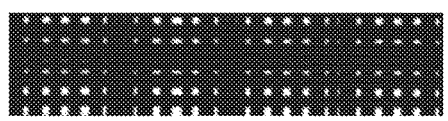
Figure 35F:
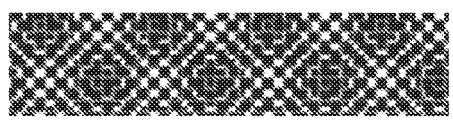

FIGS. 35A to 35F are drawings illustrating modified examples of the first pattern and the second pattern. FIG. 35A illustrates a grid-like first pattern; and FIG. 35B illustrates a first pattern with a checker pattern. FIG. 35C is a drawing illustrating a state where the first pattern depicted in FIG. 35A and a second pattern that has the same form as the first pattern and is disposed so as to have an offset angle with respect to the first pattern are overlaid. FIG. 35D is a drawing illustrating a state where the first pattern depicted in FIG. 35B and a second pattern that has the same form as the first pattern and is disposed so as to have an offset angle with respect to the first pattern are overlaid. FIG. 35E is a partially exploded view of a state where the first pattern of FIG. 35C is stretched 20%; and FIG. 35F is a partially exploded view of a state where the first pattern of FIG. 35D is stretched 20%.

As with the first pattern 121 and the second pattern 122 that include the parallel straight lines, even with either the grid-like first pattern 201 and second pattern 202 or the checker patterned first pattern 301 and second pattern 302, the form of the moire changes from before to after deformation.

Modified Examples of the Deformation Amount Measuring Processing

In the embodiments described above, the pitch change amount calculation unit 23 determines the number of elements of the X-direction component and the Y-direction component of the number of elements between the elements having the greatest value therein and the origin to be an X-direction component fx and a Y-direction component fy of the spatial frequency included in the image. However, in the deformation amount measuring processing according to the embodiments, the numerical values within the elements adjacent to the elements having the greatest value therein may be defined, via parabola fitting, as the X-direction component fx and the Y-direction component fy of the spatial frequency included in the image.

Figure 36A:
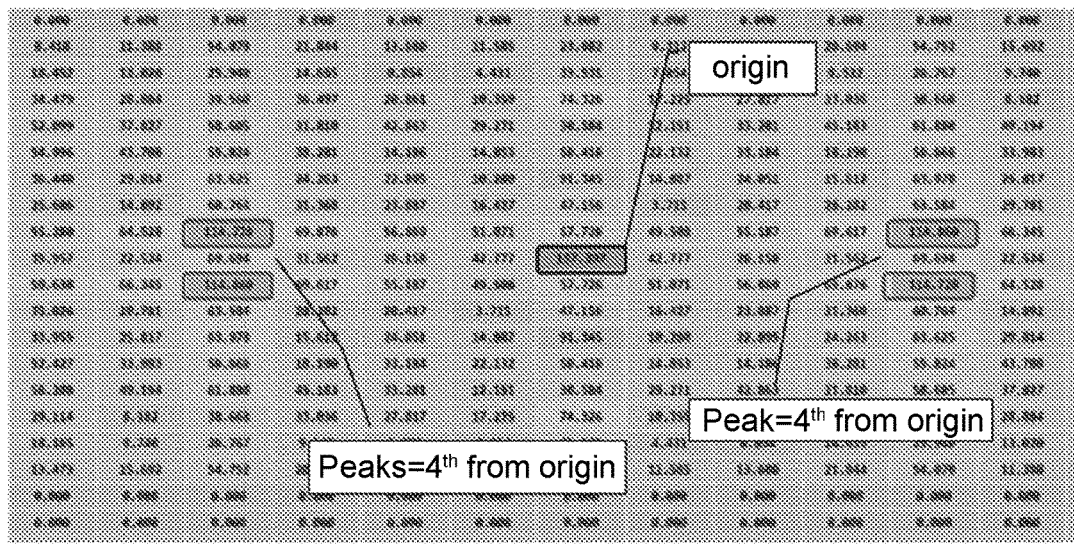
FIG. 36A is a drawing showing one example of spatial frequency information of the sheet having a checker patterned first pattern and second pattern.
Figure 36B:
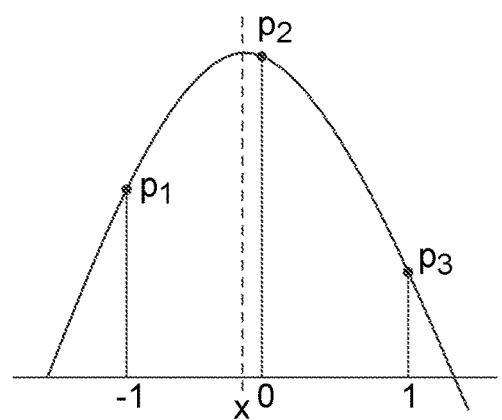
FIG. 36B is a drawing illustrating an overview of parabola fitting.

FIG. 36A is a drawing illustrating one example of spatial frequency information of the sheet having a checker patterned first pattern and second pattern; and FIG. 36B is a drawing illustrating an overview of the parabola fitting.

In FIG. 36A, an average of the numerical values within the elements ±4 from the origin in the X direction and the elements ±1 from the origin in the Y direction is the greatest, at 1114.728. An average of the numerical values within the elements ±3 from the origin in the X direction and the elements ±1 from the origin in the Y direction is 69.826, and an average of the numerical values within the elements ±5 from the origin in the X direction and the elements ±1 from the origin in the Y direction is 64.528. The X-direction component fx of the spatial frequency is corrected to 3.94 by subjecting these numerical values to the parabola fitting shown in FIG. 36B.

Additionally, in the embodiments described above, in the processing of S205, the Y-direction component moire_pitch_y of the second pitch is calculated from the first pitch moire_pitch1 of the pre-deformation moire and the offset angle offset_θ. However, the Y-direction component moire_pitch_y of the second pitch may be calculated from the first angle of inclination moire_θ1 of the pre-deformation moire and the offset angle offset_θ.

Figure 37:
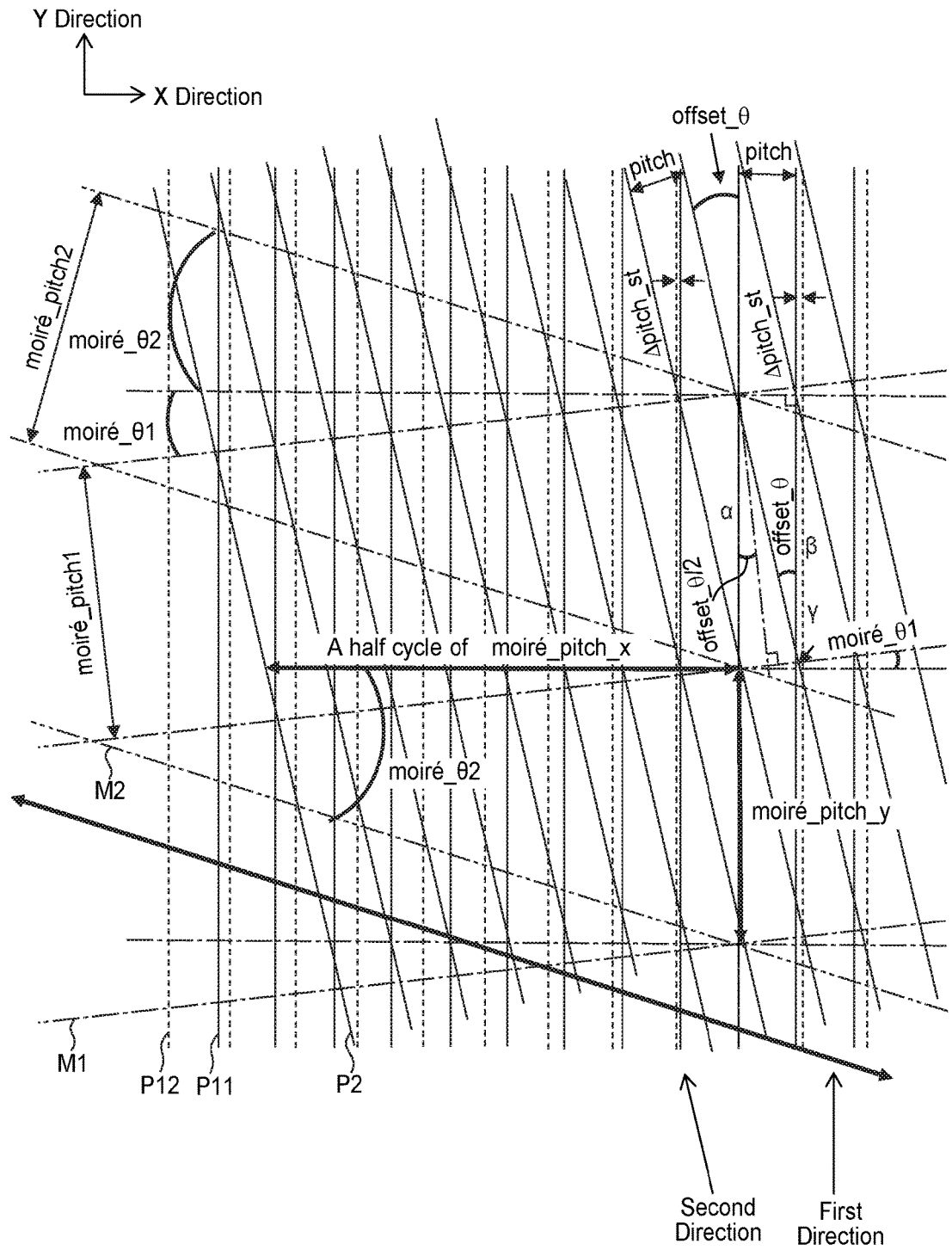
FIG. 37 is a diagram for explaining calculation processing of a Y-direction component of a second pitch.

FIG. 37 is a diagram for explaining calculation processing of the Y-direction component moire_pitch_y of the second pitch. An interval between a plurality of parallel straight lines P11 (depicted as solid lines) extending in a first direction represents the pre-deformation pitch of the first pattern 121, "pitch"; and an interval between a plurality of parallel straight lines P12 (depicted as dashed lines) extending in the first direction represents the post-deformation pitch of the first pattern 121, "pitch+Δpitch_st". Additionally, an interval between a plurality of parallel straight lines P2 (depicted as solid lines) extending in a second direction represents the pitch of the second pattern 122, "pitch". The pitch of the second pattern 122, "pitch" and the pitch of the first pattern 121, "pitch" are identical. Additionally, an interval between a plurality of parallel straight lines M1 (depicted as dot-dash lines) represents the first pitch moire_pitch1 of the pre-deformation moire, and an interval between a plurality of parallel straight lines M2 (depicted as dot-dot-dash lines) represents the pitch moire_pitch2 of the post-deformation moire.

In FIG. 37, a relationship between a length represented by β, the offset angle offset_θ, and the pitch (pitch) of the first pattern 121 is expressed by:

[Equation 18]

$$\tan(\text{moire\_}\theta 1) = \frac{\gamma}{\text{pitch}}$$

Additionally, in FIG. 37, a relationship between a length represented by γ, the first angle of inclination moire_θ1 of the pre-deformation moire, and the pitch (pitch) of the first pattern 121 is expressed by:

[Equation 19]

$$\tan(\text{offset\_}\theta) = \frac{\text{pitch}}{\beta}$$

The Y-direction component moire_pitch_y of the second pitch is the sum of the length represented by β and the length represented by γ and, therefore, is expressed by:

[Equation 20]

$$\text{moire\_pitch\_y} = \beta + \gamma = \text{pitch} \cdot \tan(\text{moire\_}\theta 1) + \frac{\text{pitch}}{\tan(\text{offset\_}\theta)} = \text{pitch} \cdot \tan(\text{moire\_}\theta 1) + \frac{\text{pitch}}{\tan(\text{offset\_}\theta)}$$

Additionally, in the embodiments described above, the amount of deformation of the measurement subject is found by capturing an image of the sheet 101 that includes the deformation following portion 111, the non-deformation following portion 112, and the deformation buffer portion 113, but the amount of deformation of the measurement subject may be found using another sheet.

Figure 38A:
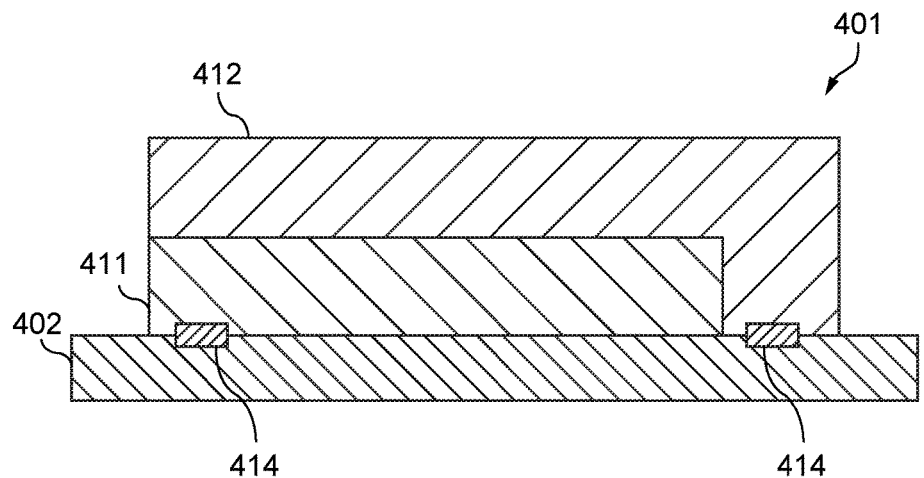
FIG. 38A is a drawing illustrating a first state of the sheet according to a modified example.
Figure 38B:
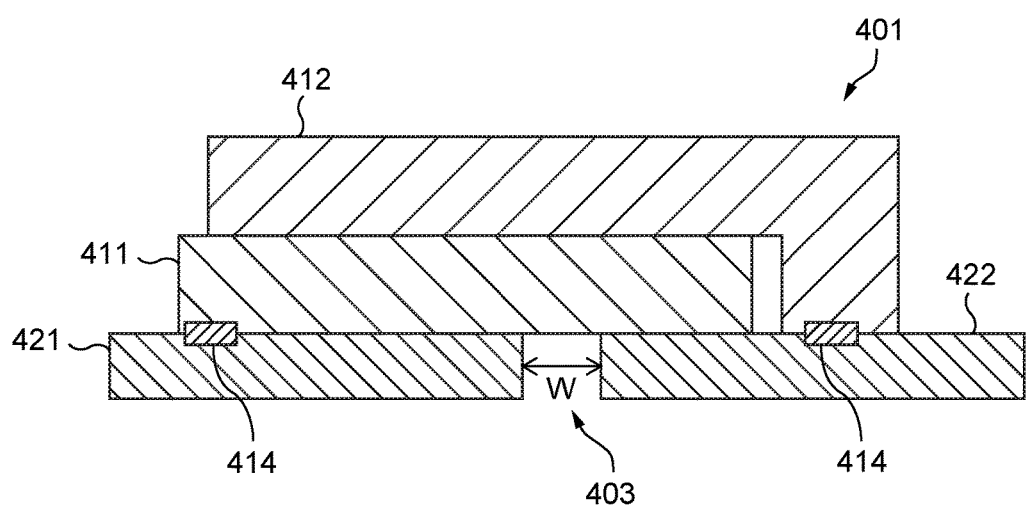
FIG. 38B is a drawing illustrating a second state of the sheet depicted in FIG. 38A.

FIG. 38A is a cross-sectional view illustrating a first state of the sheet according to a modified example; and FIG. 38B is a cross-sectional view illustrating a second state of the sheet depicted in FIG. 38A.

The sheet 401 includes a first layer portion 411 having a first pattern that includes a plurality of line drawings extending in a first direction, and a second layer portion 412 overlaid on the first layer portion 411 and having a second pattern that includes a plurality of line drawings extending in a second direction different than the first direction. The first layer portion 411 and the second layer portion 412 are each adhered to a measurement subject 402 via adhesive portions 414.

The positional relationship between the first pattern and the second pattern displaces when a first state where the measurement subject 402 is continuous changes to a second state where a first portion 421 adhered to the first layer portion 411 and a second portion 422 adhered to the second layer portion 412 are separated by a gap 403. The deformation amount measuring device according to the embodiments can find a width W of the gap 403 by a method similar to the estimation processing of the pitch change amount estimation unit 68.

Additionally, the deformation amount measuring device 1 may record the history of the deformation amount measuring processing in the terminal memory unit 15, and a deformation amount measuring history screen that displays the stored history of the deformation amount measuring processing may be displayed on the touch panel 14.

Figure 40:
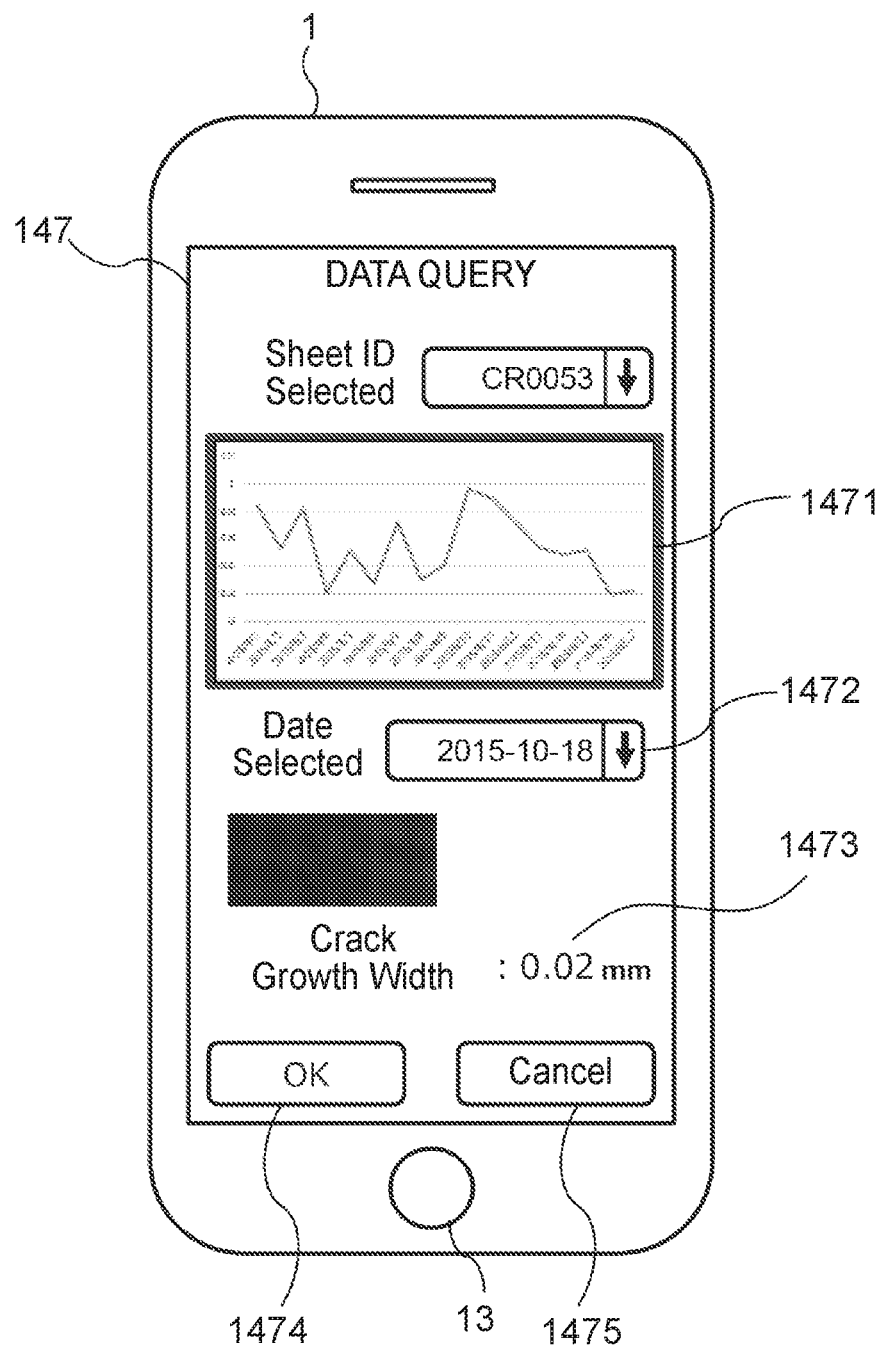
FIG. 40 is drawing illustrating one example of a history display screen.

FIGS. 39A and 39B are drawings illustrating examples of history tables stored in the terminal memory unit 15; and FIG. 40 is a drawing illustrating an example of a history display screen in which the history tables shown in FIGS. 39A and 39B are displayed on the touch panel 14. FIG. 39A is an example of an information table associated with images; and FIG. 39B is an example of an information table associated with sheet part numbers. The information table shown in FIG. 39A associates a sheet ID with a photograph ID, a capture date/time, a photographer, the sheet part number, a capture location, whether the location is the same or different, the amount of deformation of the deformation following portion, and the presence/absence of the output of the deformation amount alarm. The information table shown in FIG. 39B associates a sheet part number with the width and pitch of the pattern of the deformation following portion 111, the width and pitch of the pattern of the non-deformation following portion 112, the offset angle, and dimensions of the sheet 101.

The deformation amount measuring history screen 147 has a measuring history display portion 1471, date display portion 1472, a deformation amount display portion 1473, an OK button portion 1474, and a cancel button portion 1475. The history of the deformation amount measuring processing stored in the terminal memory unit 15 by the table shown in FIG. 39A or the like is displayed in the measuring history display portion 1461. Dates are selectably displayed in the date display portion 1472 for displaying the amount of deformation in the deformation amount display portion 1473. The amount of deformation for the date selected in the deformation amount display portion 1473 is displayed as a crack growth width in the deformation amount display portion 1473.

Additionally, in the embodiments described above, the first angle of inclination and the first pitch of the pre-deformation moire are calculated from the pre-deformation image data, but, with the deformation amount measuring device according to the embodiments, the first angle of inclination and the first pitch of the pre-deformation moire may be stored along with the offset angle as reference data in the memory unit. Additionally, in the embodiments described above, the angle of inclination and the pitch of the moire before and after deformation are calculated from the spatial frequency region information. However, with the deformation amount measuring device according to the embodiments, the angle of inclination and the pitch of the moire from before to after deformation may be calculated by other image processing such as adjusting of shading or thinning processing of the moire, or the like.

In the embodiments described above, the deformation amount alarm and the miscalculation alarm are displayed on the touch panel of the deformation amount measuring device, but with the deformation amount measuring device of the embodiments, the deformation amount alarm and the miscalculation alarm may be configured as audible alarms emitted from a speaker (not illustrated).

Additionally, in the embodiments described above, the deformation amount measuring processing is executed by a single deformation amount measuring device but the deformation amount measuring processing of the embodiments may be executed by a plurality of devices, working in cooperation with each other.

Figure 41:
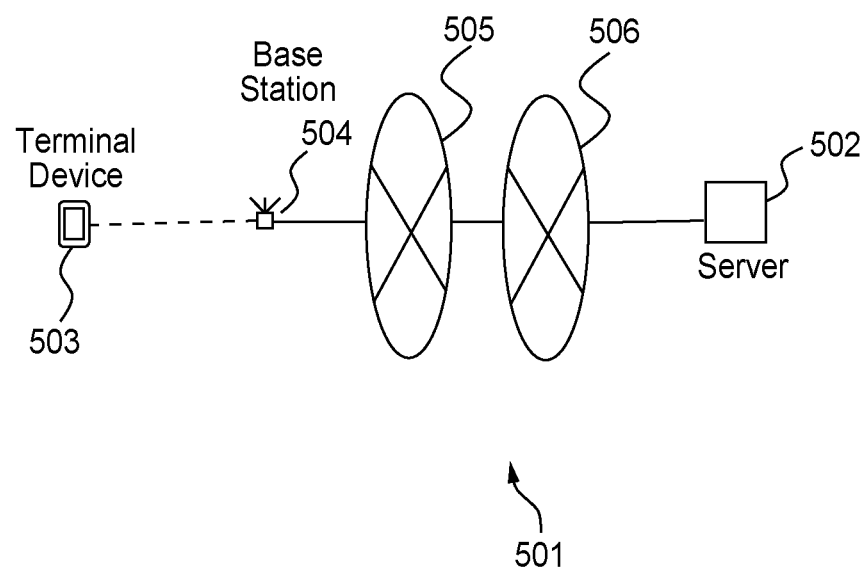
FIG. 41 is a drawing illustrating one example of a schematic configuration of a deformation amount measuring system according to the present embodiment.

FIG. 41 is a drawing illustrating one example of a schematic configuration of a deformation amount measuring system according to an embodiment.

In the deformation amount measuring system 501, switching equipment (not illustrated) is mutually connected via a wide-range communications network, namely a communications network 505. The switching equipment connects a wireless communications network that covers a certain area to the communications network 505. A base station 504 is disposed in the wireless communications network to administer a wireless zone covering the area. The base station 504 is connected to the switching equipment via a wireless network control device (not illustrated) to which the base station 504 belongs. Moreover, when a terminal device 503 within the area performs communication with a server 502 or the like, the terminal device 503 is connected to the switching equipment via the base station 504 and also connected to the communications network 505.

Additionally, the communications network 505 is connected to an intranet 506 via a gateway (not illustrated), by means of a wired LAN or similar Ethernet®. Furthermore, the sever 502 is connected to the intranet 506.

Figure 42:
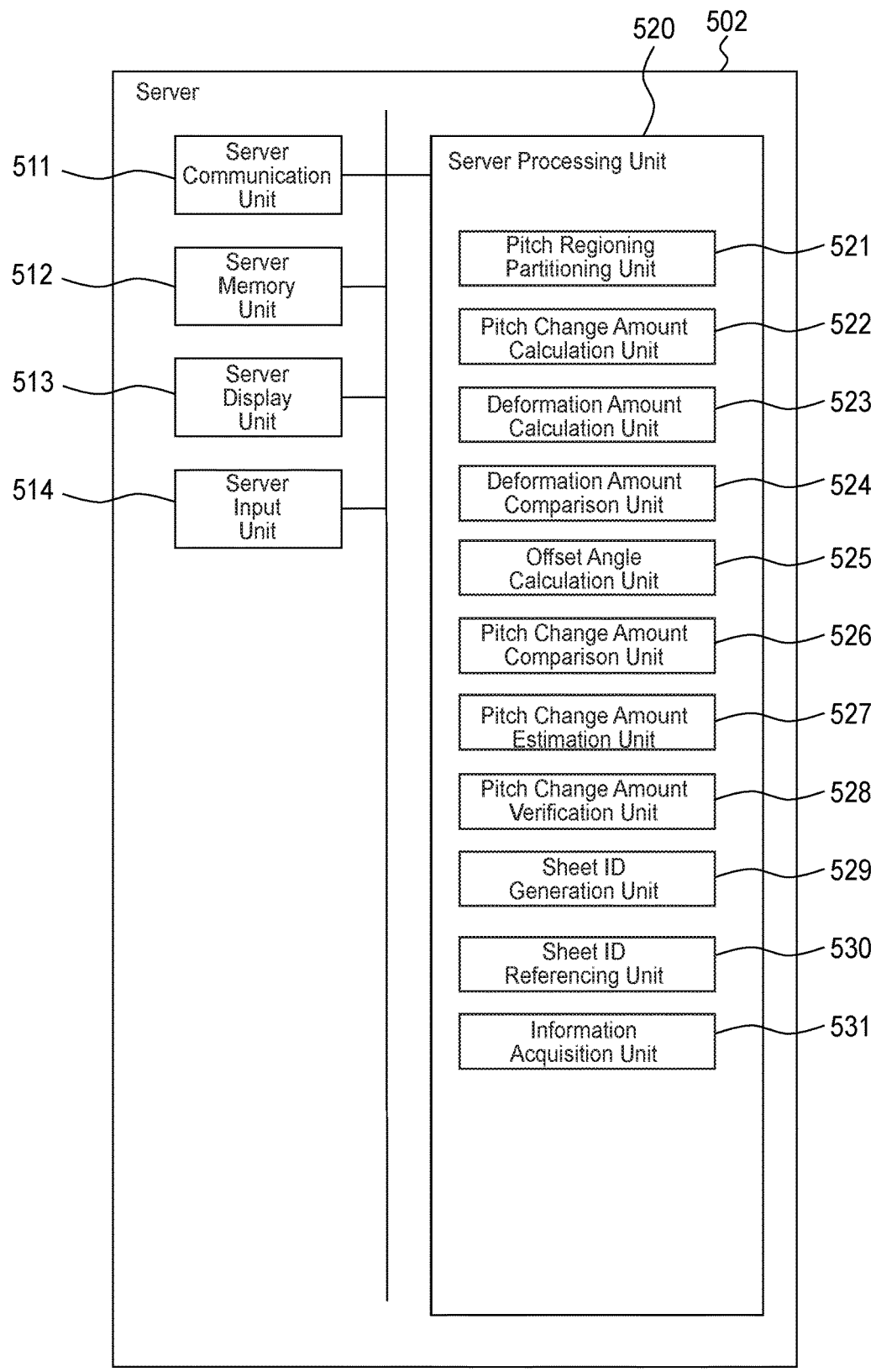
FIG. 42 is a drawing illustrating one example of a schematic configuration of a server depicted in FIG. 41.

FIG. 42 is a drawing illustrating one example of a schematic configuration of the server 502.

The server 502 is an information processing device capable of various types of information processing, and is provided with a server communication unit 511, a server memory unit 512, a sever display unit 513, a sever input unit 514, and a server processing unit 520.

The server communication unit 511 includes a wired communication interface circuit such as an Ethernet®. The server communication unit 511 performs communication with the terminal device 503 and the like via the intranet 506. Moreover, the server communication unit 511 supplies data received from the terminal device 503 and the like to the terminal processing unit 520. Additionally, the server communication unit 511 sends data supplied from the server processing unit 520 to the terminal device 503 and the like.

The server memory unit 512 includes at least one of, for example, semiconductor memory, a magnetic disk device, and an optical disk device. The server memory unit 512 stores driver programs, operating system programs, application programs, data, and the like used in the processing by the server processing unit 520. For example, as driver programs, the server memory unit 512 stores a communication device driver program for controlling the server communication unit 511, and the like. Additionally, as operating system programs, the server memory unit 512 stores connection control programs by communication protocol such as transmission control protocol/internet protocol (TCP/IP) and the like. Additionally, as application programs, the server memory unit 512 stores data processing programs for recording a software keyboard and also for sending/receiving various types of data. The computer programs may be installed to the terminal memory unit 512 using a known setup program or the like, from a computer-readable portable recording medium such as, for example, a CD-ROM, a DVD-ROM, or the like.

The sever display unit 513 may be any device provided that output of moving images, still images, and the like is possible, and examples thereof include touch panel display devices, liquid crystal displays, organic electro-luminescence (EL) displays, and the like. The server display unit 513 displays moving images corresponding to moving image data, still images corresponding to still image data, and the like supplied from the server processing unit 520.

The server input unit 514 may be any device provided that input to the server 502 is possible, and examples thereof include touch panel input devices, keypads, and the like. A user can use this device to input characters, numbers, and the like. The server input unit 514 receives commands from the user, generates signals corresponding to the received commands, and outputs the signals to the server processing unit 520.

The server processing unit 520 is provided with one or a plurality of processors and peripheral circuits thereto. The server processing unit 520 integrally controls the overall operations of the server 502 and, for example, is a CPU. The server processing unit 520 controls the operations of the server communication unit 511, and the like so that the various processes of the server 502 are executed with appropriate procedures corresponding to the programs stored in the server memory unit 512, and the like. The server processing unit 520 executes processing on the basis of the programs (the driver programs, the operating system programs, the application programs, and the like) stored in the server memory unit 512. Additionally, the server processing unit 520 can execute a plurality of programs (the application programs and the like) in parallel.

The server processing unit 520 includes a pitch region partitioning unit 521, a pitch change amount calculation unit 522, a deformation amount calculation unit 523, a deformation amount comparison unit 524, an offset angle calculation unit 525, and a pitch change amount comparison unit 526. The server processing unit 520 further includes a pitch change amount estimation unit 527, a pitch change amount verification unit 528, a sheet identification information (sheet ID) generation unit 529, a sheet identification information (sheet ID) reference unit 530, and an information acquisition unit 531. An event conversion unit 240 includes a character data conversion unit 241 and an updated image generation unit 242. Each of the components of the server processing unit 520 is a functional module that is implemented by a program executed on the processor of the server processing unit 520. Alternatively, each of the components that is provided in the server processing unit 520 may be implemented in the server 502 as an independent integrated circuit, microprocessor, or firmware.

Figure 43:
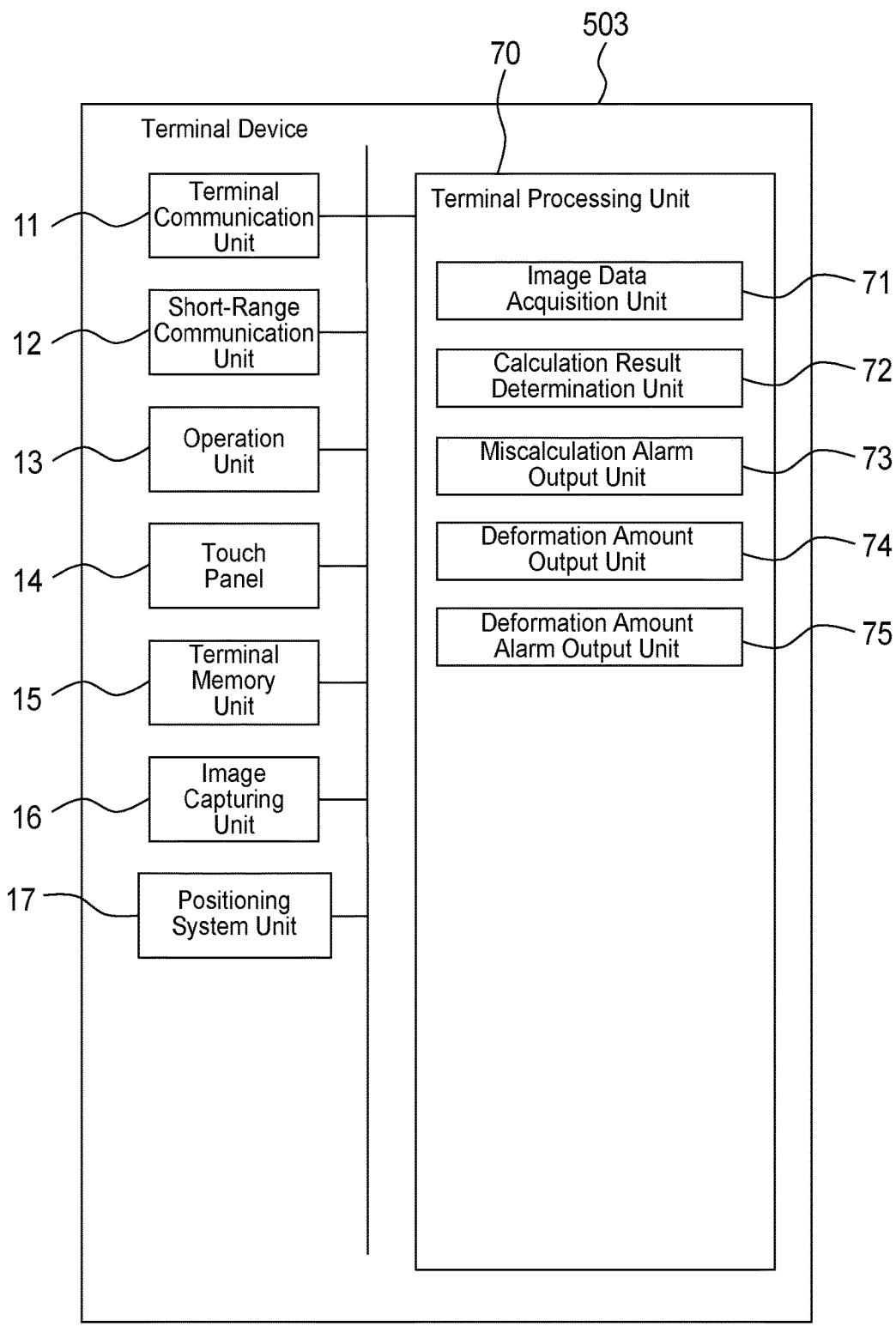
FIG. 43 is a drawing illustrating one example of a schematic configuration of a terminal device depicted in FIG. 41.

FIG. 43 is a drawing illustrating one example of a schematic configuration of the terminal device 503.

The terminal device 503 differs from the deformation amount measuring device 5 in that the terminal device 503 includes a terminal processing unit 70 instead of the terminal processing unit 60. The terminal processing unit 70 includes an image data acquisition unit 71, a calculation result determination unit 72, a miscalculation alarm output unit 73, a deformation amount output unit 74, and a deformation amount alarm output unit 75. Constituents of the terminal device 503 other than the terminal processing unit 70 have identical configuration and function as the constituents of the deformation amount measuring device 5 marked by the same reference numerals. As such, detailed description thereof is omitted.

Figure 44:
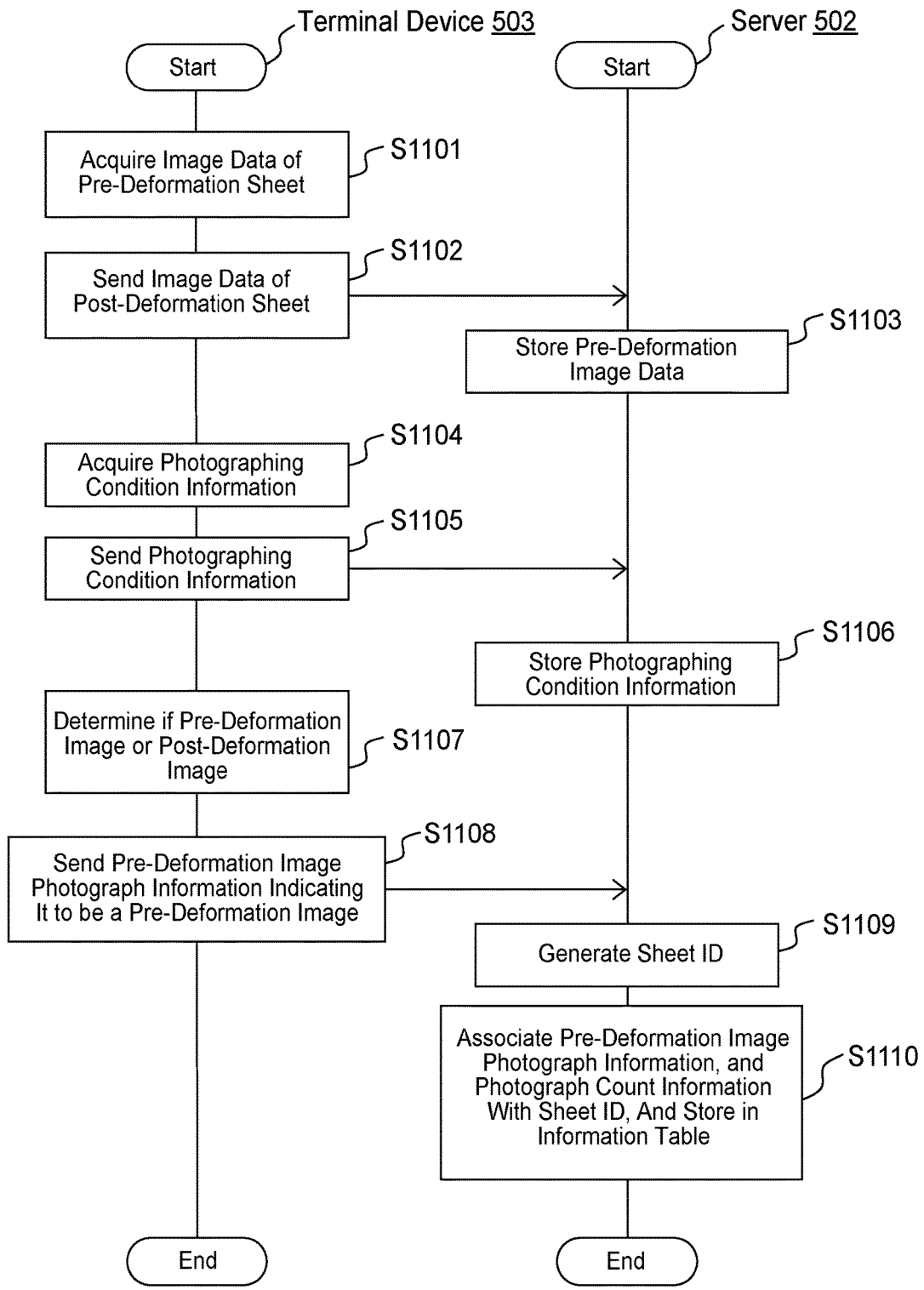
FIG. 44 is a drawing illustrating one example of an operation sequence of pre-deformation image data acquisition processing using the deformation amount measuring system depicted in FIG. 41.

FIG. 44 is a drawing illustrating one example of an operation sequence of pre-deformation image data acquisition processing by the deformation amount measuring system 501.

The operation sequence described below is executed mainly by the control units of each of the devices in cooperation with the components of each of the devices, on the basis of programs stored in advance in memory units of each device in the devices.

First, the image data acquisition unit 71 acquires image data corresponding to an image of the pre-deformation sheet 101 that has been adhered to the measurement subject. The image is captured by an operator (not illustrated) via the image capturing unit 16 (S1101). Next, the image data acquisition unit 71 sends the image data corresponding to the acquired image to the server 502 (S1102). Next, the information acquisition unit 531 stores the image data corresponding to the received image to the server memory unit 512 (S1103).

Next, the image data acquisition unit 71 acquires photographing condition information including a photographing date/time and a photographing location at which the image data corresponding to the acquired image was photographed, a sheet part number, and the like (S1104). Next, the image data acquisition unit 71 sends the acquired photographing condition information to the server 502 (S1105). Next, the information acquisition unit 531 stores the received photographing condition information in the image association table and the sheet part number table of the server memory unit 512 (S1106).

Next, the image data acquisition unit 71 determines if the acquired image is a pre-deformation image or post-deformation image (S1107). The image data acquisition unit 71 determines that the image shown by the acquired image data is a pre-deformation image depending on "pre-deformation" being selected in the captured image selection portion of the pre-deformation image display screen 142 by the operator (not illustrated). Next, the image data acquisition unit 71 sends pre-deformation image photograph information indicating that the acquired image is a pre-deformation image to the server 502 (S1108). Next, a sheet ID generation unit 529 generates a sheet ID (sheet identification information) (S1109). Then, the information acquisition unit 531 stores the acquired image data, the various information, and the sheet ID generated by the sheet ID generation unit 529 in the image association table of the server memory unit 512 (S1110).

FIG. 45A is a drawing illustrating a first state of one example of an image association table; FIG. 45B is a drawing illustrating a second state of the image association table depicted in FIG. 45A; and FIG. 45C is a drawing illustrating one example of a sheet part number table.

The image association table depicted in FIG. 45A shows a state where the photographing condition information received by the information acquisition unit 531 in S1106 has been filled in, and the image association table depicted in FIG. 45B shows a state where the information acquisition unit 531 has filled in the sheet ID in S1110. When filling in the image association table with the sheet ID, the information acquisition unit 531 enters in the image association table that the image data is image data of a first instance, that the amount of deformation of the deformation following portion 111 is zero, and that a deformation amount alarm has not been output. The sheet association table depicted in FIG. 45C shows a state where the photographing condition information received by the information acquisition unit 531 in S1106 has been filled in.

Figure 46:
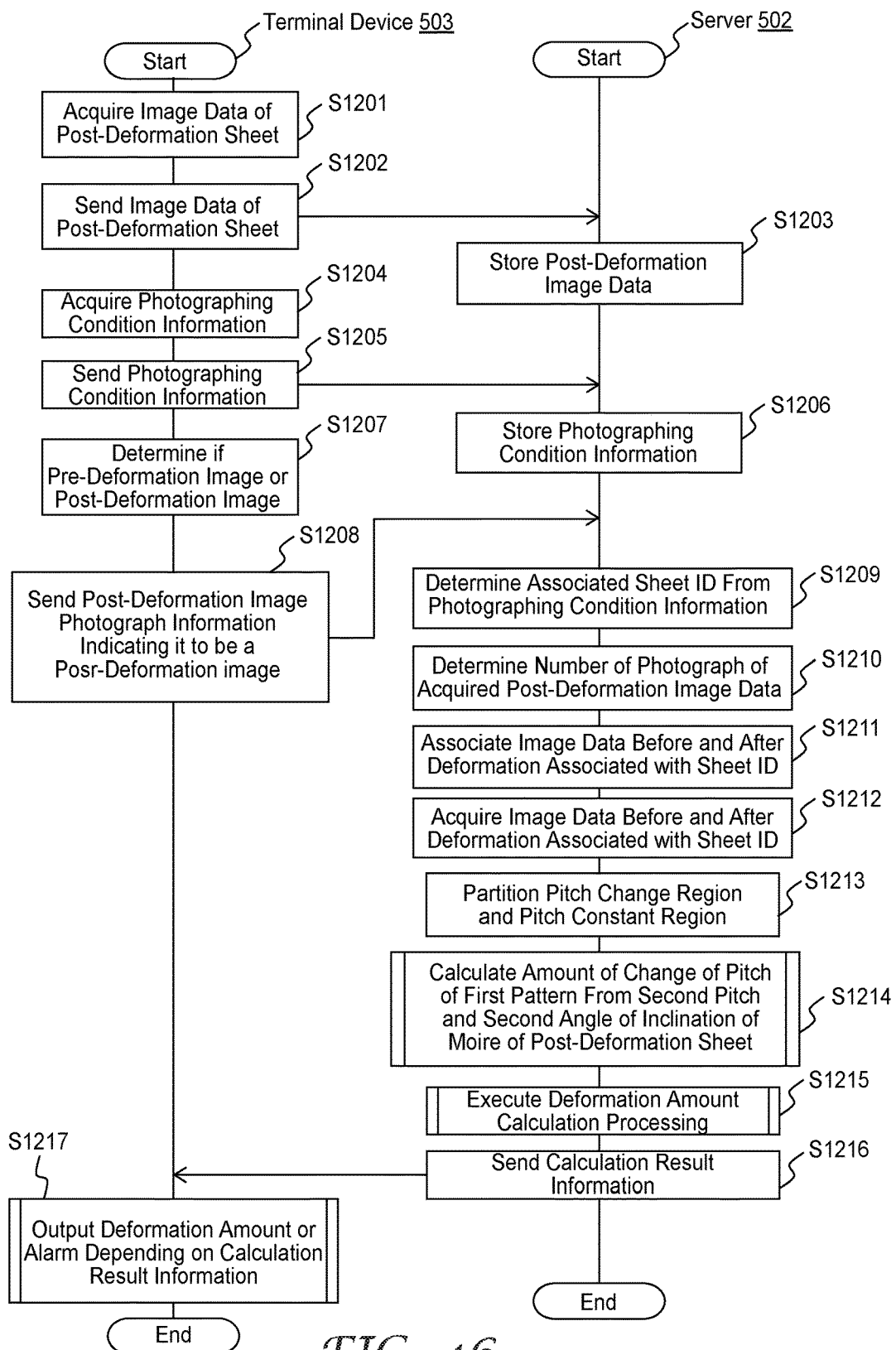
FIG. 46 is a drawing illustrating one example of an operation sequence of deformation amount measuring processing by the deformation amount measuring system depicted in FIG. 41.
Figure 47A:
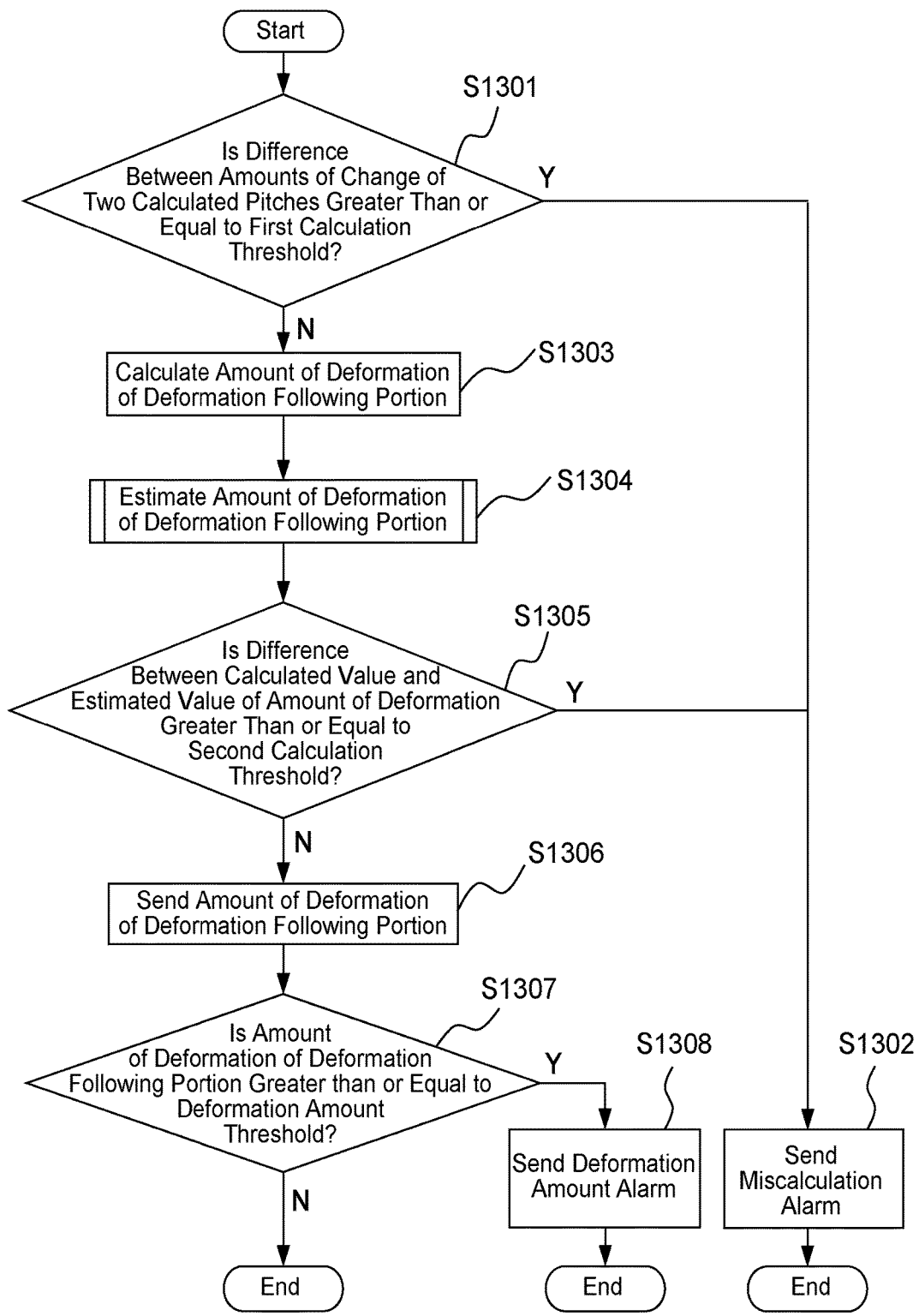
FIG. 47A is a more detailed flow chart of the processing of S1215 shown in FIG. 46.
Figure 47B:
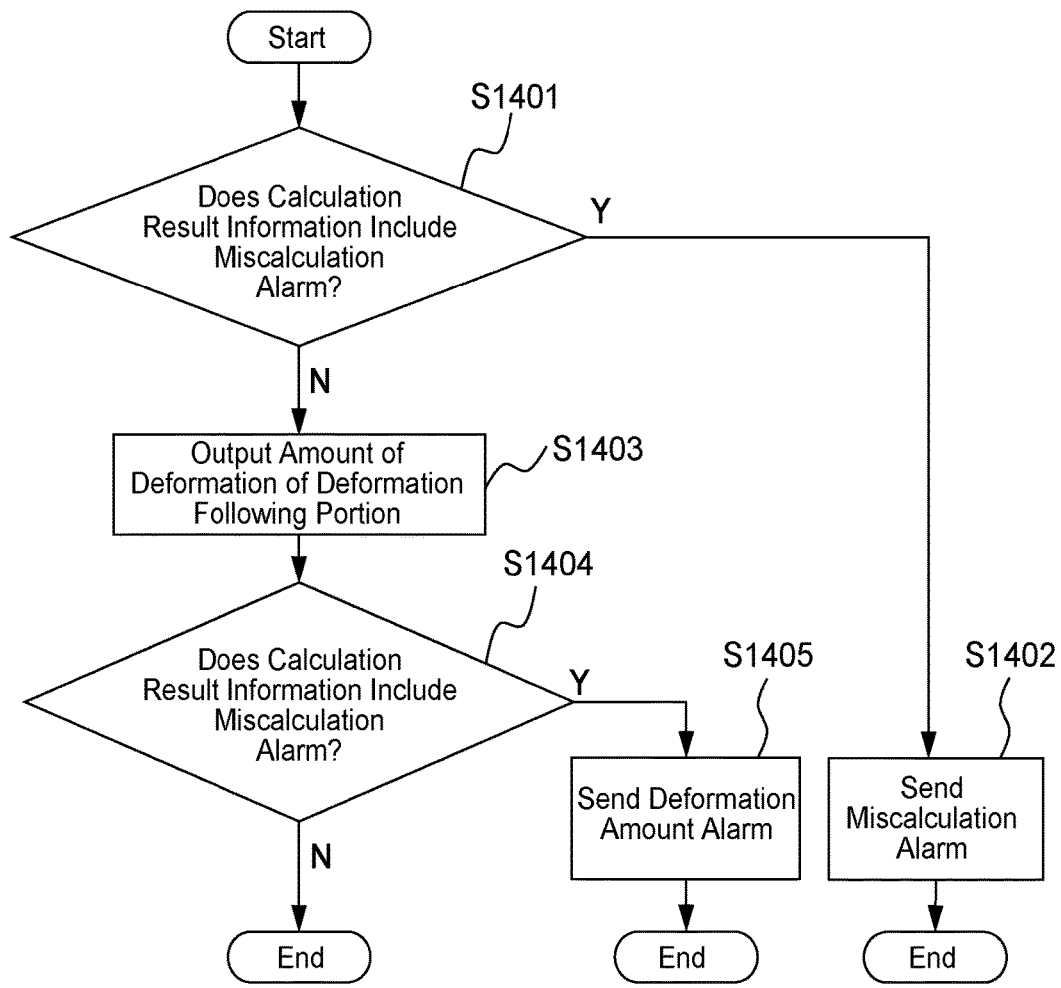
FIG. 47B is a more detailed flow chart of the processing of S1217 shown in FIG. 45.

FIG. 46 is a drawing illustrating one example of an operation sequence of deformation amount measuring processing by the deformation amount measuring system 501. FIG. 47A is a drawing illustrating a more detailed flow of S1215 of FIG. 46; and FIG. 47B is a drawing illustrating a more detailed flow of S1217 of FIG. 46. For the purposes of simplifying the description, in FIG. 46, the terminal device 503 is recited as the same terminal device that executes the pre-deformation image data acquisition processing shown in FIG. 44. However, the terminal device that executes the deformation amount measuring processing shown in FIG. 46 may be a different terminal device than the terminal device that executes the pre-deformation image data acquisition processing shown in FIG. 44. For example, the pre-deformation image data acquisition processing shown in FIG. 44 may be executed by a terminal device owned by an operator who performs maintenance and management of a tunnel; and the deformation amount measuring processing shown in FIG. 46 may be executed by a terminal device owned by the general public.

The operation sequence described below is executed mainly by the control units of each of the devices in cooperation with the components of each of the devices, on the basis of programs stored in advance in memory units of each device in the devices.

First, the image data acquisition unit 21 acquires image data corresponding to an image of the post-deformation sheet 101 that has been adhered to the measurement subject. The image is captured by an operator (not illustrated) using the image capturing unit 16 (S1201). Hereinafter, the processing of S1202 to S1206 is the same as the processing of S1102 to S1106 described while referencing FIG. 44. As such, detailed description thereof is omitted.

Next, the image data acquisition unit 71 determines if the acquired image is a pre-deformation image or post-deformation image (S1207). The image data acquisition unit 71 determines that the image shown by the acquired image data is a pre-deformation image depending on "post-deformation" being selected in the captured image selection portion of the post-deformation image display screen 142 by the operator (not illustrated). Next, the image data acquisition unit 71 sends post-deformation image photograph information indicating that the acquired image is the post-deformation image to the server 502 (S1208).

Next, the sheet ID reference unit 530 determines the sheet ID associated with the post-deformation image acquired in S1201 from the photographing condition information (S1209).

The sheet ID reference unit 530 references the image association table of the server memory unit 512 and determines the sheet ID associated with the image data, to which the position information measured by the positioning system unit 17 matches, as the sheet ID of the post-deformation image. Next, the sheet ID reference unit 530 references the image association table of the server memory unit 512, counts what number the image data corresponding to the post-deformation image acquired in S1201 is, and determines the number of photographs of the post-deformation image acquired in S1201 (S1210). Next, the sheet ID reference unit 530 associates the acquired image data and the various information with the sheet ID determined in S1209, and stores this associated information in the image association table of the server memory unit 512 (S1211).

Next, the image data showing the image before and after deformation, associated with the sheet ID is acquired from the server memory unit 512 (S1212). Next, the pitch region partitioning unit 521 partitions the pitch change region and the pitch constant region on the basis of differences between the image data of the sheet 101 before and after deformation, acquired in S1212 (S1213). The pitch change amount calculation unit 522 calculates the amount of change of the pitch of the pattern from the pitch of the moire of the post-deformation sheet 101 (S1214). The processing of S1214 is the same as the processing of S705, which includes the processing of S801 to S807. As such, detailed description thereof is omitted. Next, the server processing unit 520 executes deformation amount calculation processing (S1215).

In the deformation amount calculation processing shown in S1215, the pitch change amount comparison unit 526 compares the amount of change of the pitch calculated in S1214 with the first change amount threshold (S1301). When the amount of deformation of the pitch calculated in S1214 is greater than or equal to the first change amount threshold, the pitch change amount comparison unit 526 sends, to the terminal device 503 as calculation result information, a miscalculation alarm indicating a possibility that the amount of deformation of the deformation following portion 111 that is calculated contains a mistake (S1302).

Additionally, when the amount of deformation of the pitch calculated in S1214 is less than the first change amount threshold, the deformation amount calculation unit 523 calculates the amount of deformation of the deformation following portion 111 (S1303).

Next, the pitch change amount estimation unit 527 estimates the amount of change of the pitch of the first pattern (S1304). The processing of S1304 is the same as the processing of S909, which includes the processing of S1001 and S1002. As such, detailed description thereof is omitted. Next, the pitch change amount verification unit 528 compares a difference between the amount of deformation of the deformation following portion 111 calculated in S1303 and the amount of deformation of the deformation following portion 111 estimated in S1304 with a predetermined second calculation threshold (S1305). When the pitch change amount verification unit 528 has determined that the difference between calculated value and the estimated value of the amount of deformation is greater than or equal to the predetermined second calculation threshold, the pitch change amount verification unit 528 sends, to the terminal device 503 as calculation result information, a miscalculation alarm indicating a possibility that the amount of deformation of the deformation following portion 111 that is calculated contains a mistake (S1302). When the pitch change amount verification unit 528 has determined that the difference between calculated value and the estimated value of the amount of deformation is greater than or equal to the predetermined second calculation threshold, the pitch change amount verification unit 528 sends, to the terminal device 503 as calculation result information, the amount of deformation of the deformation following portion 111 calculated in S1110 (S1306).

Next, the deformation amount comparison unit 524 compares the amount of deformation of the deformation following portion 111 calculated in S1214 with a predetermined deformation amount threshold (S1307). The deformation amount comparison unit 524 sends, to the terminal device 503 as calculation result information, a deformation amount alarm indicating that the amount of deformation of the deformation following portion 111 has exceeded a reference value when the amount of deformation of the deformation following portion 111 calculated in S1214 is greater than or equal to the predetermined deformation amount threshold (S1308). Next, the terminal processing unit 70 outputs the miscalculation alarm, the amount of deformation of the deformation following portion 111, or the miscalculation alarm and the amount of deformation of the deformation following portion 111 depending on the calculation result information received from the server 502 (S1217).

In the deformation amount calculation processing shown in S1215, the calculation result determination unit 72 determines whether or not the calculation result information received from the server 502 includes the miscalculation alarm (S1401). When the calculation result determination unit 72 determines that the calculation result information received from the server 502 includes the miscalculation alarm, the miscalculation alarm output unit 73 outputs the miscalculation alarm (S1402). When the calculation result determination unit 72 determines that the calculation result information received from the server 502 does not include the miscalculation alarm, the deformation amount output unit 74 outputs the amount of deformation of the deformation following portion 111 (S1403). Next, the calculation result determination unit 72 determines whether or not the calculation result information received from the server 502 includes the deformation amount alarm (S1404). When the calculation result determination unit 72 determines that the calculation result information received from the server 502 includes the deformation amount alarm, the deformation amount alarm output unit 75 outputs the deformation amount alarm (S1405).

FIG. 48A is a drawing illustrating a third state of the image association table depicted in FIG. 45A; and FIG. 48B is a drawing illustrating a fourth state of the image association table depicted in FIG. 45A.

The image association table depicted in FIG. 48A shows a state where the photographing condition information received by the information acquisition unit 531 in S1206 has been filled in. The image association table depicted in FIG. 48B shows a state where the calculation results of the deformation amount calculation processing shown in S1215 are filled into the image association table, which the sheet ID reference unit 530 associates the sheet ID determined in S1209 with and stores in S2111.

Building Deformation Evaluation-Use Article

In another aspect of the present disclosure, a building deformation evaluation-use article including the sheet of the present disclosure is provided.

In a typical aspect, a building deformation evaluation-use article includes an adhesive surface for adhering the building deformation evaluation-use article to a measurement subject. The adhesive surface may be the deformation following portion side surface of the sheet of the present disclosure. Alternatively, the building deformation evaluation-use article may be provided as a combination of the sheet of the present disclosure and an adhesive. In this case, when using the sheet, the sheet can be adhered to the measurement subject by the adhesive. Alternatively, a building deformation evaluation-use article formed from the sheet of the present disclosure can be provided and the building deformation evaluation-use article can be fixed to the measurement subject using a separate conventionally known adhesive. As described above, it is possible to provide the building deformation evaluation-use article of the present disclosure in any form that is capable of being fixed to the measurement subject.

Use of Sheet or Building Deformation Evaluation-Use Article

By utilizing the characteristics of the sheet of the present disclosure, namely that the position and magnitude of deformation that has occurred in a measurement subject can be three-dimensionally evaluated, the sheet of the present disclosure can be used in the evaluation of the amount of deformation of various types of measurement subjects. The sheet of the present disclosure can be applied to a wide range of measurement subjects of various materials and shapes, and examples of measurement subjects that are particularly anticipated include concrete surfaces (e.g. concrete walls) of buildings, metal surfaces, and the like.

REFERENCE NUMERALS

1 to 6 Deformation amount measuring device
101 Sheet
111 Deformation following portion (first layer portion)
112 Non-deformation following portion (second layer portion)
113 Deformation buffer portion
121 First pattern
122 Second pattern

The invention claimed is:

1. A method for measuring an amount of deformation of a measurement subject in which a sheet is used that comprises a first layer portion having a first pattern that includes a plurality of line drawings extending in a first direction, and a second layer portion overlaid on the first layer portion and having a second pattern that includes a plurality of line drawings extending in a second direction different than the first direction;
the method comprising the steps of:
acquiring, by a processor, from the sheet that has been disposed on the measurement subject, reference data on the basis of pre-deformation image data corresponding to a pre-deformation image including a pre-deformation moire produced as a result of the pre-deformation first pattern and the second pattern being overlaid and post-deformation image data corresponding to a post-deformation image including a post-deformation moire produced as a result of the post-deformation first pattern and second pattern being overlaid; and
calculating, by the processor, an amount of deformation of the measurement subject on the basis of the reference data and the post-deformation image data.

2. The method according to claim 1, wherein:
the first layer portion includes a deformation following portion that follows a deformation of the measurement subject;
the second layer portion includes a non-deformation following portion that does not follow the deformation of the measurement subject;
the sheet further includes a deformation buffering portion that connects the deformation following portion and the non-deformation following portion; and
the step of calculating the amount of deformation of the measurement subject includes a step of finding an amount of deformation of the deformation following portion on the basis of the post-deformation image data.

3. The method according to claim 2, further comprising a step of:
outputting a deformation amount alarm indicating that the amount of deformation of the deformation following portion has exceeded a reference value when the amount of deformation of the deformation following portion is greater than or equal to a predetermined deformation amount threshold.

4. The method according to claim 2, wherein:
the step of calculating the amount of deformation of the deformation following portion includes the steps of:
acquiring a first pitch of the pre-deformation moire from the pre-deformation image, and a first angle of inclination with respect to the second direction of extending directions of the pre-deformation moire;

acquiring at least one of a second pitch of the post-deformation moire from the post-deformation image and a second angle of inclination with respect to the second direction of the extending directions of the post-deformation moire;

calculating an amount of change of a pitch of the first pattern using the first pitch and the first angle of inclination and at least one of the second pitch and the second angle of inclination; and calculating the amount of deformation of the deformation following portion from the amount of change of the pitch of the first pattern.

5. The method according to claim 4, wherein:

the step of acquiring the first pitch and the first angle of inclination includes a step of:

acquiring a first spatial frequency information that shows a spatial frequency of the pre-deformation image, and calculating the first pitch and the first angle of inclination from the first spatial frequency information; and the step of acquiring at least one of the second pitch and the second angle of inclination includes a step of:

acquiring a second spatial frequency information that shows a spatial frequency of the post-deformation image, and calculating at least one of the second pitch and the second angle of inclination from the second spatial frequency information.

6. The method according to claim 4, wherein:

the step of calculating the amount of deformation of the deformation following portion further includes a step of:

acquiring an offset angle between the first direction and the second direction; and the amount of change of the pitch of the first pattern is calculated further using the offset angle.

7. The method according to claim 6, wherein:

the step of acquiring the offset angle includes a step of:

calculating the offset angle using the first pitch.

8. The method according to claim 4, wherein:

the step of calculating the amount of deformation of the deformation following portion includes the steps of:

acquiring both the second pitch and the second angle of inclination;

comparing a first amount of change of the pitch of the first pattern calculated on the basis of the second pitch with a second amount of change of the pitch of the first pattern calculated on the basis of the second angle of inclination; and outputting an alarm indicating a possibility that the amount of change of the pitch that is calculated contains a mistake when a difference between the first amount of change and the second amount of change is greater than or equal to a predetermined first calculation threshold.

9. The method according to claim 4, wherein:

the step of calculating the amount of deformation of the deformation following portion includes a step of:

partitioning a pitch change region where the pitch of the line drawings included in the first pattern change between pre-deformation and post-deformation of the deformation following portion, and a pitch constant region where the pitch of the line drawings included in the first pattern do not change between pre-deformation and post-deformation of the deformation following portion; and the amount of deformation of the deformation following portion is found from the post-deformation moire produced in the pitch change region of the post-deformation image.

10. The method according to claim 9, wherein:

the step of calculating the amount of deformation of the deformation following portion further includes the steps of:

calculating an amount of movement of the pre-deformation moire and the post-deformation moire in the pitch constant region and estimating the amount of change of the pitch of the first pattern using the amount of movement; and outputting an alarm indicating a possibility that the amount of change of the pitch that is calculated contains a mistake when a difference between the amount of change of the pitch of the first pattern calculated from the pre-deformation moire and the post-deformation moire produced in the pitch change region, and the estimated amount of change is greater than or equal to a predetermined second calculation threshold.

11. A non-transitory computer readable medium containing a program for measuring an amount of deformation of a measurement subject in which a sheet is used that comprises a first layer portion having a first pattern that includes a plurality of line drawings extending in a first direction, and a second layer portion overlaid on the first layer portion and having a second pattern that includes a plurality of line drawings extending in a second direction different than the first direction;

the program configured to cause a computer to execute the steps of:

acquiring reference data on the basis of pre-deformation image data corresponding to a pre-deformation image including a pre-deformation moire produced as a result of the pre-deformation first pattern and the second pattern being overlaid;

acquiring, from the sheet that has been disposed on the measurement subject, post-deformation image data corresponding to a post-deformation image including a post-deformation moire produced as a result of the post-deformation first pattern and second pattern being overlaid; and calculating an amount of deformation of the measurement subject on the basis of the reference data and the post-deformation image data.

12. A server device, comprising:

a server receiving unit implemented by the server device executing a program that receives from a sheet that is disposed on a measurement subject and that includes a first layer portion having a first pattern that includes a plurality of line drawings extending in a first direction, and a second layer portion overlaid on the first layer portion and having a second pattern that includes a plurality of line drawings extending in a second direction different than the first direction, pre-deformation image data corresponding to a pre-deformation image including a pre-deformation moire produced as a result of the pre-deformation first pattern and the second pattern being overlaid and post-deformation image data corresponding to a post-deformation image including a post-deformation moire produced as a result of the post-deformation first pattern and second pattern being overlaid;

a server processing unit implemented by the server device executing a program that calculates an amount of deformation of the measurement subject on the basis of the pre-deformation image data and the post-deformation image data; and a server sending unit implemented by the server device executing a program that sends the amount of deformation of the measurement subject to a terminal device.

13. The server device according to claim 12, further comprising:

a server memory unit implemented by the server device executing a program that associates sheet identification information with pre-deformation image data corresponding to a pre-deformation image including a pre-deformation moire produced by the pre-deformation first pattern and the second pattern being overlaid, and stores the associated information, wherein the server processing unit includes a sheet identification information referencing unit implemented by the server device executing a program that determines the sheet identification information of the post-deformation image data and acquires pre-deformation image data associated with the determined sheet identification information from the server memory unit.

14. A system comprising a terminal device and a server device capable of communication with each other, the terminal device including:

an image data acquisition unit implemented by the terminal device executing a program that acquires from a sheet that is disposed on a measurement subject and that includes a first layer portion having a first pattern that includes a plurality of line drawings extending in a first direction, and a second layer portion overlaid on the first layer portion and having a second pattern that includes a plurality of line drawings extending in a second direction different than the first direction, pre-deformation image data corresponding to a pre-deformation image including a pre-deformation moire produced as a result of the pre-deformation first pattern and the second pattern being overlaid and post-deformation image data corresponding to a post-deformation image including a post-deformation moire produced as a result of the post-deformation first pattern and second pattern being overlaid;

a terminal communication unit implemented by the terminal device executing a program that sends the post-deformation image data to the server device and receives an amount of deformation of a deformation following portion from the server device; and a display unit that displays an amount of deformation of the measurement subject that has been received;

the server device including:

a memory that stores the post-deformation image data;

a server processing unit implemented by the server device executing a program that calculates the amount of deformation of the measurement subject on the basis of the pre-deformation image data and the post-deformation image data; and a server communication unit implemented by the server device executing a program that receives the post-deformation image data from the terminal device and sends the amount of deformation of the measurement subject to the terminal device.

\* \* \* \* \*